(12) United States Patent
Orita et al.

(10) Patent No.: US 11,972,053 B2
(45) Date of Patent: Apr. 30, 2024

(54) TACTILE PRESENTATION CONTROL APPARATUS, TACTILE PRESENTATION PANEL, TACTILE PRESENTATION TOUCH PANEL, AND TACTILE PRESENTATION TOUCH DISPLAY

(71) Applicant: Mitsubishi Electric Corporation, Tokyo (JP)

(72) Inventors: Tae Orita, Tokyo (JP); Yoshinori Ueno, Tokyo (JP); Mitsuru Sakai, Tokyo (JP); Naoki Numata, Tokyo (JP); Yuki Furumoto, Tokyo (JP); Tsuyoshi Sempuku, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/781,408

(22) PCT Filed: Dec. 26, 2019

(86) PCT No.: PCT/JP2019/051091
§ 371 (c)(1),
(2) Date: Jun. 1, 2022

(87) PCT Pub. No.: WO2021/130954
PCT Pub. Date: Jul. 1, 2021

(65) Prior Publication Data
US 2023/0004224 A1 Jan. 5, 2023

(51) Int. Cl.
*G06F 3/01* (2006.01)
*G06F 3/0362* (2013.01)

(52) U.S. Cl.
CPC ............ *G06F 3/016* (2013.01); *G06F 3/0362* (2013.01)

(58) Field of Classification Search
CPC ...... G06F 3/016; G06F 3/0362; G06F 3/0393; G06F 3/0446; G06F 3/03547; G06F 3/038; G06F 3/0383; G06F 3/04166
See application file for complete search history.

(56) References Cited

U.S. PATENT DOCUMENTS 11,159,161 B2 * 10/2021 Aoki ................... H03K 17/962
11,216,142 B2 * 1/2022 Tanaka ................. G06F 3/0446
(Continued)

FOREIGN PATENT DOCUMENTS

| JP | 2005-019113 A | 1/2005 |
| JP | 2015-97076 A | 5/2015 |

(Continued)

OTHER PUBLICATIONS

International Search Report dated Feb. 25, 2020 in International Application PCT/JP2019/051091.
(Continued)

*Primary Examiner* — Benyam Ketema
(74) *Attorney, Agent, or Firm* — XSENSUS LLP

(57) ABSTRACT

An object of the present disclosure is to provide a tactile presentation control apparatus that can provide an operation feeling of a dial knob that allows intuitive operation by a tactile sense of the user, and is user-friendly. A tactile presentation control apparatus according to the present disclosure that has a tactile presentation knob placed on an operation surface and presents a tactile sense to the user via the tactile presentation knob. The tactile presentation control apparatus includes a tactile control unit that performs control to present different tactile senses to each of a plurality of operation regions on the operation surface when the tactile presentation knob is rotationally operated. When the tactile presentation knob is present in one of the operation regions, the tactile control unit performs control to present, as the
(Continued)

tactile sense, a frictional force generated in the tactile presentation knob to the operation region.

30 Claims, 59 Drawing Sheets

(56) References Cited

U.S. PATENT DOCUMENTS

| | | | | |
|---|---|---|---|---|
| 11,221,692 B2* | 1/2022 | Takaoka | .................. | G06F 3/044 |
| 11,435,862 B2* | 9/2022 | Sasaki | .................. | G06F 3/0488 |
| 11,467,696 B2* | 10/2022 | Korherr | .............. | H03K 17/962 |
| 11,513,639 B2* | 11/2022 | Kono | .................. | G06F 3/0412 |
| 11,513,649 B2* | 11/2022 | Takada | .................... | G06F 3/038 |
| 2010/0079403 A1* | 4/2010 | Lynch | ................. | G06F 3/04886 |
| | | | | 345/173 |
| 2011/0175835 A1* | 7/2011 | Wang | .................... | G06F 3/0446 |
| | | | | 345/173 |
| 2013/0343588 A1* | 12/2013 | Karunasiri | ............... | H04R 1/02 |
| | | | | 381/332 |
| 2014/0152621 A1* | 6/2014 | Okayama | ............ | G06F 3/04182 |
| | | | | 345/174 |
| 2014/0267039 A1* | 9/2014 | Curtis | .................. | G06F 3/0338 |
| | | | | 345/161 |
| 2015/0103024 A1* | 4/2015 | Haga | ..................... | G06F 3/0448 |
| | | | | 345/173 |
| 2015/0169080 A1* | 6/2015 | Choi | ..................... | G06F 3/0488 |
| | | | | 345/184 |
| 2015/0185849 A1* | 7/2015 | Levesque | ................ | G06F 3/011 |
| | | | | 340/407.2 |
| 2018/0024649 A1* | 1/2018 | Uno | ...................... | G06F 3/0338 |
| | | | | 345/174 |
| 2018/0348874 A1* | 12/2018 | Khoshkava | ............. | G06F 3/016 |
| 2018/0373351 A1* | 12/2018 | Sawada | ................ | H01H 19/005 |
| 2020/0142529 A1* | 5/2020 | Nugraha | ................ | G06F 3/0416 |
| 2020/0218351 A1* | 7/2020 | Orita | ..................... | G06F 3/0446 |
| 2020/0225765 A1* | 7/2020 | Hori | ........................... | G06F 3/03 |
| 2020/0301547 A1* | 9/2020 | Mori | ..................... | G06F 3/0488 |
| 2021/0173486 A1* | 6/2021 | Ueda | ....................... | B60R 16/02 |
| 2022/0004303 A1* | 1/2022 | Kakinoki | ............... | G06F 3/0446 |
| 2022/0229503 A1* | 7/2022 | Kono | .................... | G06F 3/044 |
| 2022/0276712 A1* | 9/2022 | Orita | ..................... | G06F 3/0448 |
| 2022/0326774 A1* | 10/2022 | Ono | ..................... | G06F 3/0446 |
| 2022/0374084 A1* | 11/2022 | Orita | ..................... | G06F 3/0383 |
| 2022/0404912 A1* | 12/2022 | Orita | ..................... | G06F 3/0445 |
| 2023/0004224 A1* | 1/2023 | Orita | ..................... | G06F 3/0362 |
| 2023/0004225 A1* | 1/2023 | Orita | ..................... | G06F 3/0488 |
| 2023/0010984 A1* | 1/2023 | Hayashi | ................ | G06F 3/0362 |

FOREIGN PATENT DOCUMENTS

| | | |
|---|---|---|
| JP | 2015-130167 A | 7/2015 |
| JP | 2019-514139 A | 5/2019 |
| JP | 6570799 B2 | 8/2019 |
| WO | 2017/184634 A2 | 10/2017 |

OTHER PUBLICATIONS

U.S. Appl. No. 17/773,617, filed May 2, 2022, Tae Orita.
U.S. Appl. No. 17/779,142, filed May 24, 2022, Masami Hayashi.
U.S. Appl. No. 17/777,055, filed May 16, 2022, Tae Orita.
U.S. Appl. No. 17/781,722, filed Jun. 2, 2022, Tae Orita.
U.S. Appl. No. 17/633,963, filed Feb. 9, 2022, Takeshi Ono.

* cited by examiner

F I G. 3
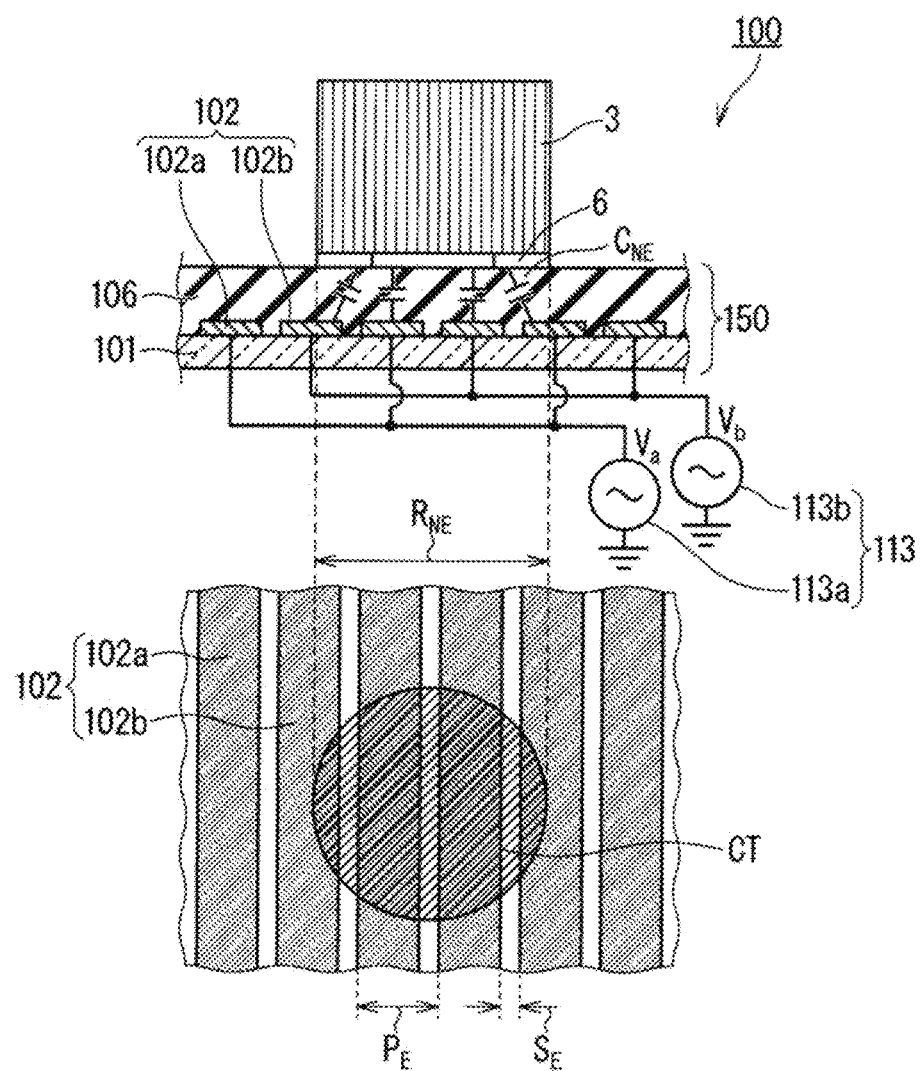

F I G. 2 0
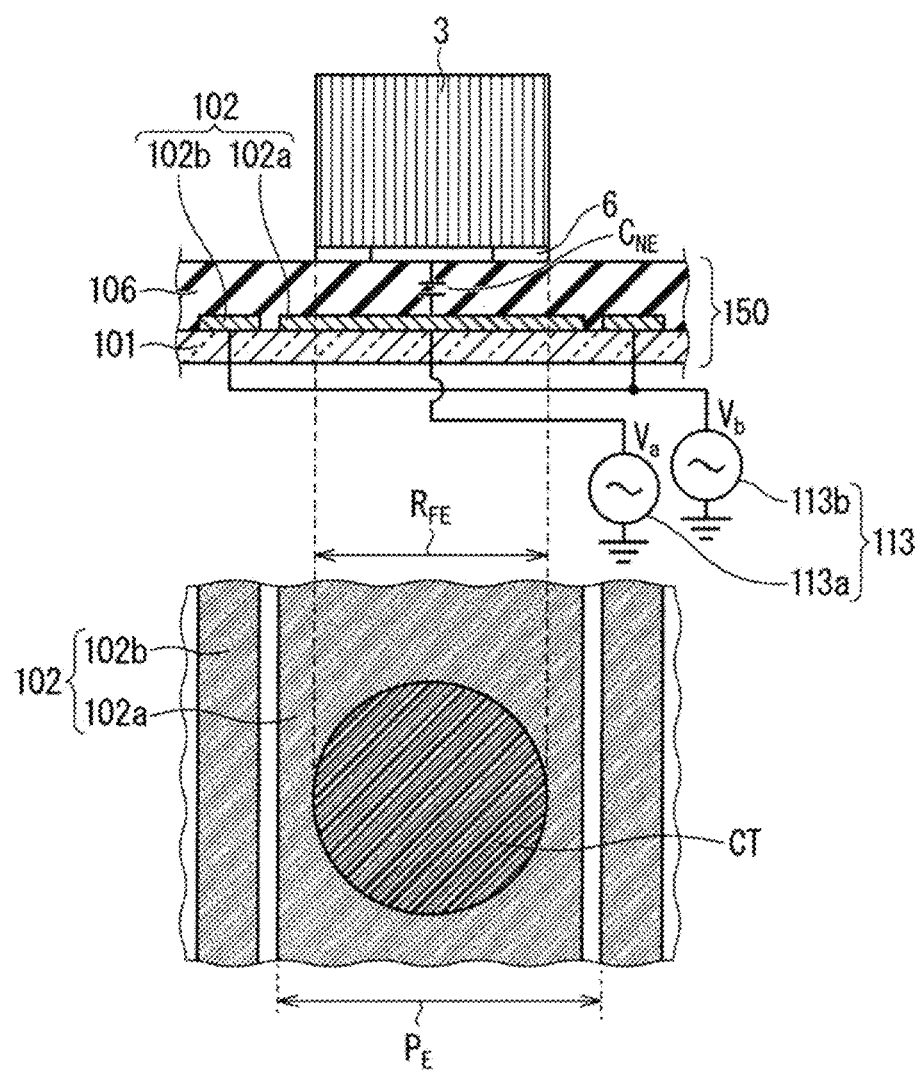

F I G. 1 0 5
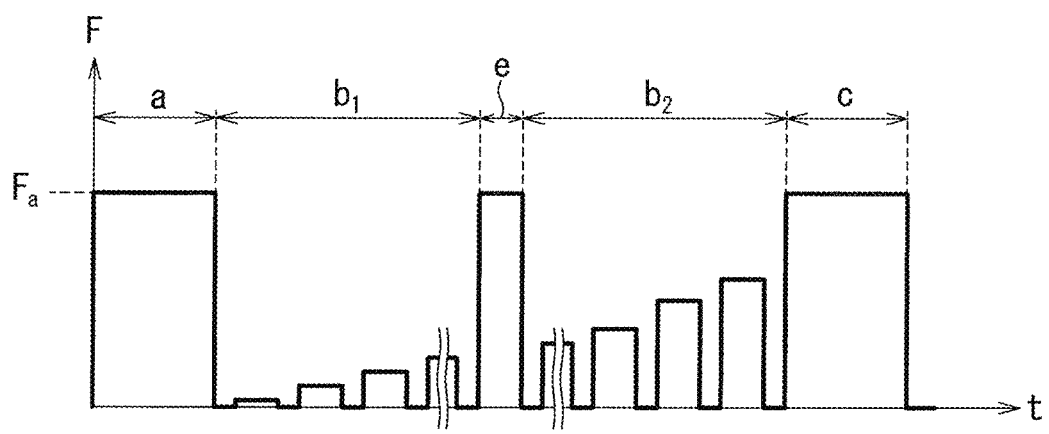

TACTILE PRESENTATION CONTROL APPARATUS, TACTILE PRESENTATION PANEL, TACTILE PRESENTATION TOUCH PANEL, AND TACTILE PRESENTATION TOUCH DISPLAY

CROSS-REFERENCE TO RELATED APPLICATION

The present application is based on PCT filing PCT/JP2019/051091, filed Dec. 26, 2019, the entire contents of which are incorporated herein by reference.

TECHNICAL FIELD

The present disclosure relates to a tactile presentation control apparatus that presents a tactile sense to the user via a tactile presentation knob, a tactile presentation panel including the tactile presentation control apparatus, a tactile presentation touch panel including the tactile presentation panel and a touch panel, and a tactile presentation touch display including the tactile presentation touch panel and a display panel.

BACKGROUND ART

A touch panel is widely known as an apparatus that detects and outputs a position (hereinafter, sometimes referred to as a "touch position") instructed by an indicator such as a finger of the user or a pen on a touch screen, and there is a projected capacitive touch panel (PCAP) as a touch panel using a capacitive sensing system. The PCAP can detect a touch position even in a case where a surface on the user side (hereinafter, sometimes referred to as a "front surface") of a touch screen is covered with a protective plate such as a glass plate having a thickness of about several mm. Further, the PCAP has advantages such as excellent robustness because a protective plate can be arranged on the front surface, and long life because no movable portion is included.

A touch screen of the PCAP includes a detection row direction wiring layer that detects coordinates of a touch position in a row direction and a detection column direction wiring layer that detects coordinates of a touch position in a column direction. In description below, the detection row direction wiring layer and the detection column direction wiring layer may be collectively referred to as a "detection wiring layer".

Further, a member on which the detection wiring layer is arranged is referred to as a "touch screen", and an apparatus in which a detection circuit is connected to the touch screen is referred to as a "touch panel". Furthermore, an area where a touch position can be detected on the touch screen is referred to as a "detectable area".

As the detection wiring layer for detecting electrostatic capacitance (hereinafter, may be simply referred to as "capacitance"), a first series conductor element formed on a thin dielectric film and a second series conductor element formed on the first series conductor element with an insulating film interposed between them are included. There is no electrical contact between the conductor elements, and one of the first series conductor element and the second series conductor element overlaps the other in plan view when viewed from the normal direction of the front surface. However, there is no electrical contact between the conductor elements, and the conductor elements intersect three-dimensionally.

Coordinates of a touch position of an indicator are identified as capacitance (hereinafter, sometimes referred to as "touch capacitance") formed between the indicator and a conductor element which is a detection wiring by a detection circuit. Further, the touch position between conductor elements can be interpolated by a relative value of detected capacitance of one or more conductor elements.

In recent years, a touch panel as an operation panel including a switch or the like has become used for many personal devices instead of a mechanical switch. However, since the touch panel has no unevenness like a mechanical switch and has a uniform touch, a surface shape is not changed by operation. For this reason, it is necessary to perform all the operation processes from position check of a switch to operation execution and operation completion by relying on vision, and there is a problem in reliability of blind operation and operability by a visually handicapped person at the time of operation performed in parallel with other work such as operation of a sound or the like during driving of an automobile.

For example, since a touch panel has become widely used in an in-vehicle device from the viewpoint of designability, it is difficult to operate the in-vehicle device by blind touch during driving, and from the viewpoint of ensuring safety, attention to a touch panel with a function that enables operation by blind touch is increasing. Further, in consumer devices, a touch panel as an operation panel has become used in many home appliances and electronic devices. Furthermore, from the viewpoint of designability, devices equipped with the PCAP whose surface is protected with cover glass are also increasing. However, since the touch panel has a smooth surface, it is difficult to check the position of a switch by touch, and it is difficult to support universal design. In the case of the PCAP, a smooth glass surface is required as design property, and it is difficult to support universal design such as processing unevenness on a glass surface corresponding to a switch position.

As a countermeasure against the above, there is a method of notifying that operation has been accepted and that operation has been completed by voice. However, a function and versatility equivalent to those of a mechanical switch are yet to be achieved, since, for example, an environment in which a voice function can be used is limited due to privacy and noise problems. If there are a function of presenting the position of a switch on the touch panel, a function of receiving operation, and a function of feeding back the completion of operation to the user by tactile sense, it is possible to realize operation by blind touch and support for universal design.

A mobile phone and a smartphone may have a tactile feedback feature using vibration to compensate for operational reliability and non-visual operability. It is expected that a feedback function by vibration in conjunction with operation by the user will rapidly become familiar, and demand for more advanced tactile feedback will increase.

Systems for generating a tactile sense are roughly divided into three types: a vibration system, an ultrasonic system, and an electric system. A feature of the vibration system is that it is possible to coexist with the PCAP and the cost is low. However, the vibration system is unsuitable for incorporation of a vibrator into a housing in a manner that the entire device vibrates sufficiently, and the area cannot be increased due to the limit of output of a vibrator. The ultrasonic system is capable of generating a tactile sense that cannot be generated by other systems, such as a smooth feeling. However, for the same reason as the vibration system, the ultrasonic method is unsuitable for incorporation into a housing, and is disadvantageous in that a large area cannot be obtained. The electric system includes an electrostatic friction system that generates a tactile sense by an electrostatic frictional force and an electric stimulation system that directly applies an electric stimulus to a finger. These systems can generate a tactile sense at an optional position, and a large area can be obtained and multi-touch can be supported.

Hereinafter, the electric system will be described. Note that, hereinafter, a member in which a tactile electrode is arranged on a transparent insulating substrate is referred to as a "tactile presentation screen", and an apparatus in which a detection circuit is connected to the tactile presentation screen is referred to as a "tactile presentation panel". Further, an area where a tactile sense can be presented on the tactile presentation screen is referred to as a "tactile presentable area".

Regarding a tactile output device for a rotary knob, for example, in Patent Document 1, a knob corresponding to the rotary knob is attached on a screen of a display apparatus to which a touch panel is attached. The knob can be manually rotated by the user, and a projection is provided on a lower surface. When the user performs rotation operation of the knob, the projection moves while being in contact with a touch surface in accordance with the rotation operation. When the projection moves on the touch surface, the rotation operation of the knob is converted into touch operation. In a case where the user performs rotation operation, an actuator is controlled to vibrate the knob with a waveform corresponding to operation content.

PRIOR ART DOCUMENT

Patent Document

Patent Document 1: Japanese Patent No. 6570799

SUMMARY

Problem to be Solved by the Invention

In Patent Document 1, since the knob is attached and fixed onto the screen of the display apparatus to which the touch panel is attached, the user cannot perform rotation operation of the knob at an optional position where the user can easily operate the knob. Further, since a tactile sense is presented to the knob by vibration by the control of the actuator, a tactile sense that can be presented to the knob is limited to a vibration feeling and a click feeling, and an operable range defined by stopping the rotation operation cannot be presented. Furthermore, since a frictional force between the screen of the display apparatus and the knob when there is no tactile sense is always constant, a resistance feeling when the knob is rotated cannot be changed. As described above, there is a problem in Patent Document 1 that it is not possible to provide an operation feeling of a dial knob that allows intuitive operation by a tactile sense of the user, and is user-friendly.

The present disclosure has been made to solve the above problem, and an object of the present disclosure is to provide a tactile presentation control apparatus, a tactile presentation panel, a tactile presentation touch panel, and a tactile presentation touch display that can provide an operation feeling of a dial knob that allows intuitive operation by a tactile sense of the user, and is user-friendly.

Means to Solve the Problem

A tactile presentation control apparatus according to the present disclosure is a tactile presentation control apparatus that has a tactile presentation knob placed on an operation surface and presents a tactile sense to the user via the tactile presentation knob. The tactile presentation control apparatus includes a tactile control unit that performs control to present different tactile senses to each of a plurality of operation regions on the operation surface when the tactile presentation knob is rotationally operated. When the tactile presentation knob is present in one of the operation regions, the tactile control unit performs control to present, as the tactile sense, a frictional force generated in the tactile presentation knob to the operation region.

Effects of the Invention

According to the present disclosure, the tactile presentation control apparatus includes a tactile control unit that performs control to present different tactile senses to each of a plurality of operation regions on the operation surface when the tactile presentation knob is rotationally operated. When the tactile presentation knob is present in one of the operation regions, the tactile control unit performs control to present, as the tactile sense, a frictional force generated in the tactile presentation knob to the operation region. For this reason, it is possible to provide an operation feeling of a dial knob that allows intuitive operation by a tactile sense of the user, and is user-friendly.

BRIEF DESCRIPTION OF DRAWINGS

FIG. 3 is a schematic diagram for explaining electrostatic capacitance formed between a tactile electrode and a tactile presentation knob included in a tactile presentation panel in FIG. 2.

FIG. 20 is a schematic diagram for explaining electrostatic capacitance formed between the tactile electrode and the tactile presentation knob in a case where a pitch of the tactile electrode included in the tactile presentation panel in FIG. 2 is larger than a diameter of the tactile presentation knob.

FIG. 105 is a diagram illustrating an example of a frictional force generated when a waveform of the voltage signal of FIG. 104 is applied to each operation region.

DESCRIPTION OF EMBODIMENTS

First Embodiment

<Tactile Presentation Touch Display>

Figure 1:
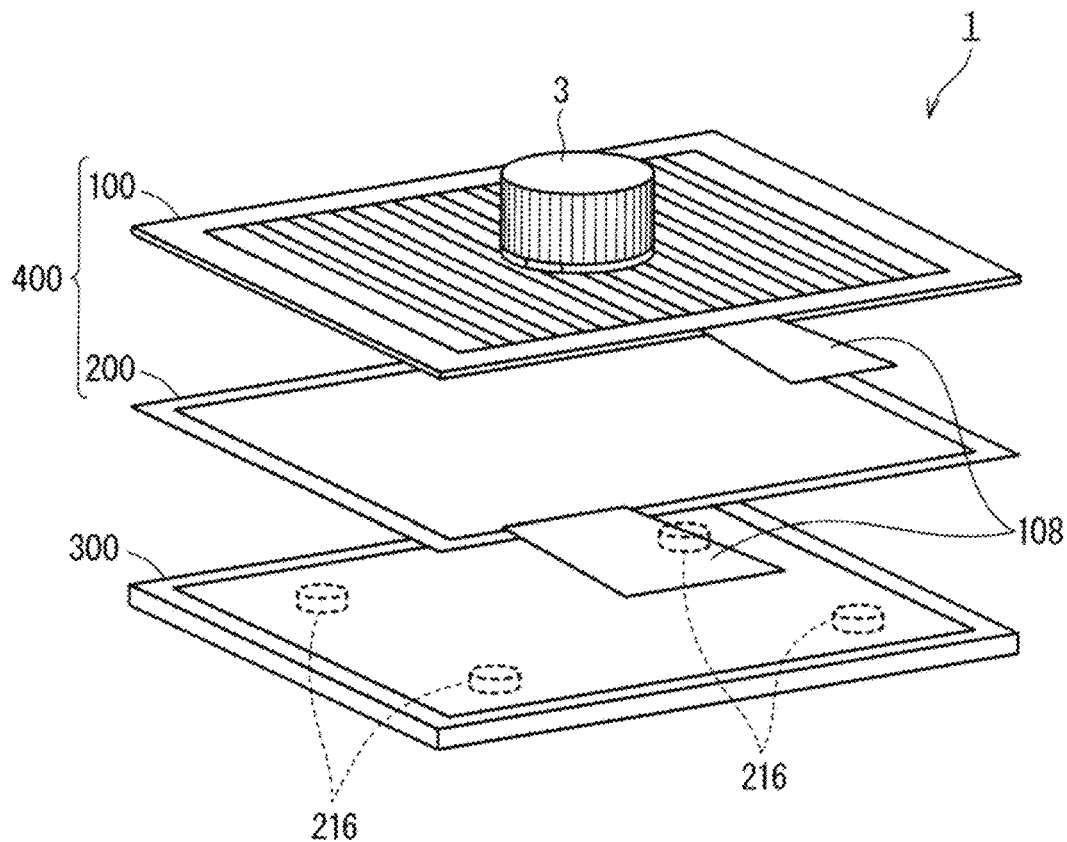
FIG. 1 is an exploded perspective view schematically illustrating a configuration of a tactile presentation touch display according to a first embodiment.
Figure 2:
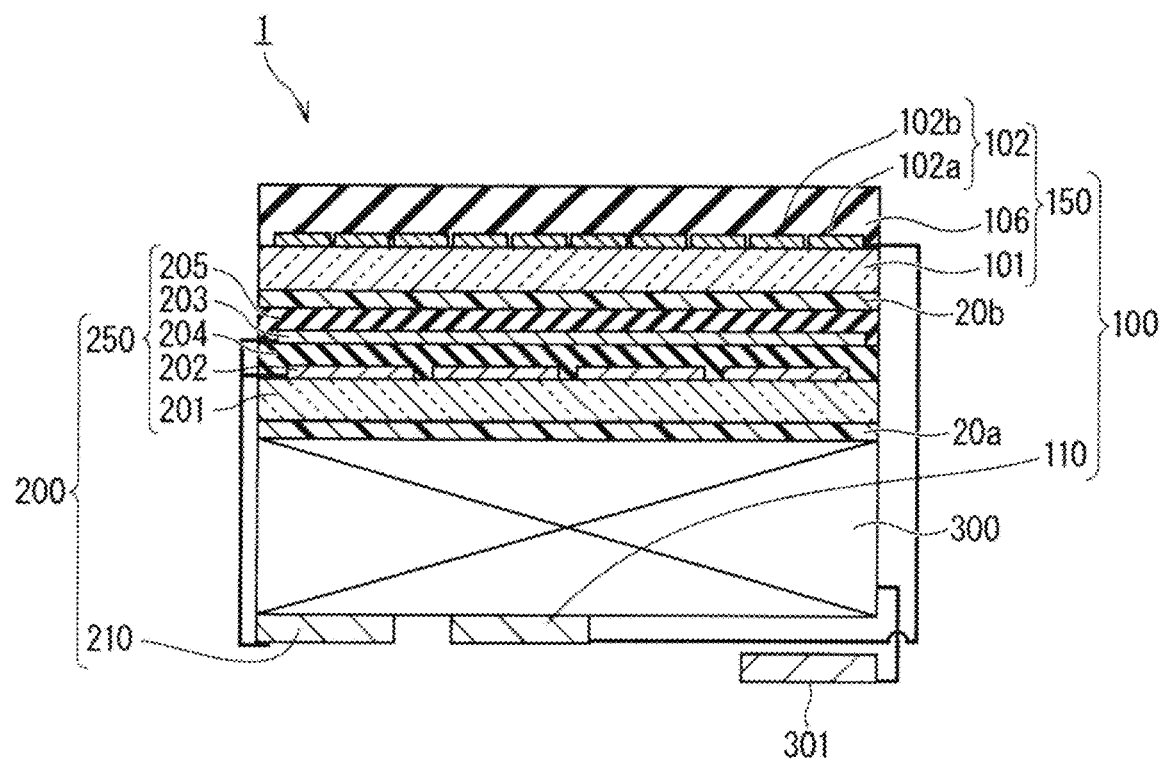
FIG. 2 is a cross-sectional view schematically illustrating an example of a configuration of the tactile presentation touch display of FIG. 1.

FIG. 1 is an exploded perspective view schematically illustrating a configuration of a tactile presentation device in which a tactile presentation knob 3 is placed on a tactile presentation touch display 1 according to a first embodiment to present an operational feeling and a tactile sense of an operation amount. FIG. 2 is a cross-sectional view schematically illustrating a configuration of the tactile presentation touch display 1.

The tactile presentation touch display 1 includes a tactile presentation touch panel 400 and a display panel 300 to which the tactile presentation touch panel 400 is attached. The display panel 300 includes a pressure sensitive sensor 216. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the first embodiment, the tactile presentation screen 150 is arranged on the side (front side) facing the user of the tactile presentation touch display 1, and is fixed to a surface (front surface) facing the user of the touch screen 250 by an adhesive material 20b. The touch screen 250 is fixed to a surface (front surface) facing the user of the display panel 300 facing the user by an adhesive material 20a.

The tactile presentation screen 150 includes a transparent insulating substrate 101, a tactile electrode 102, and a dielectric layer 106. The tactile electrode 102 includes a plurality of first electrodes 102a and a plurality of second electrodes 102b alternately arranged at intervals on the transparent insulating substrate 101. The dielectric layer 106 covers a plurality of the first electrodes 102a and a plurality of the second electrodes 102b. The tactile presentation screen 150 is electrically connected to the voltage supply circuit 110 by a flexible print circuit (FPC) 108.

The touch screen 250 includes a substrate 201 that is transparent and has insulating property, an excitation electrode 202, a detection electrode 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of tactile presentation screen 150. This enables not only tactile presentation but also touch position detection on the transparent insulating substrate 101. The touch detection circuit 210 includes, for example, a detection integrated circuit (IC) for detecting a change in electrostatic capacitance due to touching and a microcomputer. Details of the configuration of the touch screen 250 will be described later with reference to a specific example.

The display panel 300 includes two transparent insulating substrates facing each other, and a display function layer sandwiched between them and having a display function. The display panel 300 is typically a liquid crystal panel. The display panel 300 may be an organic electro-luminescence (EL) panel, a micro light emitting diode (LED) panel, or an electronic paper panel. The touch panel 200 is typically a PCAP.

<Outline of Tactile Presentation Panel>

Figure 4:
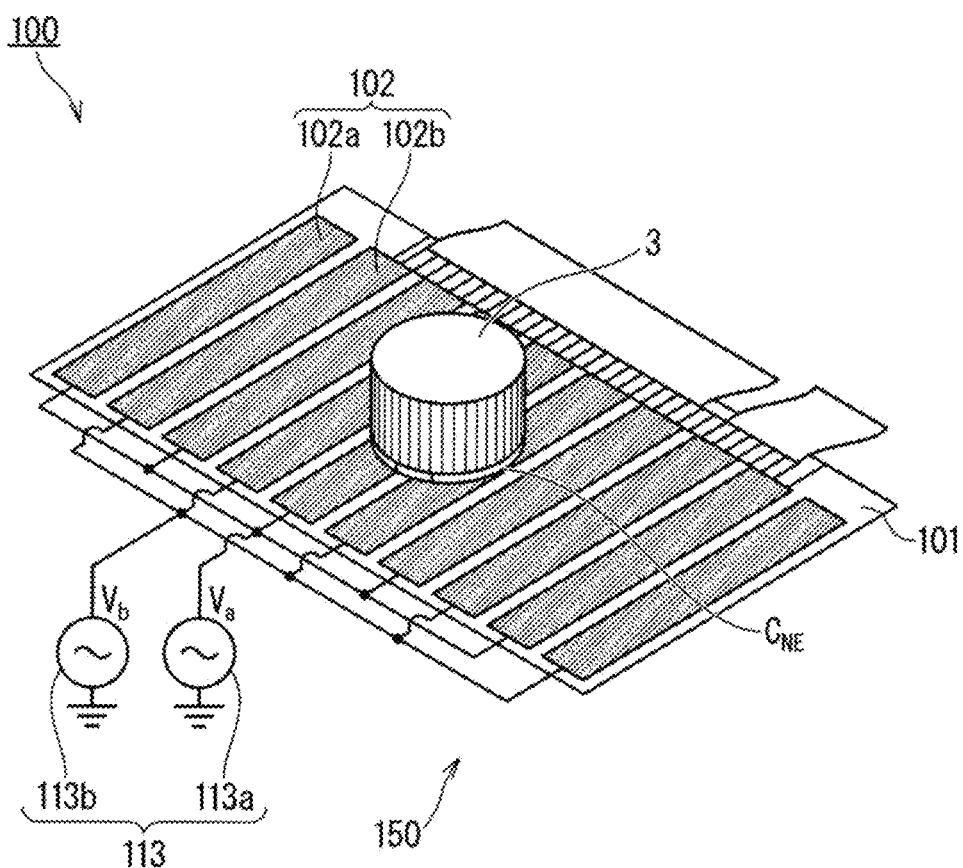
FIG. 4 is a perspective view for explaining electrostatic capacitance formed between the tactile electrode and the tactile presentation knob included in the tactile presentation panel in FIG. 2.

FIG. 3 is a diagram for schematically explaining electrostatic capacitance $C_{NE}$ formed between the tactile electrode 102 and the tactile presentation knob 3 included in the tactile presentation panel 100. FIG. 4 is a perspective view of FIG. 3. When the tactile presentation knob 3 touches a contact surface CT which is a part of the front surface of the tactile presentation screen 150, electrostatic capacitance $C_{NE}$ is formed between the tactile presentation knob 3 and the tactile electrode 102 on the contact surface CT via the dielectric layer 106. Note that, in these diagrams, only a tactile presentation voltage generation circuit 113 included in the voltage supply circuit 110 (see FIG. 2) is illustrated for easy understanding of the diagrams, and other configurations included in the voltage supply circuit 110 are not illustrated. A more specific configuration of the voltage supply circuit 110 will be described later.

The tactile presentation voltage generation circuit 113 included in the voltage supply circuit 110 includes a first voltage generation circuit 113a and a second voltage generation circuit 113b. The first voltage generation circuit 113a applies a voltage signal $V_a$ to the first electrode 102a located on at least a partial region of the transparent insulating substrate 101 among a plurality of the first electrodes 102a, and applies the voltage signal $V_a$ to all the first electrodes 102a located on at least a partial region of the transparent insulating substrate 101 in the first embodiment. The second voltage generation circuit 113b applies a voltage signal $V_b$ to the second electrode 102b located on at least a partial region of the transparent insulating substrate 101 among a plurality of the second electrodes 102b, and applies the voltage signal $V_b$ to all the second electrodes 102b located on at least a partial region of the transparent insulating substrate 101 in the first embodiment.

Figure 5:
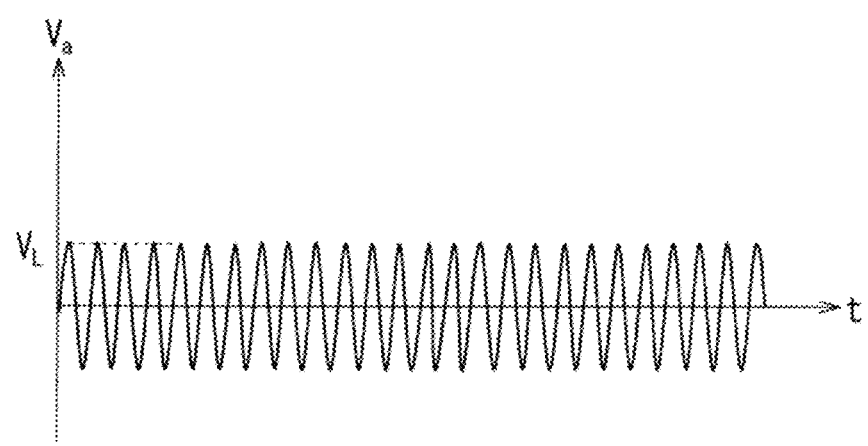
FIG. 5 is a graph illustrating an example of a voltage signal of a first frequency applied to a first electrode of FIG. 2.
Figure 6:
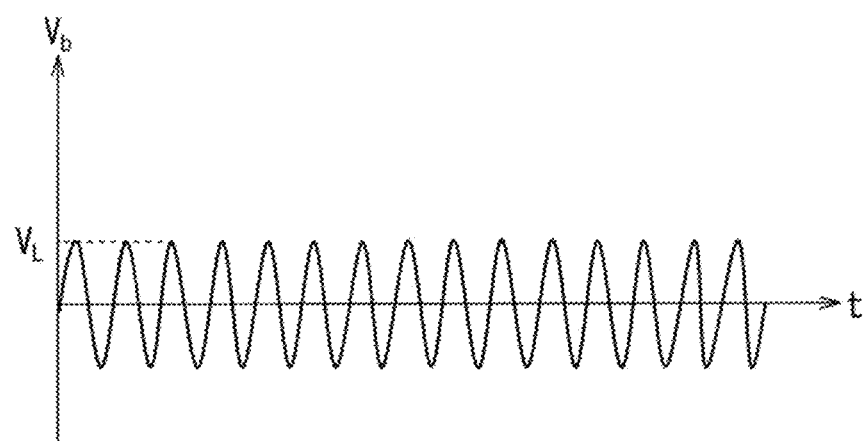
FIG. 6 is a graph illustrating an example of a voltage signal of a second frequency applied to a second electrode of FIG. 2.

Each of FIGS. 5 and 6 is a graph illustrating an example of the voltage signal $V_a$ and the voltage signal $V_b$. The voltage signal $V_a$ (first voltage signal) of the first voltage generation circuit 113a has a first frequency. The voltage signal $V_b$ (second voltage signal) of the second voltage generation circuit 113b has a second frequency different from the first frequency. An amplitude of the voltage signal $V_a$ and an amplitude of the voltage signal $V_b$ may be the same amplitude $V_L$. In the examples of FIGS. 5 and 6, sine waves having different frequencies are used as the voltage signal $V_a$ and the voltage signal $V_b$. Instead of the sine wave, a pulse wave or one having another shape may be used. In order to generate a sufficiently large tactile sense, the amplitude $V_L$ is preferably about several tens of volts.

Figure 7:
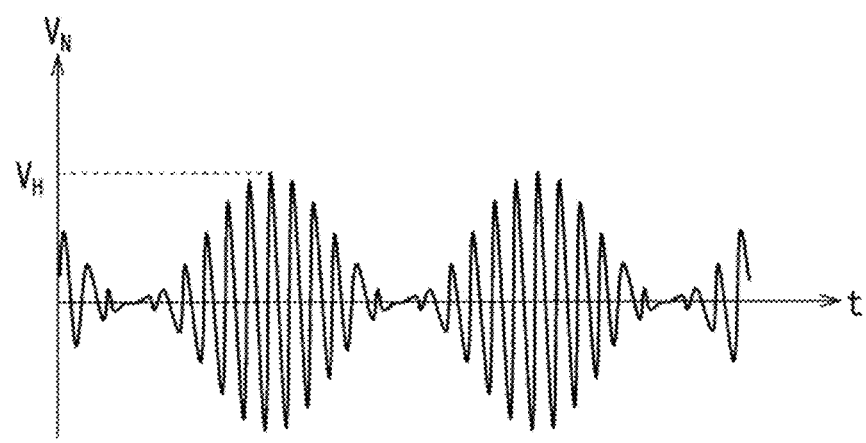
FIG. 7 is a graph illustrating an amplitude modulation signal generated by combining voltage signals of FIGS. 5 and 6.

FIG. 7 is a graph illustrating an amplitude modulation signal $V_N$ generated by combining the voltage signal $V_a$ (see FIG. 5) and the voltage signal $V_b$ (see FIG. 6). The voltage signal $V_a$ is applied to the first electrode 102a, and the voltage signal $V_b$ is applied to the second electrode 102b. As a result, in a region where the electrostatic capacitance $C_{NE}$ (see FIG. 4) is formed between each of the first electrode 102a and the second electrode 102b and the tactile presentation knob 3, charging and discharging are repeated according to the amplitude modulation signal $V_N$ having a maximum amplitude $V_H$ that is approximately twice the amplitude $V_L$. As a result, an electrostatic force corresponding to the amplitude modulation signal $V_N$ having the maximum amplitude $V_H$ is applied to the tactile presentation knob 3 that is in contact with the first electrode 102a and the second electrode 102b via dielectric layer 106. The amplitude modulation signal $V_N$ has a beat frequency corresponding to a difference between the first frequency and the second frequency. Therefore, when the tactile presentation knob 3 rotates on the tactile presentation screen 150, a frictional force acting on the tactile presentation knob 3 changes at the above-described beat frequency. As a result, the tactile presentation knob 3 vibrates at a beat frequency. The user perceives the vibration of the tactile presentation knob 3 as a tactile sense obtained from the tactile presentation screen 150. As described above, the tactile presentation screen 150 included in the tactile presentation panel 100 is configured to generate a tactile sense by changing a frictional force applied to the tactile presentation knob 3 by controlling an electrostatic force applied to the tactile presentation knob 3.

As described above, the amplitude modulation signal $V_N$ having a voltage approximately twice that of each of the input voltage signal $V_a$ (see FIG. 5) and the voltage signal $V_b$ (see FIG. 6) is generated. In this manner, the amplitude modulation signal $V_N$ necessary for exerting a desired frictional force on the tactile presentation knob 3 can thus be generated by the voltage signal $V_a$ (see FIG. 5) and the voltage signal $V_b$ (see FIG. 6) having a voltage of approximately ½ of the amplitude modulation signal $V_N$. Therefore, as compared with a case where an amplitude modulation signal is directly input to the first electrodes 102a and the second electrodes 102b, the same electrostatic force can be generated at a voltage of ½, and low-voltage driving can be performed.

In order to present a sufficiently large tactile sense to the user, the maximum amplitude $V_H$ only needs to be sufficiently large in a manner corresponding to the tactile sense, and the amplitude $V_L$ may be a small value as compared with that. Therefore, the amplitude $V_L$ itself does not need to be as large as generating a sufficiently large tactile sense. As a result of the amplitude $V_L$ being set in this way, in a state where only one of the first electrode 102a and the second electrode 102b is in contact with the tactile presentation knob 3, the user hardly perceives a tactile sense regardless of how the frequencies of the voltage signal $V_a$ and the voltage signal $V_b$ are selected.

In order to facilitate positioning of the tactile presentation knob 3 across the first electrode 102a and the second electrode 102b, a pitch $P_E$ of the tactile electrodes 102 is preferably smaller than a diameter $R_{NE}$ of the contact surface CT. This will be described later in detail.

<Touch Panel>

Figure 8:
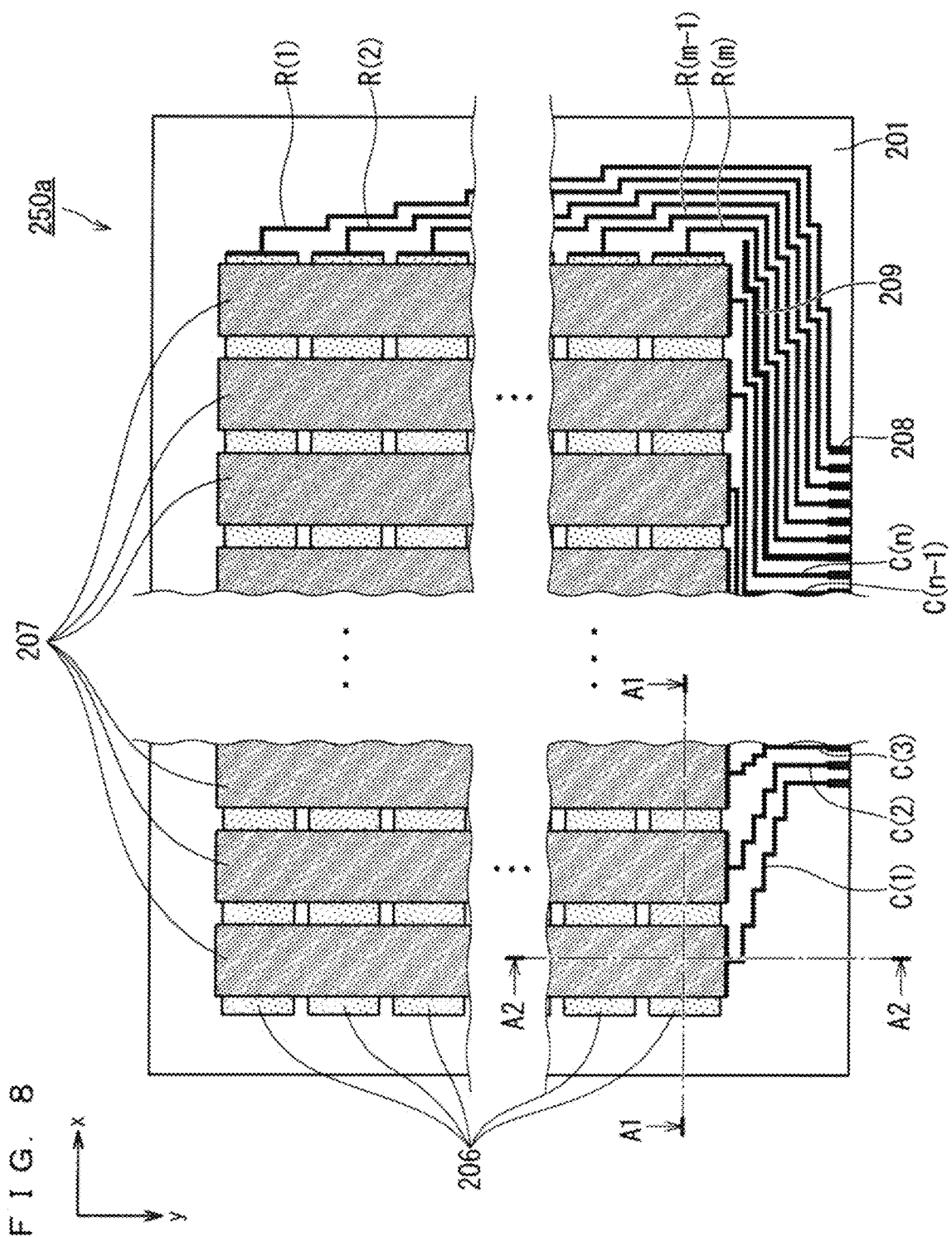
FIG. 8 is a plan view illustrating an example of a touch screen in FIG. 2.
Figure 9:
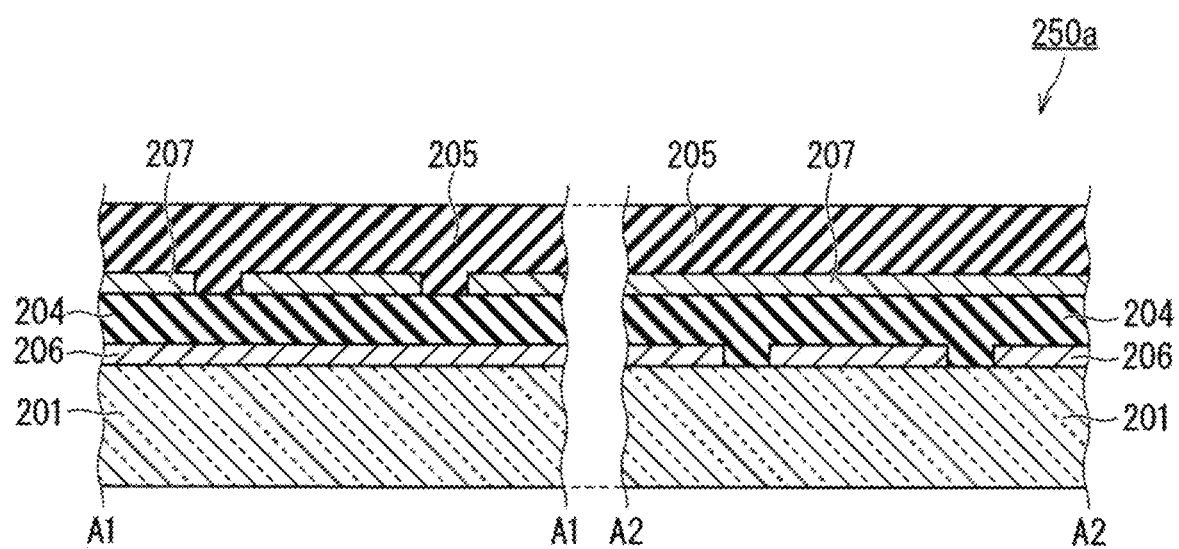
FIG. 9 is a partial cross-sectional view taken along line A1-A1 and line A2-A2 in FIG. 8.

FIG. 8 is a plan view illustrating a touch screen 250a of a capacitive sensing system as an example of the touch screen 250 (see FIG. 2). FIG. 9 is a partial cross-sectional view taken along line A1-A1 and line A2-A2 in FIG. 8.

The touch screen 250a includes a plurality of row direction wiring layers 206 and a plurality of column direction wiring layers 207. Each of the row direction wiring layers 206 includes a plurality of excitation electrodes 202 (see FIG. 2) electrically connected to each other, and each of the column direction wiring layers 207 includes a plurality of detection electrodes 203 (see FIG. 2) electrically connected to each other. In FIGS. 8 and 9, the row direction wiring layer 206 and the column direction wiring layer 207 are illustrated ignoring such a microstructure. The excitation electrode 202 (see FIG. 2) has a single layer film or a multilayer film of metal, or a multilayer structure including any of these and also using another conductive material. As the metal, for example, low resistance metal such as aluminum or silver is preferable. The same applies to the detection electrode 203 (see FIG. 2). By using metal as a wiring material, wiring resistance can be reduced. In contrast, a metal wiring, which is opaque, is easily visually recognized. In order to lower the visibility and increase the transmittance of the touch screen, a thin wire structure is preferably provided to the metal wiring. The thin wire structure is typically mesh-like.

Each of the row direction wiring layers 206 extends along the row direction (x direction in the diagram), and each of the column direction wiring layers 207 extends along the column direction (y direction in the diagram). A plurality of the row direction wiring layers 206 are arranged at intervals in the column direction, and a plurality of the column direction wiring layers 207 are arranged at intervals in the row direction. As illustrated in FIG. 8, in plan view, each of the row direction wiring layers 206 intersects a plurality of the column direction wiring layers 207, and each of the column direction wiring layers 207 intersects a plurality of the row direction wiring layers 206. The row direction wiring layer 206 and the column direction wiring layer 207 are insulated by the interlayer insulating layer 204.

The interlayer insulating layer 204 includes a single-layer film of an organic insulating film, a single-layer film of an inorganic insulating film, or a multilayer film. An inorganic insulating film is excellent for improving moisture resistance, and an organic insulating film is excellent for improving flatness. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

Each of the row direction wiring layers 206 of the touch screen 250a is connected to a touch screen terminal portion 208 by lead-out wiring layers R(1) to R(m). Each of the column direction wiring layers 207 is connected to the touch screen terminal portion 208 by lead-out wiring layers C(1) to C(n). The touch screen terminal portion 208 is provided on an end portion of the substrate 201.

The lead-out wiring layers R(1) to R(m) are arranged outside a detectable area, and extend to corresponding electrodes in order from a layer closer to the center of the arrangement of the touch screen terminal portions 208 so as to obtain a substantially shortest distance. The lead-out wiring layers R(1) to R(m) are arranged as densely as possible while securing mutual insulation. The same applies to the lead-out wiring layers C(1) to C(n). With such arrangement, it is possible to suppress an area of a portion outside the detectable area of the substrate 201.

A shield wiring layer 209 may be provided between a group of the lead-out wiring layers R(1) to R(m) and a group of the lead-out wiring layers C(1) to C(n). In this manner, generation of noise in one of the groups due to the influence from the other is suppressed. Further, the influence of electromagnetic noise generated from the display panel 300 (see FIG. 2) on the lead-out wiring layer can be reduced. The shield wiring layer 209 may be formed of the same material as the row direction wiring layer 206 or the column direction wiring layer 207 at the same time.

The insulating layer 205 is provided on the substrate 201 so that the touch screen terminal portion 208 is exposed, and covers the row direction wiring layer 206, the column direction wiring layer 207, and the interlayer insulating layer 204. The insulating layer 205 can be formed of the same material as the interlayer insulating layer 204. In a case where the display panel 300 is a liquid crystal panel, an upper polarizing plate subjected to anti-glare treatment for the liquid crystal panel may be attached onto a portion through which light for display is transmitted of the insulating layer 205.

Figure 10:
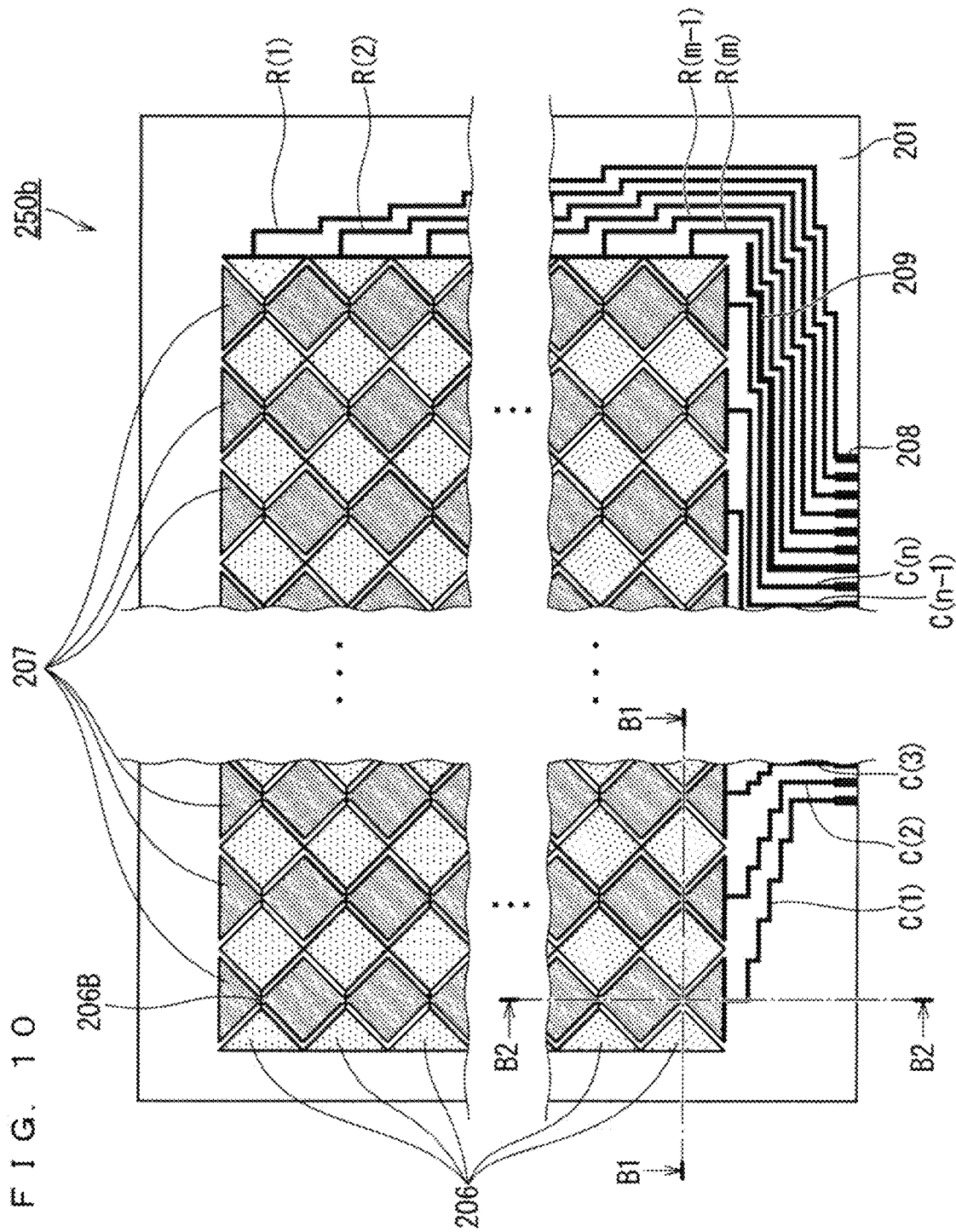
FIG. 10 is a plan view illustrating an example of the touch screen in FIG. 2.
Figure 11:
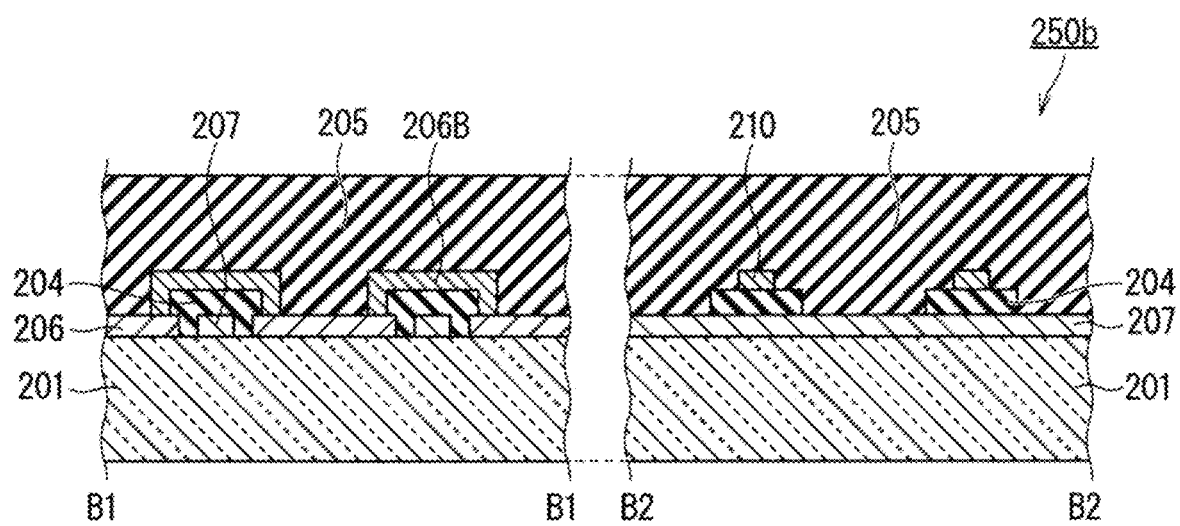
FIG. 11 is a partial cross-sectional view taken along line B1-B1 and line B2-B2 in FIG. 10.

FIG. 10 is a plan view illustrating a touch screen 250b of a capacitive sensing system as an example of the touch screen 250 (see FIG. 2). FIG. 11 is a partial cross-sectional view taken along line B1-B1 and line B2-B2 in FIG. 10. In the example of FIGS. 10 and 11, what is called a diamond structure is employed.

The row direction wiring layer 206 and the column direction wiring layer 207 are arranged on the same layer. Each of the column direction wiring layers 207 has a plurality of diamond-shaped electrodes connected to each other as the detection electrode 203. The row direction wiring layer 206 includes, as the excitation electrode 202, a plurality of diamond-shaped electrodes separated from each other, and a bridge 206B electrically connecting adjacent diamond-shaped electrodes. The interlayer insulating layer 204 is arranged so as to insulate the bridge 206B from the column direction wiring layer 207. Note that a bridge structure may be applied not to the row direction wiring layer but to the column direction wiring layer. Since electrical resistance of the wiring layer tends to become high as a bridge is formed, the bridge structure is preferably applied to a shorter one of the column direction wiring layer and the row direction wiring layer.

As a material of the row direction wiring layer 206 and the column direction wiring layer 207, for example, a transparent conductive film such as indium tin oxide (ITO) is used. Since ITO has translucency, the wiring layer is less likely to be visually recognized by the user. Since a transparent conductive film such as ITO has a relatively high electric resistance, the transparent conductive film is suitable for application to a small touch screen in which wiring resistance is not a problem. Further, since a transparent conductive film such as ITO is likely to have a wiring disconnected due to corrosion with another metal wiring, consideration for moisture resistance and waterproofness is required in order to prevent corrosion.

Note that, although the case where the structure of the touch screen and the structure of the display panel are independent is described above, they may be inseparably integrated. For example, in the case of what is called an on-cell touch panel, a touch screen is directly formed on a substrate (typically, a color filter substrate) of the display panel 300 without using the substrate 201. In a case of what is called an in-cell touch panel, a touch screen is formed between two transparent insulating substrates (not illustrated) included in the display panel 300.

Figure 12:
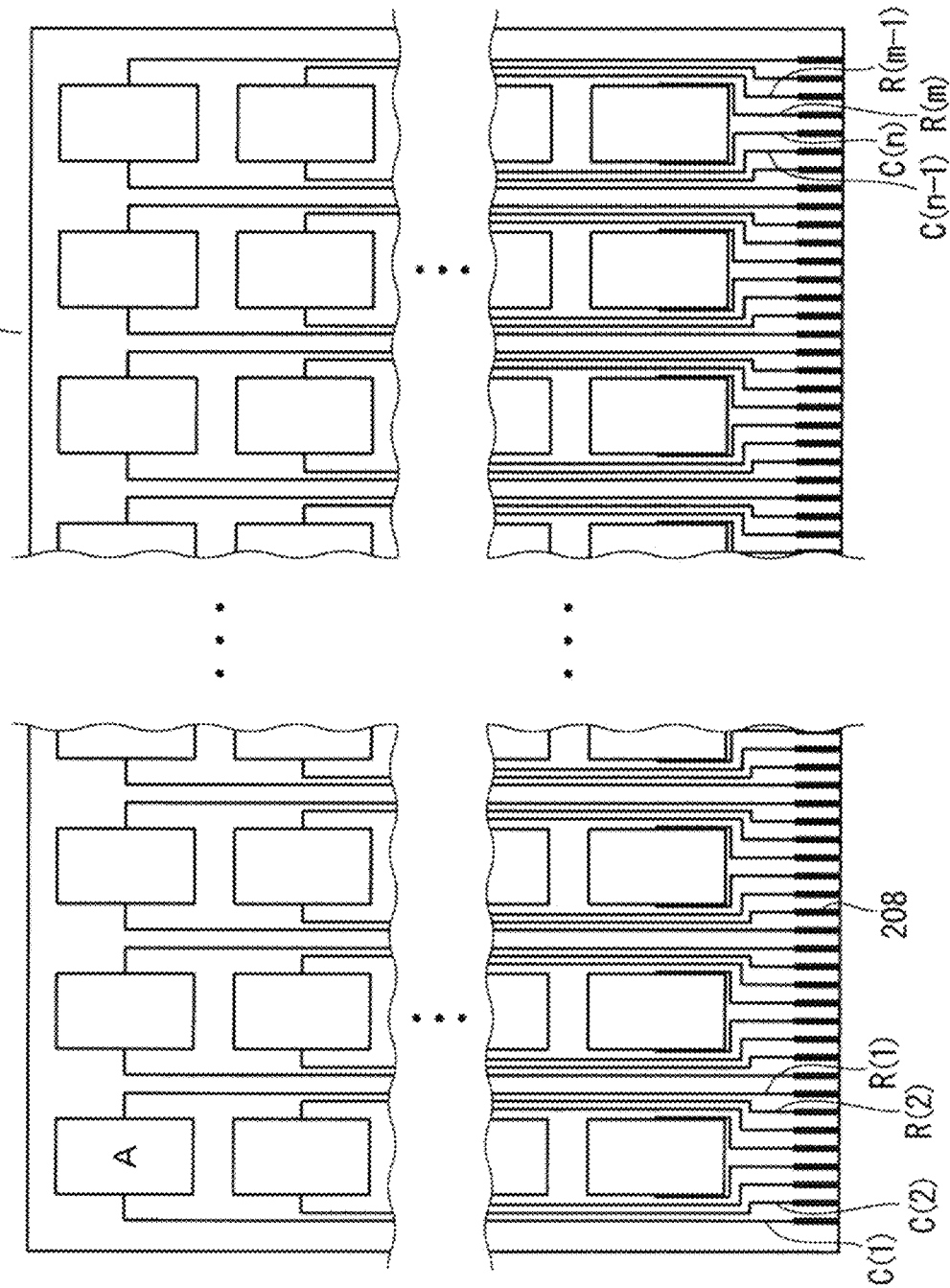
FIG. 12 is a plan view schematically illustrating a configuration of the touch screen having a segment structure according to the first embodiment.
Figure 13:
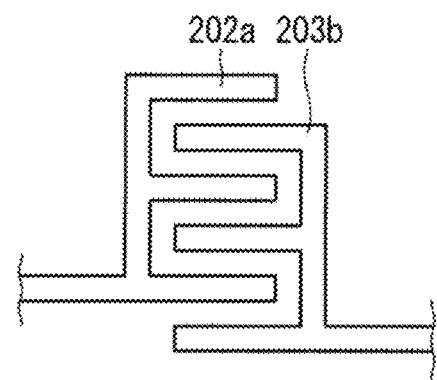
FIG. 13 is a plan view schematically illustrating an example of shapes of an excitation electrode and a detection electrode in a touch screen having a segment structure according to the first embodiment.
Figure 14:
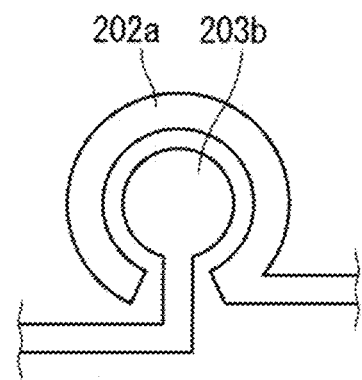
FIG. 14 is a plan view schematically illustrating an example of shapes of an excitation electrode and a detection electrode in a touch screen having a segment structure according to the first embodiment.

Further, in the above touch screen, the detection structure including the row direction wiring layer 206 and the column direction wiring layer 207 has been described. However, the present invention is not limited to this structure. For example, FIG. 12 is a plan view schematically illustrating a configuration of a touch screen 250c having a detection structure in which segments each including a detection electrode and an excitation electrode are arranged in a matrix. FIGS. 13 and 14 illustrate an example of pattern shapes of an excitation electrode 202a and a detection electrode 203b arranged in a segment of an area A in FIG. 12. The touch screen 250c having a segment structure in which segments each including a set of the excitation electrode 202a and the detection electrode 203b as illustrated in FIGS. 13 and 14 are arranged in a matrix and individually driven is used. Both a tactile presentation panel 100a and the touch panel 200 can also be used by switching switches in a drive circuit.

<Pressure Sensitive Sensor>

The pressure sensitive sensor 216 illustrated in FIG. 1 will be described. In general, the pressure sensitive sensor 216 includes a system of detecting a pressure applied to a diaphragm (barrier membrane) made from semiconductor silicon (Si) as deformation of a film, an electrostatic capacitance system of detecting deformation of a display panel, a touch panel, or the like generated according to a pressing force by a change in electrostatic capacitance, a resistance system of detecting a resistance change of a metal wire due to strain according to a pressing force, and the like.

In the case of the electrostatic capacitance system, for example, the pressure sensitive sensors 216 are installed at four symmetrical positions on a diagonal line on a surface opposite to a display surface of the display panel 300. In this case, when an operation surface of the tactile presentation touch display 1 is pressed by the tactile presentation knob 3, the tactile presentation touch display 1 is bent in a direction opposite to the operation surface by the pressing force, or the tactile presentation touch display 1 slightly moves in a direction opposite to the operation surface. The pressure sensitive sensor 216 detects the pressing force by detecting a change in electrostatic capacitance generated as an interval between the capacitance detection electrodes arranged in the pressure sensitive sensor 216 becomes small. Each of the capacitance detection electrodes in the pressure sensitive sensor 216 is parallel to the operation surface of the tactile presentation touch display 1 and is installed at an optional interval.

Even in the case of a system other than the electrostatic capacitance system, a shape change due to a pressing force of any of members constituting the tactile presentation touch display 1 is detected so that the pressing force is detected.

Note that, in FIG. 1, the pressure sensitive sensor 216 is arranged on the lower side (the side opposite to the display surface) of the display panel 300. However, the present invention is not limited to this configuration. The pressure sensitive sensor 216 is preferably arranged at a position where reproducibility of a relationship between a shape change and a pressing force in the structure of the tactile presentation touch display 1 is excellent, a shape change caused by a pressing force is large, and the sensitivity of the pressure sensitive sensor 216 is most excellent. Further, the pressure sensor is not limited to the pressure sensitive sensor 216, and may be, for example, a sheet-like pressure sensor in which sensors are arranged in a matrix on a back surface of the display panel 300, or may be a pressure sensor of a system optimum for detection.

<Tactile Presentation Panel>

Figure 15:
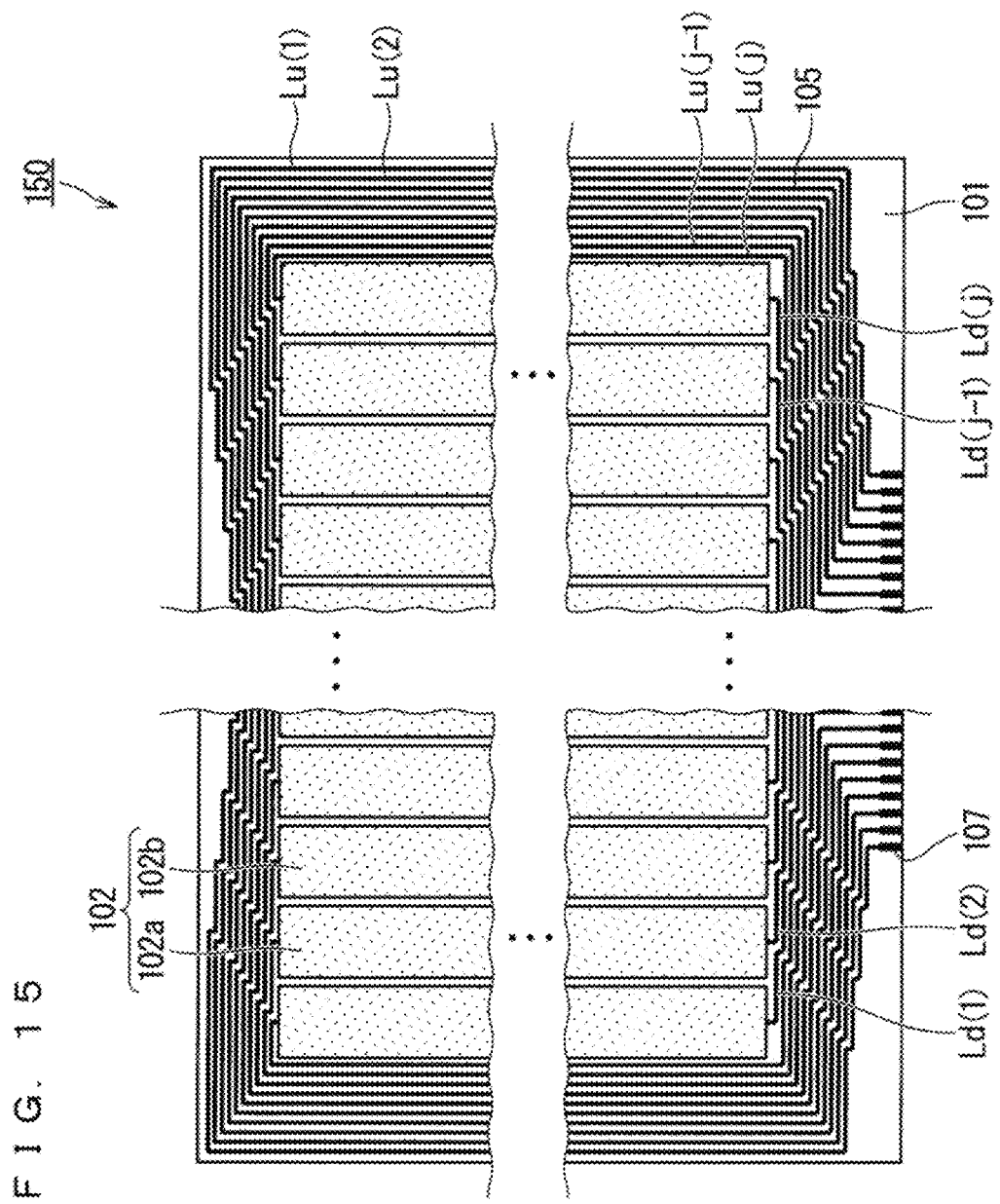
FIG. 15 is a plan view schematically illustrating a configuration of a tactile presentation screen of FIG. 2.
Figure 16:
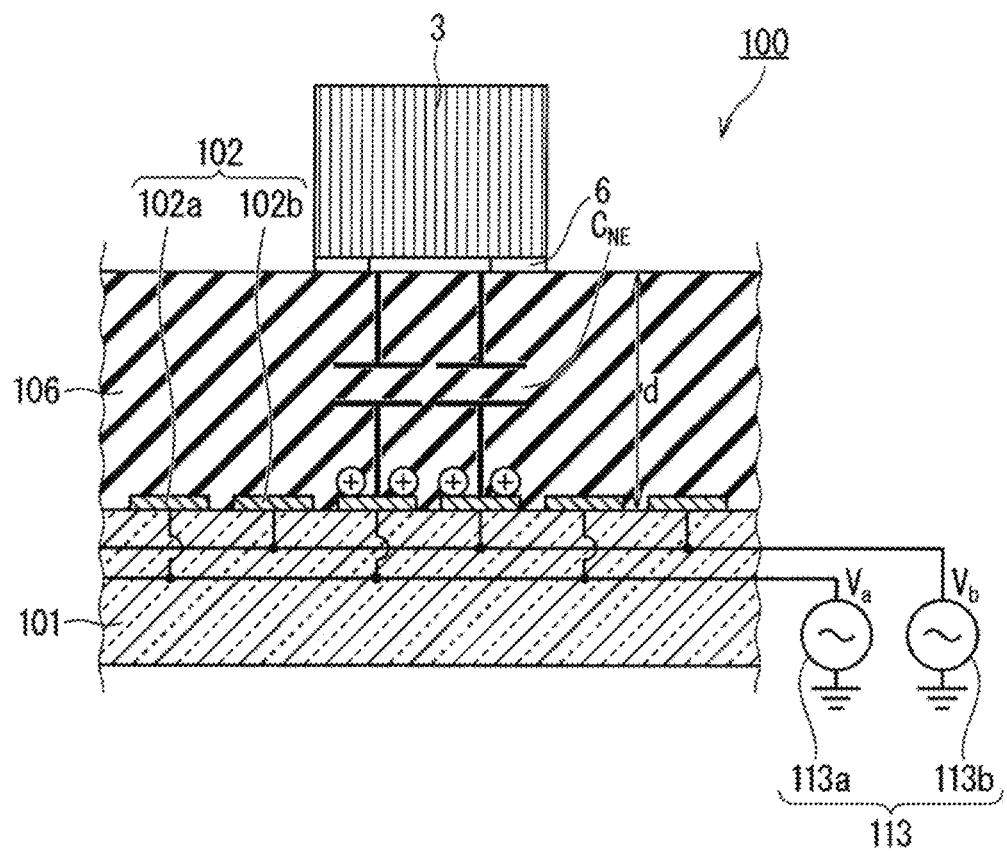
FIG. 16 is a schematic diagram for explaining electrostatic capacitance formed between the tactile electrode and an indicator included in the tactile presentation panel in FIG. 2.

FIG. 15 is a plan view schematically illustrating a configuration of the tactile presentation screen 150. FIG. 16 is a schematic diagram illustrating formation of the electrostatic capacitance $C_{NE}$ between the tactile electrode 102 and the tactile presentation knob 3.

As described above, the tactile presentation screen 150 includes the transparent insulating substrate 101, the tactile electrode 102, and the dielectric layer 106. Furthermore, a tactile presentation panel terminal portion 107 is provided in an end portion of the transparent insulating substrate 101, and a plurality of lead-out wiring layers 105 are arranged on the transparent insulating substrate 101. The dielectric layer 106 is provided such that the tactile presentation panel terminal portion 107 is exposed. The tactile electrode 102 is connected to the tactile presentation panel terminal portion 107 via the lead-out wiring layer 105. The voltage supply circuit 110 (see FIG. 2) is connected to the tactile presentation panel terminal portion 107 via the FPC 108 (see FIG. 1). Note that details of the lead-out wiring layer 105 will be described later.

Each of the tactile electrodes 102 extends along the extending direction (longitudinal direction in FIG. 15). A plurality of the tactile electrodes 102 are arranged at intervals along the arrangement direction (lateral direction in FIG. 15). In the example of FIG. 15, the transparent insulating substrate 101 has a rectangular shape having long sides and short sides. Therefore, the tactile presentation screen 150 also has long sides and short sides corresponding to the transparent insulating substrate 101. In the example of FIG. 12, the arrangement direction is along the long side. In a case where the horizontal direction of the tactile presentation screen 150 as viewed by the viewer is along the long side, the arrangement direction is along the horizontal direction.

Figure 17:
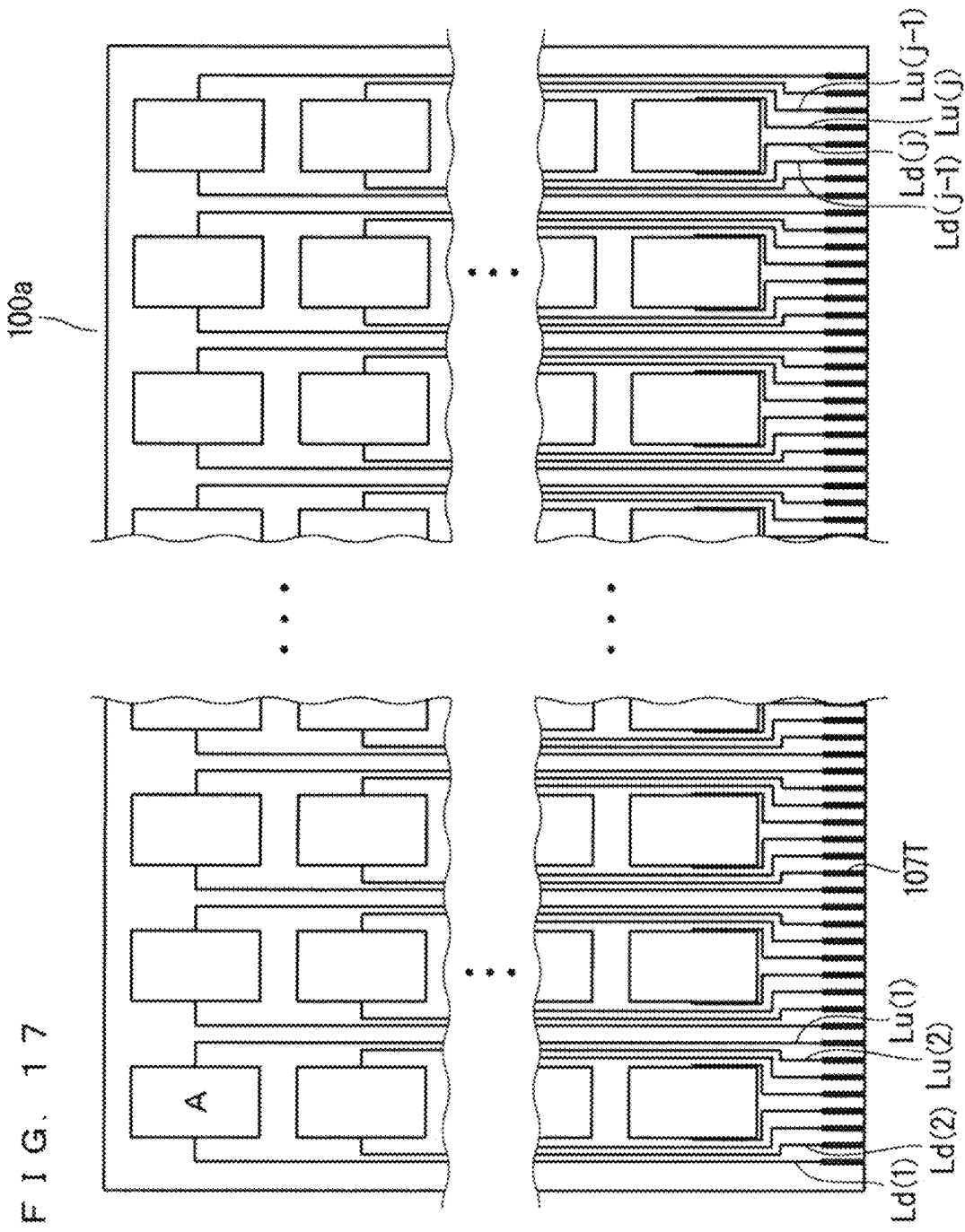
FIG. 17 is a plan view schematically illustrating a configuration of the tactile presentation panel having a segment structure according to the first embodiment.
Figure 18:
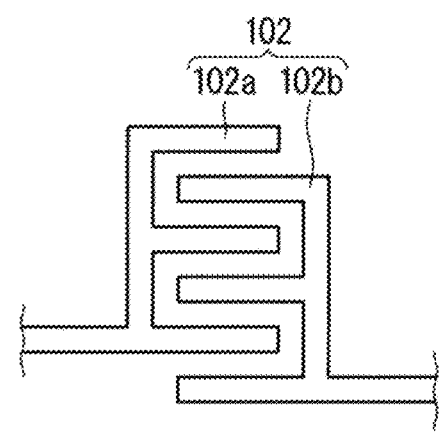
FIG. 18 is a plan view schematically illustrating an example of a shape of the tactile electrode of the tactile presentation panel having a segment structure according to the first embodiment.
Figure 19:
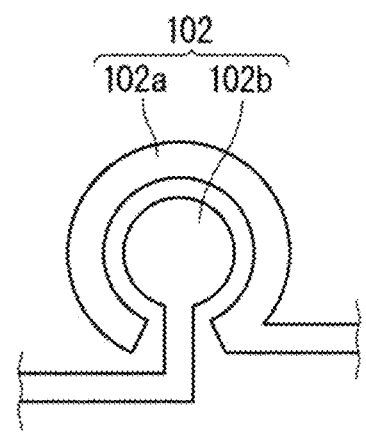
FIG. 19 is a plan view schematically illustrating an example of a shape of the tactile electrode of the tactile presentation panel having a segment structure according to the first embodiment.

Although the example in which the tactile electrodes 102 extend in the extending direction and are arranged along the arrangement direction on the tactile presentation screen 150 is described above, the structure of the tactile electrodes 102 is not limited to this. For example, the configuration may be such that a plurality of segments are arranged in a matrix like the tactile presentation panel 100a illustrated in FIG. 17. FIGS. 18 and 19 illustrate an example of a pattern shape of the tactile electrodes 102 arranged in a segment of an area A in FIG. 17. The shape of the tactile electrode 102 is not limited to the shape illustrated in FIGS. 18 and 19, and may be any structure in which mutual capacitance in the same area is larger than mutual capacitance between electrodes in different areas in a structure in which the first electrode 102a and the second electrode 102b are adjacent to each other. Specifically, the first electrode 102a and the second electrode 102b in the same area are preferably arranged such that a distance between the first electrode 102a and the second electrode 102b is smaller than a distance between the first electrode 102a and the second electrode 102b different areas. In this manner, the influence of capacitance formed between the detection electrode 203 of the touch panel 200 and the tactile electrode 102 on touch detection accuracy can be suppressed, so that wiring resistance of the tactile electrode 102 can be further reduced, and tactile strength can be further improved.

The larger the electrostatic capacitance $C_{NE}$ formed between the tactile electrode 102 and the tactile presentation knob 3 is, the stronger a tactile sense can be presented. From this viewpoint, it is preferable that the area of the tactile electrode 102 is large. In a case where priority is given to the size of the area of the tactile electrode 102, it is difficult to make the tactile electrode 102 less likely to be visually recognized due to imparting of a microstructure to the tactile electrode 102. In order to make the tactile electrode 102 less likely to be visually recognized while making the area of the tactile electrode 102 large, the tactile electrode 102 may be formed of a transparent conductive film. A typical material of the transparent conductive film is ITO. Since a transparent conductive film such as ITO has a relatively high electric resistance as compared with metal, the transparent conductive film is suitable for application to a small touch screen in which wiring resistance is not a problem. When application to a large touch screen where wiring resistance is a problem is necessary, the ITO film thickness is made large or the content of a dopant is increased to reduce the resistivity. In this case, since a light absorption rate of ITO may change and the touch screen may appear colored, it may be necessary to adjust the color tone of the display. Further, since a transparent conductive film such as ITO is likely to have a wiring disconnected due to corrosion with another metal wiring, consideration for moisture resistance and waterproofness is required in order to prevent corrosion in a case where wiring resistance of the electrode is lowered by a lamination structure of with other metal.

Instead of using the transparent conductive film as described above, the tactile electrode 102 may be a single layer film or a multilayer film of metal, or an electrode (hereinafter, also referred to as "metal film-containing electrode") having a multilayer structure including any of these and also using another conductive material. As the metal, for example, low resistance metal such as aluminum or silver is preferable. By using the metal film-containing electrode, wiring resistance can be reduced. In contrast, a metal film, which is opaque, is easily visually recognized. Therefore, in order to make the metal film less likely to be visually recognized, a thin wire structure may be imparted to the metal film-containing electrode. The thin wire structure is typically mesh-like.

The dielectric layer 106 includes a single-layer film of an organic insulating film, a single-layer film of an inorganic insulating film, or a multilayer film. In a case of a multilayer film, different types of organic insulating films may be laminated, or different types of inorganic insulating films may be laminated, or an organic insulating film and an inorganic insulating film may be laminated. The inorganic insulating film has high moisture impermeability, high hardness, and high abrasion resistance. Since the tactile presentation knob 3 rotates on the dielectric layer 106, the dielectric layer 106 requires high abrasion resistance. The organic insulating film is preferable for obtaining high flatness, but has low hardness and low abrasion resistance. For this reason, in order to obtain both high flatness and high abrasion resistance, it is preferable to form the inorganic insulating film on the organic insulating film. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

The electrostatic capacitance $C_{NE}$ is represented by Equation (1) below.

$$C_{NE} = Q/V = \varepsilon S/d \quad (1)$$

Here, Q is a charge amount stored in each of a conductive elastic portion 6 and the tactile electrode 102, V is a voltage between the tactile presentation knob 3 and the tactile electrode 102, $\varepsilon$ is a dielectric constant of the dielectric layer 106, S is a contact area between the conductive elastic portion 6 and the tactile electrode 102 via the dielectric layer 106, and d is a thickness of the dielectric layer 106. The electrostatic capacitance $C_{NE}$ is proportional to the dielectric constant $\varepsilon$ and is inversely proportional to the film thickness d.

From Equation (1) above, the dielectric constant $\varepsilon$ is preferably high in order to make the electrostatic capacitance $C_{NE}$ large. Specifically, the dielectric layer 106 preferably includes a film (hereinafter, also referred to as a "high dielectric constant insulating film") having a relative dielectric constant of 10 or more. In the high dielectric constant insulating film, a state in which positive and negative charges are displaced into a material by an electric field applied from the outside occurs (this is generally referred to as dielectric polarization). In the dielectric polarization, charges (generally referred to as polarization charges) generated by polarization are maintained while voltage is held, and when the voltage decreases, the polarization charges decrease and the dielectric polarization decreases, and when the applied voltage is set to zero volt, the dielectric polarization also disappears. The direction of the dielectric polarization can be changed by an electric field. The high dielectric constant insulating film may be used as a single layer, or may be used as a multilayer film by being laminated with another inorganic insulating film or organic insulating film of a low dielectric constant, or another high dielectric constant insulating film. In general, since a refractive index is higher as a dielectric constant is higher, a lamination structure of a high refractive index film and a low refractive index film is obtained as a high dielectric constant insulating film and a low dielectric constant insulating film are laminated. With this lamination structure, the dielectric layer 106 can also function as an antireflection film.

Further, from Equation (1) above, the thickness d is preferably small in order to make the electrostatic capacitance $C_{NE}$ large. By laminating a high dielectric constant insulating film and an organic insulating film, the film thickness of the organic insulating film can be reduced while sufficient insulation is secured. In this manner, the thickness d of the dielectric layer 106 can be reduced.

Assuming that the tactile electrode has a matrix structure (that is, a structure having an X electrode and a Y electrode crossing each other) (see, for example, Japanese Patent Application Laid-Open No. 2015-097076), a step, that is, unevenness is generated at an intersection between the X electrode and the Y electrode. This unevenness is flattened if the thickness of the insulating layer covering the unevenness is large. However, the thickness of the insulating layer is limited in order to avoid an excessive decrease in the electrostatic capacitance $C_{NE}$. For this reason, unevenness may occur on a front surface of the tactile presentation screen. When the texture feeling of the unevenness is mixed with the texture feeling caused by an electrostatic force from the tactile electrode, it is difficult to give an intended texture feeling to the user. In a case where an organic insulating film having an effect of flattening a surface shape is used as the dielectric layer 106, although occurrence of the unevenness is avoided, a large thickness is required to some extent for flattening, and a decrease in the electrostatic capacitance $C_{NE}$ cannot be avoided.

In contrast, according to the first embodiment, since the tactile electrode 102 has no intersection, the size of the unevenness can be suppressed to about the thickness of the tactile electrode 102. This makes it possible to thin the organic film having a flattening effect or to apply a high dielectric constant insulating film having a low flattening effect. In this manner, the electrostatic capacitance $C_{NE}$ can be made larger than that in the case of the matrix structure. Further, since a contact surface with the tactile presentation knob 3 of the tactile presentation screen 150 has less unevenness, a tactile sense caused by unevenness of a surface of the tactile presentation screen 150 is not given to the tactile presentation knob 3 when a voltage signal is not applied. For this reason, a tactile sense of the tactile presentation knob 3 when a voltage signal is applied becomes clearer.

Further, even if the electrostatic capacitance $C_{NE}$ is the same, if the tactile presentation knob 3 is slippery on the dielectric layer 106, a change in an electrostatic force between the tactile presentation knob 3 and the tactile electrode 102 is easily perceived by the user as a change in a frictional force. In this manner, a larger tactile sense can be given to the user. In order to make the tactile presentation knob 3 slippery on the dielectric layer 106, it is necessary to suppress adhesion between the dielectric layer 106 and the tactile presentation knob 3. For this purpose, for example, a film having higher water repellency than the inside of the dielectric layer 106 may be provided on an outermost surface of the dielectric layer 106, on a contact surface with the dielectric layer 106 of the conductive elastic portion 6, or both.

<Electrode Pitch>

Figure 21:
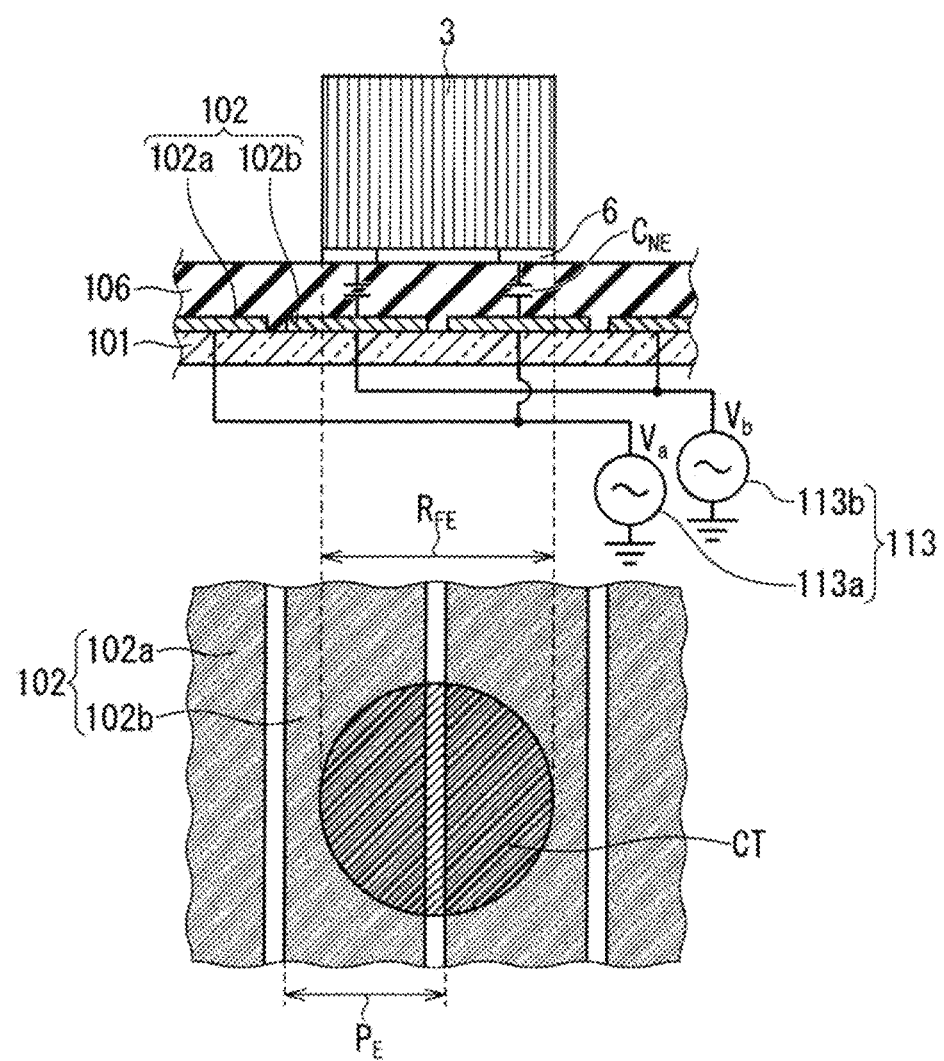
FIG. 21 is a schematic diagram for explaining electrostatic capacitance formed between the tactile electrode and the tactile presentation knob in a case where a pitch of the tactile electrode included in the tactile presentation panel in FIG. 2 is smaller than a diameter of the tactile presentation knob.

FIG. 20 is a schematic diagram for explaining the electrostatic capacitance $C_{NE}$ formed between the tactile electrode 102 and the tactile presentation knob 3 in a case where the pitch $P_E$ of the tactile electrode 102 is larger than a diameter $R_{FE}$ of the tactile presentation knob 3. FIG. 21 is a schematic diagram for explaining the electrostatic capacitance $C_{NE}$ formed between the tactile electrode 102 and the tactile presentation knob 3 in a case where the pitch $P_E$ of the tactile electrode 102 is smaller than the diameter $R_{FE}$.

Figure 22:
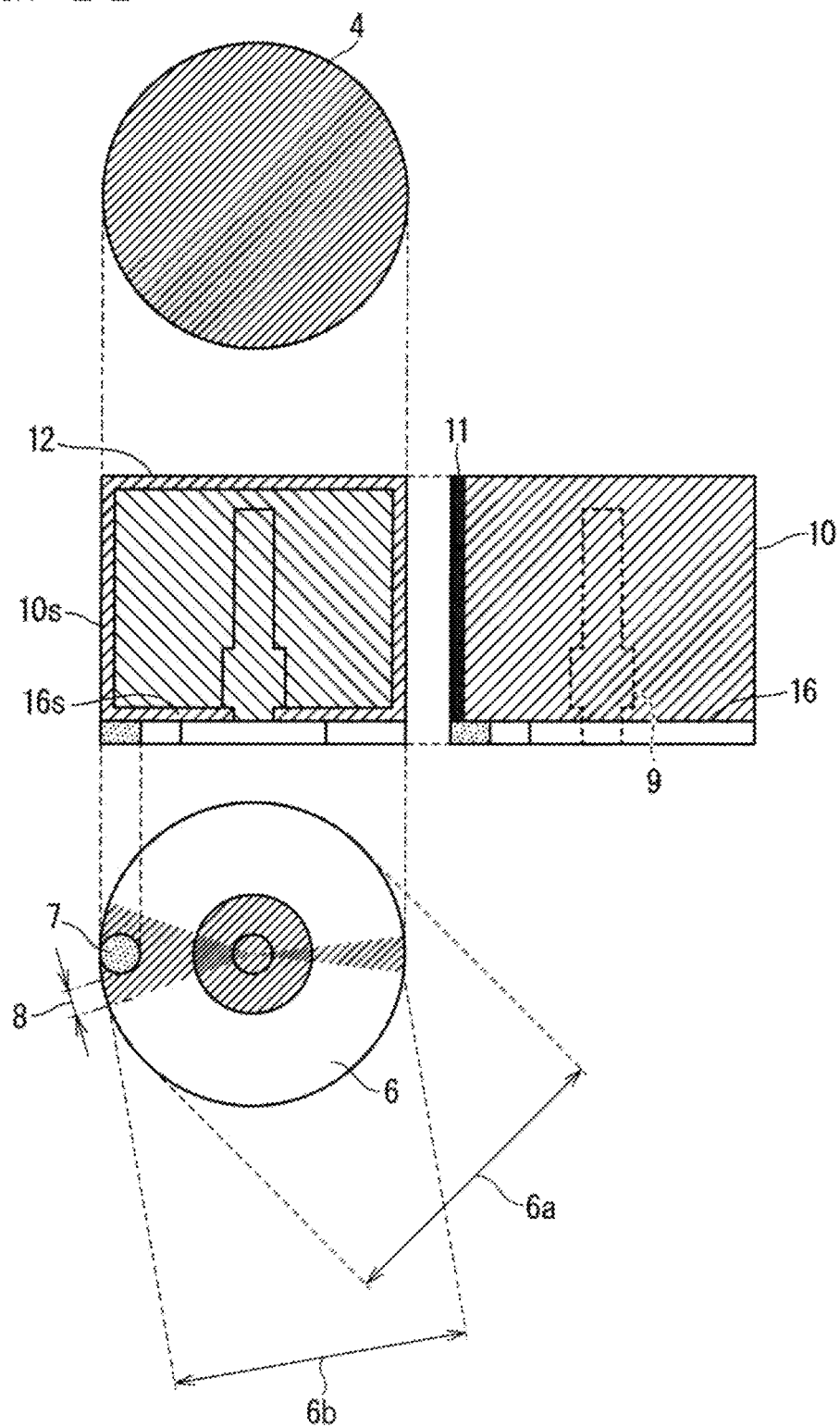
FIG. 22 is a schematic view illustrating a configuration of a rotation portion of the tactile presentation knob according to the first embodiment.

In the first embodiment, as described above, an electrostatic force corresponding to the amplitude modulation signal $V_N$ (see FIG. 7) is generated by applying the voltage signal $V_a$ (see FIG. 5) and the voltage signal $V_b$ (see FIG. 6) having different frequencies to the first electrode 102a and the second electrode 102b adjacent to each other. In this manner, a frictional force between the dielectric layer 106 and the tactile presentation knob 3 changes in accordance with a beat frequency of the amplitude modulation signal $V_N$, and the user perceives this change as a tactile sense. In the state illustrated in FIG. 20, only the voltage signal $V_a$ acts on the tactile presentation knob 3, and the voltage signal $V_b$ does not act on the tactile presentation knob 3. Therefore, the amplitude modulation signal $V_N$ is not generated, and no tactile sense is generated. In contrast, in a case where the tactile presentation knob 3 is located above the boundary between the first electrode 102a and the second electrode 102b, a tactile sense is generated. Therefore, in the configuration of FIG. 20, depending on the position of the tactile presentation knob 3, there are a position where a tactile sense is generated and a position where no tactile sense is generated. In contrast, in the state illustrated in FIG. 21, both the voltage signal $V_a$ and the voltage signal $V_b$ act on the tactile presentation knob 3 regardless of the position of the tactile presentation knob 3. In this manner, the amplitude modulation signal $V_N$ is generated. Therefore, in the configuration of FIG. 21, a tactile sense can be felt regardless of the position of the tactile presentation knob 3, and the position of the tactile presentation knob 3 can be optionally set. That is, in order that the tactile presentation knob 3 is likely to be positioned so as to be across the first electrode 102a and the second electrode 102b, in a case where the conductive elastic portion 6 is divided, for example, as illustrated in FIG. 22 to be described later, a width 6b of the conductive elastic portion 6 is preferably larger than the pitch $P_E$ of the tactile electrodes 102. Further, in a case where the conductive elastic portion 6 is not divided into a plurality of portions, an outer diameter 6a of the conductive elastic portion 6 is preferably larger than the pitch $P_E$ of the tactile electrodes 102.

<Structure of Tactile Presentation Knob>

Figure 23:
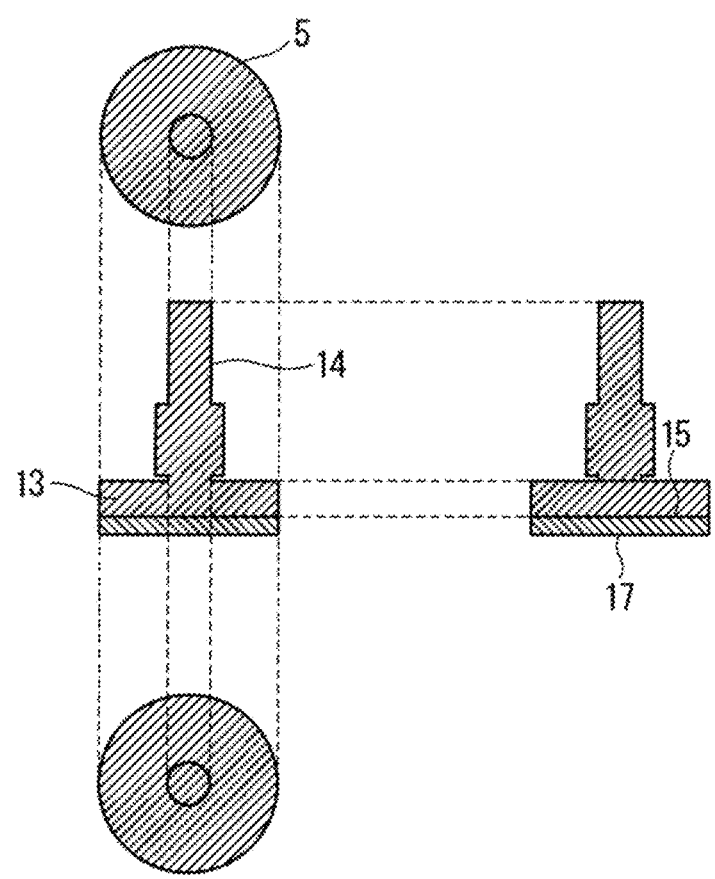
FIG. 23 is a schematic view illustrating a configuration of a fixing portion in a case where a position where the tactile presentation knob according to the first embodiment is placed is fixed at one place.
Figure 24:
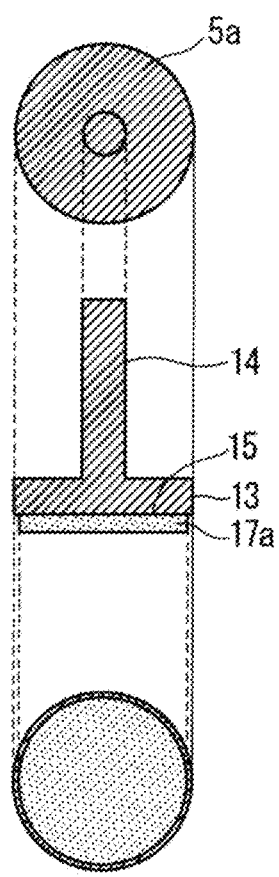
FIG. 24 is a schematic view illustrating a configuration of a rotation shaft portion in a case where a position where the tactile presentation knob according to the first embodiment is placed moves.

FIG. 22 is a schematic diagram illustrating a structure of a rotation portion 4 of the tactile presentation knob 3. FIG. 23 is a schematic diagram of a fixing portion 5 when the rotation portion 4 is placed on a contact surface of the tactile presentation panel 100 and rotated in a case where the position where the tactile presentation knob 3 is placed is fixed at one position. FIG. 24 is a schematic diagram of a rotation shaft portion 5a that suppresses horizontal movement when the rotation portion 4 of the tactile presentation knob 3 is placed on the contact surface of the tactile presentation panel 100 and rotated. The rotation portion 4 and the fixing portion 5 (rotation shaft portion 5a) are both made from metal such as aluminum, SUS, or copper, and resin such as polyvinyl chloride, polystyrene, ABS resin, AS resin, acrylic resin, polyethylene, polypropylene, polyvinyl alcohol, polyvinylidene chloride, polyethylene terephthalate, polycarbonate, modified polyphenylene ether, polyamide, polybutylene terephthalate, polyacetal, ultrahigh molecular weight polyethylene, polyarylate, polysulfone, polyethersulfone, polyamideimide, polyetherimide, thermoplastic polyimide, polyphenylene sulfide, liquid crystalline polymer, polyetheretherketone, or fluororesin. Since an operation feeling and a tactile sense change depending on the weight of the tactile presentation knob 3, the material is selected according to the user's preference, a use environment of the tactile presentation knob 3, the purpose of use, and the like. Since a rotation portion side surface 10 needs to be electrically connected to the conductive elastic portion 6 and an indicator 2 (see FIG. 31), a surface portion 10s in contact with the indicator 2 of the rotation portion side surface 10 and a boundary portion conductive portion 16s are made from metal or a conductive resin material (resistance is desirably $10^3\Omega$ or less). A resistance value of the surface portion 10s and the boundary portion conductive portion 16s are desirably set to such a value by which wiring resistance of the tactile electrode 102, resistance of the conductive elastic portion 6, and capacitance C formed between the tactile electrode 102 and the conductive elastic portion 6 in an RC circuit formed with the dielectric layer 106 become largest.

The shape of a shaft portion 14 and the shape of a hole portion of a fixing hole 9 are the same cylindrical shape. The tactile presentation knob 3 is formed by inserting the shaft portion 14 of the fixing portion 5 (rotation shaft portion 5a) into the fixing hole 9 of the rotation portion and integrating them. For example, as illustrated in FIGS. 22 and 23, the rotation portion 4 and the shaft portion 14 having unevenness may be prevented from being separated by fitting the shaft portion 14 into the fixing hole 9. A gap between the shaft portion 14 and the fixing hole 9 is desirably as narrow as possible within a range in which the rotation portion 4 smoothly turns. When the gap between the shaft portion 14 and the fixing hole 9 is narrow, a fluctuation of a rotation shaft when the tactile presentation knob 3 is rotated becomes small, and a tactile sense different from a tactile sense originally supposed to be given to the tactile presentation knob 3, such as a shake and vibration of the rotation portion 4 caused by the fluctuation of the rotation shaft, given to the indicator 2 is suppressed, and a tactile sense imparted to the user becomes clearer. In order for the rotation portion 4 to rotate smoothly, a surface of the shaft portion 14 and a surface of an inner surface portion of the fixing hole 9 desirably have as less unevenness as possible, and surface roughness Ra is desirably 0.5 μm or less. An inner diameter tolerance of the fixing hole 9 is desirably 0 to +0.5 mm, and an outer diameter tolerance of the shaft portion 14 is desirably −0.0005 mm.

The fixing portion 5 (rotation shaft portion 5a) serves as a rotation shaft when rotation portion 4 rotates, and serves to keep an operation surface of the tactile presentation panel 100 and a rotation shaft of the rotation portion 4 perpendicular to each other. For this reason, the center of the shaft portion 14 of the fixing portion 5 (rotation shaft portion 5a) is orthogonal to a bottom surface portion 15 and an adhesive portion 17 (shaft structure holding portion 17a), a bottom surface of the adhesive portion 17 (shaft structure holding portion 17a) is flat, and a contact surface of the conductive elastic portion 6 with the tactile presentation panel 100 and the adhesive portion 17 (shaft structure holding portion 17a) are located on the same plane. Note that, although FIG. 23 illustrates the case where the diameter of the adhesive portion 17 and the diameter of a fixing table 13 are the same, the diameter of the shaft structure holding portion 17a and the diameter of the fixing table 13 may be different as illustrated in FIG. 24.

The surface portion 10s and the boundary portion conductive portion 16s on the rotation portion side surface 10 of the rotation portion 4 with which the indicator 2 is in contact when the rotation portion 4 is rotated are composed of a conductive material, and are also electrically connected to the conductive elastic portion 6 and a position detection unit 7. Whether or not the user is in contact with a surface of the rotation portion 4 is detected, and accumulation of electric charges in the conductive elastic portion 6 is suppressed. The surface portion 10s and the boundary portion conductive portion 16s are composed of the same material as the conductive elastic portion 6. In particular, it is desirable to use metal having low resistance, and the surface portion 10s and the boundary portion conductive portion 16s may be formed by forming the rotation portion 4 with resin or the like and then performing coating with metal plating or the like. Details will be described later.

The conductive elastic portion 6 is a conductor that forms electrostatic capacitance with the tactile electrode 102. The conductive elastic portion 6 is divided into two or more portions, and prevents a decrease in tactile strength. Details of this effect will be described later. Since the conductive elastic portion 6 has elasticity, there is an effect of suppressing a decrease in tactile strength due to a decrease in adhesion. When the adhesion between the conductive elastic portion 6 and a surface of the tactile presentation panel decreases due to a decrease in flatness of a surface of the tactile presentation panel 100 or minute unevenness on a surface of the tactile presentation panel 100, or the like caused by processing accuracy of the rotation portion 4 or the fixing portion 5 (rotation shaft portion 5a) or assembly accuracy of the tactile presentation screen 150, the tactile electrode 102 and the conductive elastic portion 6 form electrostatic capacitance not only via the dielectric layer 106 but also via air having a small dielectric constant, and the electrostatic capacitance formed between the tactile electrode 102 and the conductive elastic portion 6 decreases, resulting in a decrease in tactile strength. Since the conductive elastic portion 6 has elasticity, it is possible to fill a gap between the dielectric layer 106 and the conductive elastic portion 6 due to unevenness of the surface of the tactile presentation panel 100, and to prevent a decrease in tactile strength due to a decrease in adhesion between the conductive elastic portion 6 and the tactile presentation panel 100. A material used for the conductive elastic portion 6 is preferably an elastic resin material called conductive rubber obtained by mixing a conductive substance such as conductive carbon black or metal powder with CNR, CR rubber, NBR rubber, silicon, fluororubber, EPT rubber, SBR, butyl rubber, acrylic rubber, or CSM rubber as a base material. Volume resistivity only needs to be $10^6$ Ωcm or less, and as the volume resistivity is lower, electric charges are less likely to accumulate in the conductive elastic portion 6. Details of charge accumulation in the conductive elastic portion 6 will be described later. Further, since electrostatic capacitance is formed with the tactile electrode 102, a withstand voltage characteristic is desirably as high as possible because the life and reliability of the conductive elastic portion 6 are improved. The position detection unit 7 forms electrostatic capacitance with the detection electrode 203 of the touch screen 250, and is used to detect a position and a rotation amount of the tactile presentation knob 3.

A material that forms the position detection unit 7 is a conductor capable of forming electrostatic capacitance with the detection electrode 203, has elasticity similarly to the conductive elastic portion 6, and may be the same material as the conductive elastic portion 6. The better the adhesion with the tactile presentation panel 100, the less a difference between a design value and an actual capacitance value is likely to occur, and stable position detection accuracy can be obtained.

When the conductive elastic portion 6 and the position detection unit 7 have the same thickness so as to be in close contact with a surface of the tactile presentation panel 100 without forming a gap between them, high tactile strength and highly accurate position detection can be obtained. A flatness (a difference between a maximum value and a minimum value of measured values obtained by measuring a distance from a reference surface) of a surface where the conductive elastic portion 6 and the position detection unit 7 are in contact with the tactile presentation panel 100 is desirably 0.5 mm or less. Further, since a diameter of a contact area of a finger of a person with respect to a touch surface when a touch panel is operated said to be about 3 mm for a child and about 7 to 10 mm at the maximum for an adult, and a contact area of a finger in various touch operations is generally said to be 20 to 400 mm$^2$, an area of the position detection unit 7 may be considered to be within a range of 7 mm$^2$ or more and 400 mm$^2$ or less.

<Detection of Knob Position and Rotation Amount>

Figure 25:
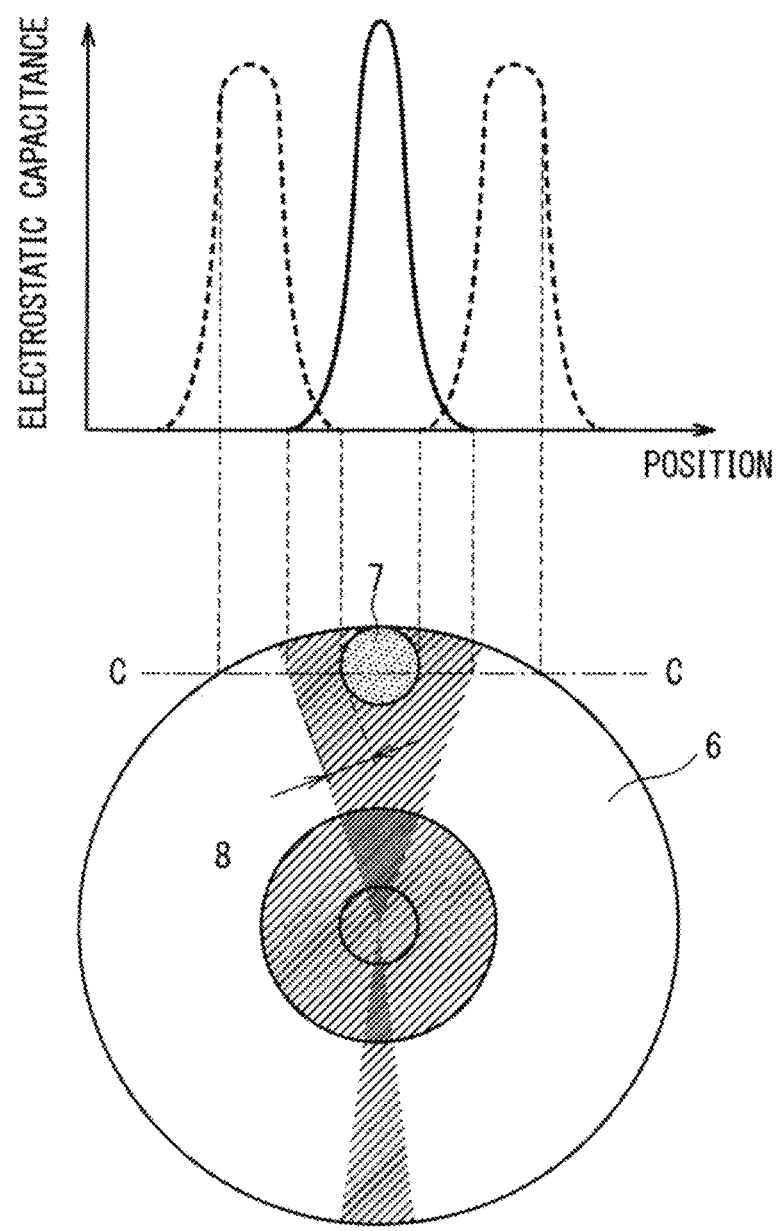
FIG. 25 is a schematic diagram for explaining a capacitance profile of line C-C when the touch screen according to the first embodiment detects the position of the tactile presentation knob.

FIG. 25 is a schematic diagram illustrating a capacitance profile of line C-C when the touch panel 200 performs detection at the time of position detection of the tactile presentation knob 3. Generation of a tactile sense on the tactile presentation knob 3 and the position detection of the tactile presentation knob 3 are performed by time division. During a period in which a voltage signal is applied to the tactile electrode 102, the detection electrode 203 and the excitation electrode 202 apply an optional voltage so as not to cause a voltage drop on the tactile electrode 102 by forming electrostatic capacitance with the tactile electrode 102, or 0 V. When the detection electrode 203 performs position detection, the tactile electrode 102 is placed in a floating state. Then, a change amount in electrostatic capacitance between the excitation electrode 202 and the detection electrode 203 of when the conductive elastic portion 6 and the detection electrode 203 form electrostatic capacitance via the tactile electrode 102 is detected, so that the position of the tactile presentation knob 3 is detected.

The detection electrode 203 forms electrostatic capacitance with both the position detection unit 7 and the conductive elastic portion 6 to detect the electrostatic capacitance. At this time, since there is a gap 8, an electrostatic capacitance profile with the position detection unit 7 and an electrostatic capacitance profile with the conductive elastic portion 6 have peaks at different positions, and these positions are distinguished from each other.

For a rotation amount of the tactile presentation knob 3, in a case where the number of the position detection units 7 is one, the rotation amount is calculated as movement only in a rotation direction from a movement amount from an initial position of the position detection unit 7. The number of the position detection units 7 is not necessarily one. When a plurality of the position detection units 7 are provided as illustrated in FIG. 26, a rotation amount θ can be calculated from a direction vector P1–P2 between the position detection units 7 at an initial position (P1, P2) and a direction vector P1'–P2' at a position (P1', P2') after movement.

Figure 26:
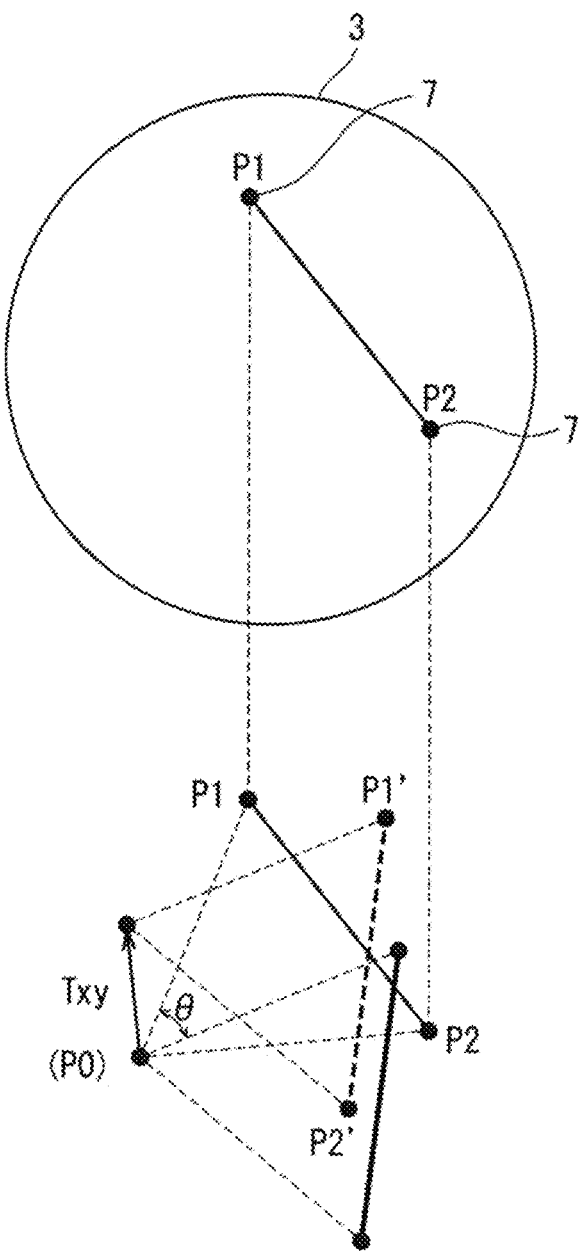
FIG. 26 is a diagram for explaining calculation of a rotation amount in a case where there is a plurality of position detection units according to the first embodiment.

In FIG. 26, when a rotation center is P0, a translational movement amount is Txy, a coordinate transformation matrix of the rotation angle θ is R, and an identity matrix is I, P1'–P2' is expressed by Equation (4) from Equations (2) and (3) below.

$$P1'=R \cdot P1-(R-I) \cdot P0+Txy \quad (2)$$

$$P2'=R \cdot P2-(R-I) \cdot P0+Txy \quad (3)$$

$$P1'-P2'=R \cdot (P1-P2) \quad (4)$$

Note that, in a case where the coordinate transformation matrix R is equal to the identity matrix I (R=I), translational operation is performed, and Txy is expressed by Equation (5) below.

$$Txy=P1'-P1 \quad (5)$$

When an operation range of the tactile presentation knob 3 is set to exceed 360 degrees, a rotation angle from the initial position can be calculated by performing addition/subtraction correction of 360 degrees×n (n is an integer) with reference to a rotation angle and a rotation angle change direction of the position detection unit 7. Although the measurement accuracy of a rotation angle is improved as the number of pairs of the position detection units 7 used for calculation is larger, the area of the conductive elastic portion 6 is reduced, and thus the number of the position detection units 7 is determined based on the balance between the tactile strength and the measurement accuracy of a rotation angle. An indication position line 11 (see FIG. 22) indicating an indication position of the tactile presentation knob 3 may be arranged on the rotation portion 4 to visualize a knob position. In a case where the indication position line 11 is arranged, the position detection unit 7 is arranged immediately below the indication position line 11, so that the calculation can be performed as a movement amount from the position (origin) at which the indication position line 11 should exist in an initial state, and thus the calculation processing can be simplified.

<Inter-Electrode Distance>

Figure 27:
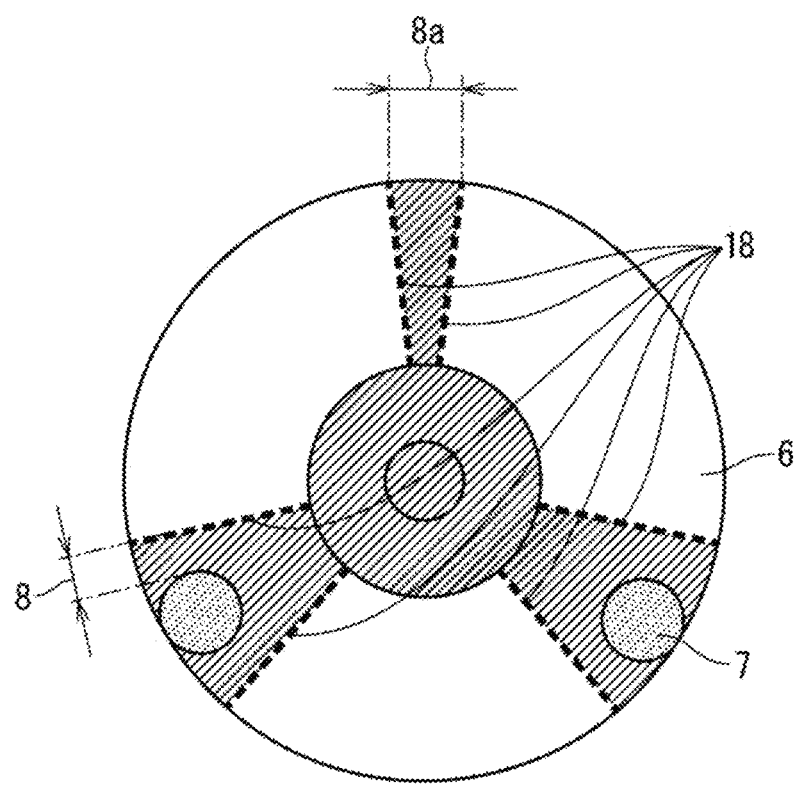
FIG. 27 is a schematic view illustrating a configuration of an edge portion of a conductive elastic portion according to the first embodiment.

FIG. 27 illustrates an example of a positional relationship between the conductive elastic portion 6 and the position detection unit 7 in the tactile presentation knob 3. A distance between the conductive elastic portion 6 and the position detection unit 7 in a case where the position detection unit 7 is arranged between the conductive elastic portions 6 adjacent to each other is indicated by the gap 8, and a distance between the conductive elastic portions 6 in a case where the position detection unit 7 is not arranged between the conductive elastic portions 6 adjacent to each other is indicated by a gap 8a. In a case where unevenness caused by thickness of the electrode is present on a surface of the tactile presentation panel 100, when the conductive elastic portion 6 slides while being in contact with the tactile electrode 102 via the dielectric layer 106, the tactile presentation knob 3 vibrates due to the unevenness on the surface. This vibration is sensed by the indicator 2 independently of a voltage signal applied to the tactile electrode 102. As a result, the indicator 2 may be less likely to feel a tactile sense obtained by the voltage signal. In other words, the tactile strength may be decreased.

Even if there is unevenness on the surface of the tactile presentation panel 100, whether or not the indicator 2 can easily feel the unevenness depends on an inter-electrode interval of the tactile electrodes 102 as described later. As larger unevenness is allowed, the need for increasing the thickness of the dielectric layer 106 to alleviate the unevenness is lowered. That is, it is allowed to reduce the thickness of the dielectric layer 106. This makes it possible to increase the capacitance formed between the conductive elastic portion 6 and the tactile electrode 102. Therefore, a stronger tactile sense can be generated. Further, if an inter-electrode distance of the tactile electrode 102 is wider than the gap 8 between the conductive elastic portion 6 and the position detection unit 7, an edge portion 18 (see FIG. 27) of the conductive elastic portion 6 is caught by the unevenness on the surface caused by the inter-electrode distance of the tactile electrode 102, and an unintended tactile sense occurs in the tactile presentation knob 3. Therefore, the inter-electrode distance of the tactile electrode 102 is desirably narrower than the gap 8. Further, the narrower the inter-electrode distance of the tactile electrode 102 is, the larger an occupied area of the tactile electrode 102 becomes, the larger the electrostatic capacitance formed with the conductive elastic portion 6 becomes, and the larger the obtained tactile strength becomes, which is desirable.

<Detailed Configuration of Tactile Presentation Touch Panel>

Figure 28:
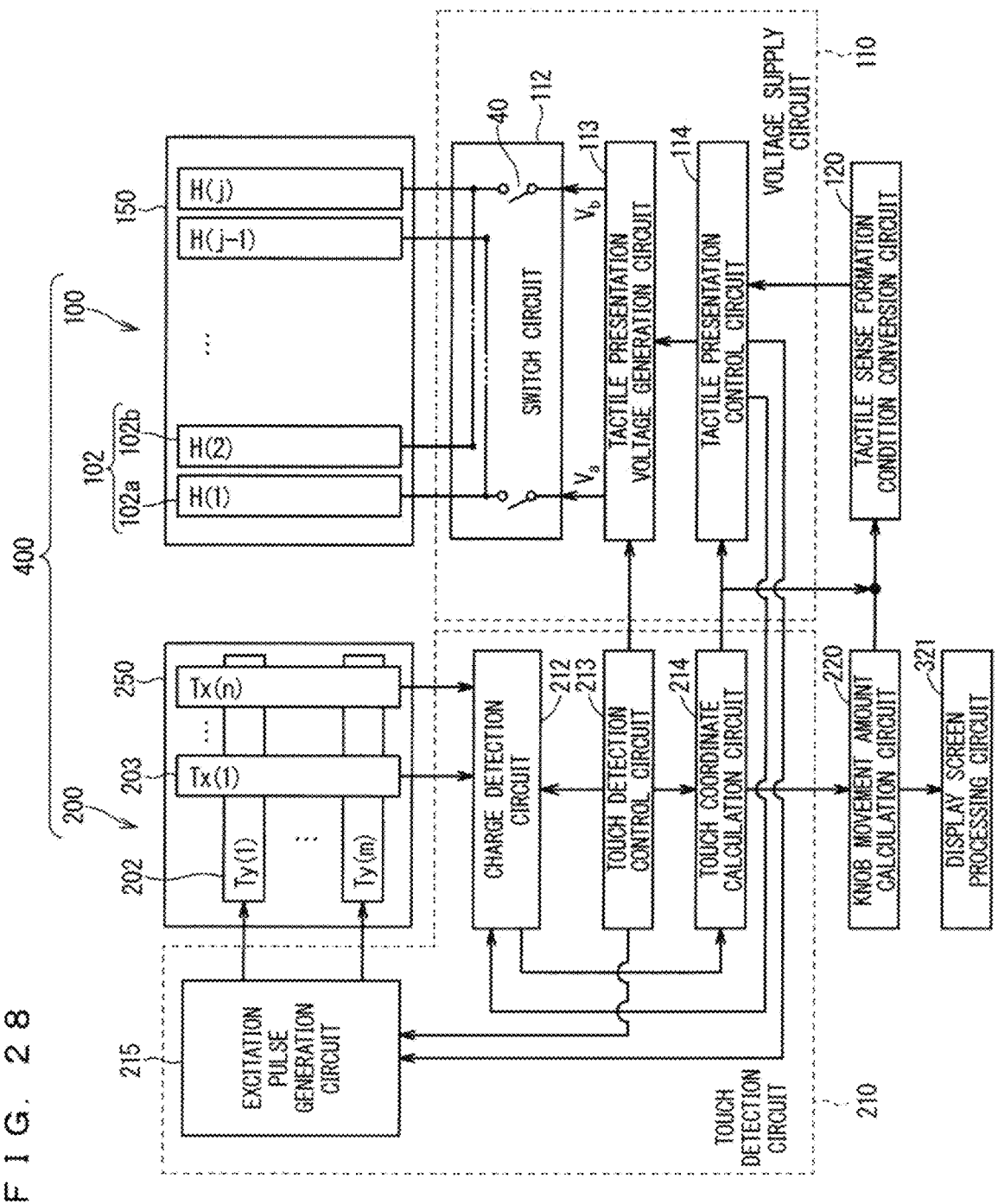
FIG. 28 is a block diagram schematically illustrating a configuration of the tactile presentation touch panel of FIG. 1.

FIG. 28 is a block diagram schematically illustrating a configuration of the tactile presentation touch panel 400. Here, it is assumed that excitation electrodes Ty(1) to Ty(m) are provided as a plurality of the excitation electrodes 202, detection electrodes Tx(1) to Tx(n) are provided as a plurality of the detection electrodes 203, and tactile electrodes H(1) to H(j) are provided as a plurality of the tactile electrodes 102. The tactile electrodes H(1) to H(j) are arranged in order according to the number in parentheses, the odd-numbered tactile electrode 102 corresponds to the first electrode 102a, and the even-numbered tactile electrode 102 corresponds to the second electrode 102b. Further, in order to simplify the description, it is assumed that one of the excitation electrode 202 constitutes one of the row direction wiring layer 206 (see FIG. 8 or 10), and one of the detection electrode 203 constitutes one of the column direction wiring layer 207 (see FIG. 8 or 10).

As described above, the tactile presentation touch panel 400 includes the touch panel 200 and the tactile presentation panel 100. The touch panel 200 includes a touch screen 250 and a touch detection circuit 210. The tactile presentation panel 100 includes a tactile presentation screen 150 and a voltage supply circuit 110.

The touch detection circuit 210 includes an excitation pulse generation circuit 215, a charge detection circuit 212, a touch coordinate calculation circuit 214, and a touch detection control circuit 213. The touch detection control circuit 213 controls operation of the excitation pulse generation circuit 215, the charge detection circuit 212, and the touch coordinate calculation circuit 214. The excitation pulse generation circuit 215 sequentially applies an excitation pulse signal to the excitation electrodes Ty(1) to Ty(m). The charge detection circuit 212 measures a signal obtained from each of the detection electrodes Tx(1) to Tx(n). In this manner, the charge detection circuit 212 detects a charge amount of each of the detection electrodes Tx(1) to Tx(n). Information of a charge detection result indicates a value corresponding to mutual capacitance between the excitation electrode Ty(k) and each of the detection electrodes Tx(1) to Tx(n) when an excitation pulse signal is applied to the excitation electrode Ty(k), where k is an integer of 1 or more and m or less. Note that the charge detection circuit 212 can recognize to which of the excitation electrodes Ty(1) to Ty(m) an excitation pulse signal is applied by a control signal from the touch detection control circuit 213. The touch coordinate calculation circuit 214 obtains data (hereinafter, referred to as "touch coordinate data") of coordinates touched by the indicator 2 on the basis of the charge detection result.

The touch coordinate calculation circuit 214 outputs the touch coordinate data to the knob movement amount calculation circuit 220, and also outputs the touch coordinate data as touch operation information to a tactile sense formation condition conversion circuit 120 and a tactile presentation control circuit 114. The knob movement amount calculation circuit 220 outputs information on a rotation angle, a rotation speed, and a horizontal movement distance as a movement amount of the knob to the tactile sense formation condition conversion circuit 120 and a display screen processing circuit 321. The tactile sense formation condition conversion circuit 120 outputs, to the tactile presentation control circuit 114, an electric signal condition for realizing the tactile strength (operation feeling strength) calculated on the basis of the input information. As described above, the touch detection circuit 210 has a function of a contact position detection unit that detects a contact position between the tactile presentation knob 3 and an operation surface of the tactile presentation panel 100. Note that the tactile presentation panel 100 may have a function of the contact position detection unit.

The voltage supply circuit 110 includes a switch circuit 112, the tactile presentation voltage generation circuit 113, and a tactile presentation control circuit 114. The tactile presentation voltage generation circuit 113 applies the voltage signal $V_a$ to the first electrode 102$a$ among the tactile electrodes H(1) to H(j) and applies the voltage signal $V_b$ to the second electrode 102$b$ via the switch circuit 112. In other words, the voltage signal $V_a$ and the voltage signal $V_b$ are alternately applied to the tactile electrodes H(1) to H(j) arranged in one direction (lateral direction in the diagram). The switch circuit 112 is set to an on state or an off state on the basis of a command from the tactile presentation voltage generation circuit 113. The switch circuit 112 connects the tactile electrode 102 to the tactile presentation voltage generation circuit 113 in the on state, and brings the tactile electrode 102 into a floating state in the off state. In the first embodiment, the switch circuit 112 includes two switches 40, one of which performs switching of an electrical path to all the first electrodes 102$a$, and the other of which performs switching of an electrical path to all the second electrodes 102$b$. These two of the switches 40 may be controlled in conjunction with each other. Note that the switch 40 corresponds to a switching unit.

The tactile presentation control circuit 114 refers to the information on the tactile strength calculated by the tactile sense formation condition conversion circuit 120. The tactile presentation control circuit 114 may control operation of the tactile presentation voltage generation circuit 113 based on this information. As described above, the voltage supply circuit 110 has a function of a tactile control unit that performs control to present, as a tactile sense, a frictional force between the tactile presentation knob 3 and the operation surface to a preset operation region when a contact position between the tactile presentation knob 3 and the operation surface of the tactile presentation panel 100 is present in the operation region.

<Operation of Tactile Presentation Touch Panel>

Figure 29:
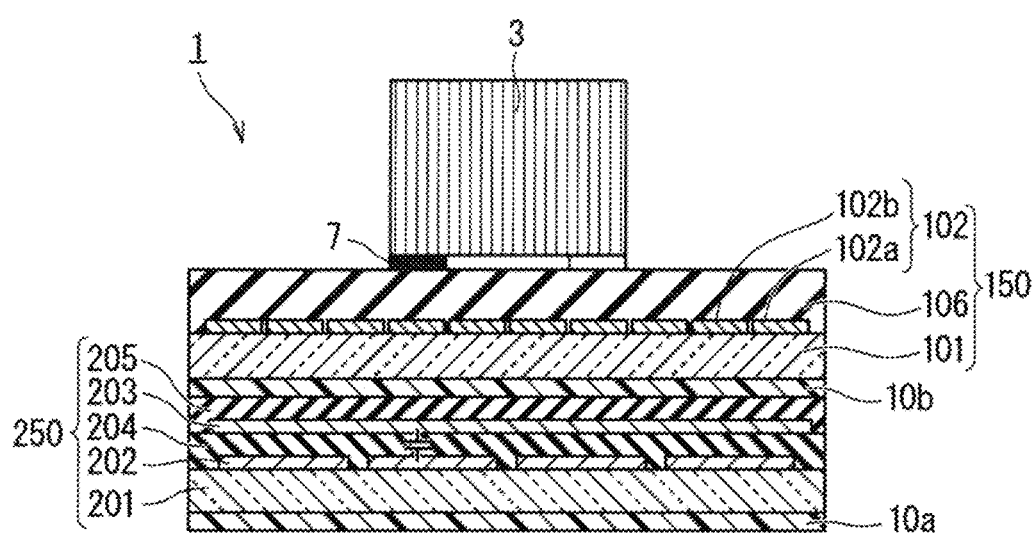
FIG. 29 is a schematic diagram for explaining electrostatic capacitance formed in the tactile presentation touch panel in FIG. 1 when the indicator is not in contact with the tactile presentation knob.
Figure 30:
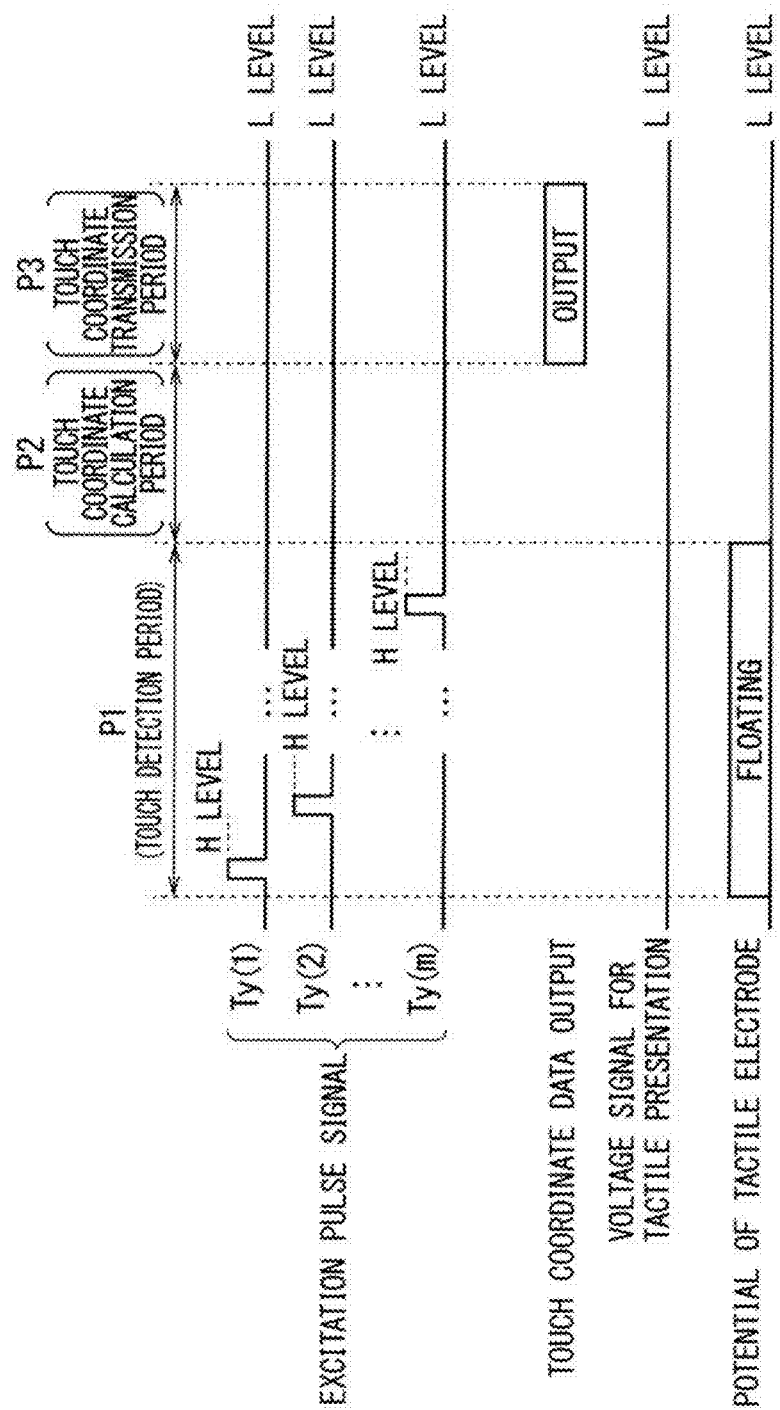
FIG. 30 is a timing chart schematically illustrating an operation timing of the tactile presentation touch panel of FIG. 1 when the indicator is not in contact with the tactile presentation knob.

FIG. 29 is a schematic diagram illustrating an image of electrostatic capacitance between the excitation electrode 202 and the detection electrode 203 when the indicator 2 is not in contact with the tactile presentation knob 3. FIG. 30 is a timing chart schematically illustrating an operation timing of the tactile presentation touch panel 400 (see FIG. 28) when the indicator 2 is not in contact with the tactile presentation knob 3.

When the indicator 2 is not in contact with the tactile presentation knob 3, both the conductive elastic portion 6 and the tactile electrode 102 are in a floating state and at the same potential as the detection electrode 203, and the charge detection circuit 212 detects a charge amount mainly from electrostatic capacitance between the detection electrode 203 and the excitation electrode 202. The touch detection control circuit 213 outputs a control signal of the excitation electrode 202 also to the tactile presentation voltage generation circuit 113.

Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. In a case of determining that there is no touch, the touch coordinate calculation circuit 214 does not calculate the touch coordinate data, and waits until processing of a charge detection result performed next.

Here, description will be made below on operation in a case where a determination result indicating presence of contact of the indicator 2 with the tactile presentation knob 3 is obtained.

Figure 31:
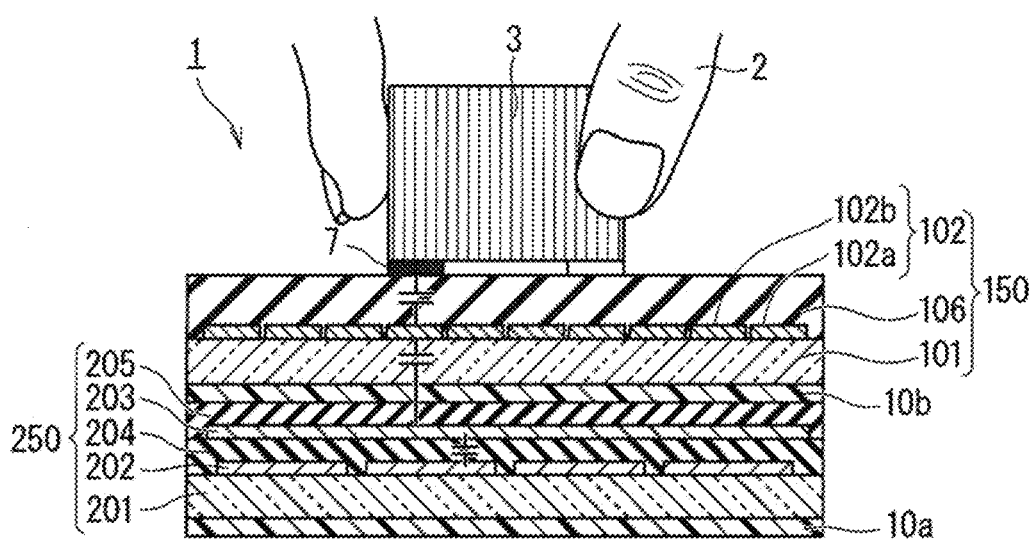
FIG. 31 is a schematic diagram for explaining electrostatic capacitance formed in the tactile presentation touch panel in FIG. 1 when the indicator is in contact with the tactile presentation knob.
Figure 32:
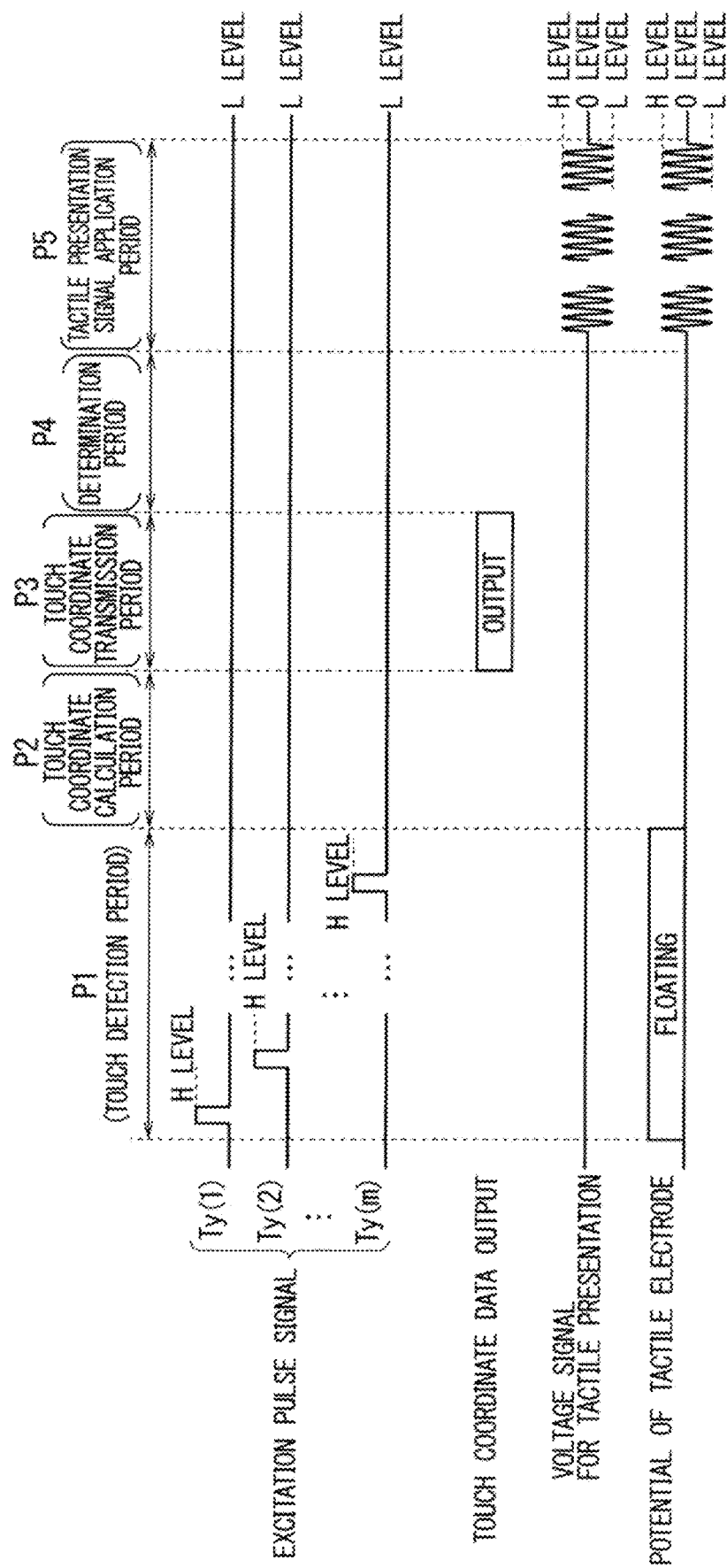
FIG. 32 is a timing chart schematically illustrating an operation timing of the tactile presentation touch panel of FIG. 1 when the indicator is in contact with the tactile presentation knob.

FIG. 31 is a schematic diagram illustrating an image of electrostatic capacitance between the excitation electrode 202 and the position detection unit 7 when the indicator 2 is in contact with the tactile presentation knob 3. FIG. 32 is a timing chart schematically illustrating an operation timing of the tactile presentation touch panel 400 (see FIG. 28) when the indicator 2 is in contact with the tactile presentation knob 3.

In a case where the indicator 2 is in contact with the tactile presentation knob 3, the conductive elastic portion 6 is in a state of being grounded via the tactile presentation knob 3 and the indicator 2, the detection electrode 203 forms electrostatic capacitance with the conductive elastic portion 6 via the tactile electrode 102, and electrostatic capacitance between the detection electrode 203 and the excitation electrode 202 decreases. As a result, a charge amount detected by the charge detection circuit 212 decreases, and it is detected that the indicator 2 comes into contact with the tactile presentation knob 3.

In the touch detection period P1, a control signal indicating a first conversion timing is output from the touch detection control circuit 213 to the excitation pulse generation circuit 215. Upon receiving this control signal, the excitation pulse generation circuit 215 gives an excitation pulse signal (charge pulse signal) to the excitation electrode Ty(1). In this manner, inter-electrode capacitance (mutual capacitance) between the excitation electrode Ty(1) and each of the detection electrodes Tx(1) to Tx(n) intersecting with the excitation electrode Ty(1) in plan view is charged. The charge detection circuit 212 detects a charge amount by the charging using the detection electrodes Tx(1) to Tx(n).

Then, the charge detection circuit 212 performs analog/digital conversion (A/D conversion) on the detection result, and outputs digital information obtained by the analog/digital conversion to the touch coordinate calculation circuit 214 as a charge detection result of mutual capacitance corresponding to the excitation electrode Ty(1). Similarly, control signals indicating second to m-th conversion timings are sequentially output from the touch detection control circuit 213 to the excitation pulse generation circuit 215. In a manner corresponding to each of the second to m-th conversion timings, charge detection results of mutual capacitances corresponding to the excitation electrodes Ty(2) to Ty(m) are output to the touch coordinate calculation circuit 214.

The touch detection control circuit 213 also outputs the control signal to the tactile presentation voltage generation circuit 113. Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. When determining that there is no touch, the touch coordinate calculation circuit 214 does not calculate the touch coordinate data, and the processing returns to the touch detection period P1. In order to enable such processing, the touch coordinate calculation circuit 214 gives, to the touch detection control circuit 213, a signal indicating a determination result as to the presence or absence of touch.

Next, in a touch coordinate transmission period P3, according to a touch coordinate data transmission timing from the touch detection control circuit 213, the touch coordinate calculation circuit 214 outputs the touch coordinate data to the knob movement amount calculation circuit 220, and also outputs the touch coordinate data as the touch operation information to the tactile sense formation condition conversion circuit 120 and the tactile presentation control circuit 114.

Next, in a determination period P4, the tactile presentation control circuit 114 determines the position of the tactile presentation knob 3 from the touch coordinate data, and determines an area where a tactile sense is presented.

The tactile presentation control circuit 114 selects a tactile presentation signal waveform corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in a tactile presentation signal application period P5, the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region where the tactile presentation signal is not input is connected to GND, or the tactile electrode 102 is left floating without turning on the switch. In this manner, a signal is applied to the tactile electrode 102, and a tactile sense is presented. In the example of FIG. 32, an AC signal having the H level (high level) and the L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Figure 33:
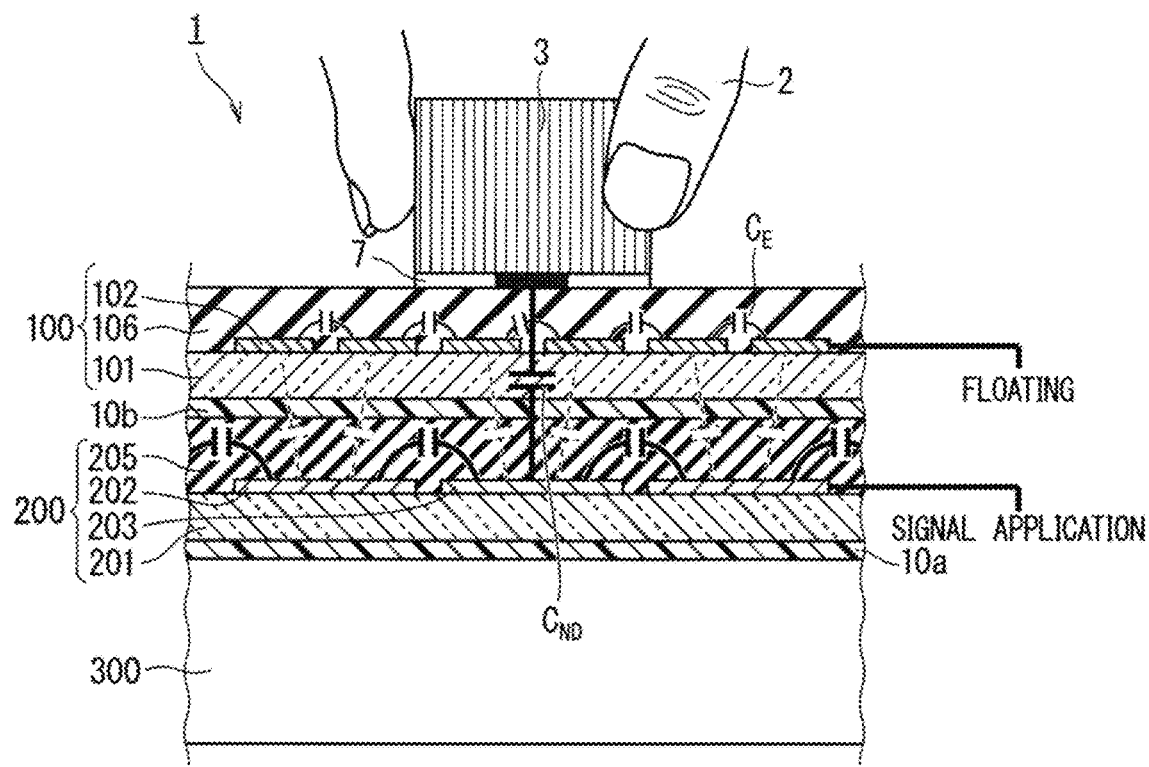
FIG. 33 is a schematic diagram for explaining electrostatic capacitance formed in the tactile presentation touch panel in FIG. 1 when the tactile presentation touch panel detects a touch position.

FIG. 33 is a schematic diagram illustrating formation of electrostatic capacitance in the tactile presentation touch display 1 in the touch detection period P1 (see FIG. 32). In the touch detection period P1, electrostatic capacitance $C_{ND}$ is formed between the indicator 2 and the detection electrode 203. During this period, the potential of all the tactile electrodes 102 is in a floating state. This prevents the tactile electrode 102 from functioning as a shield. Therefore, the sensitivity of touch detection can be enhanced.

Figure 34:
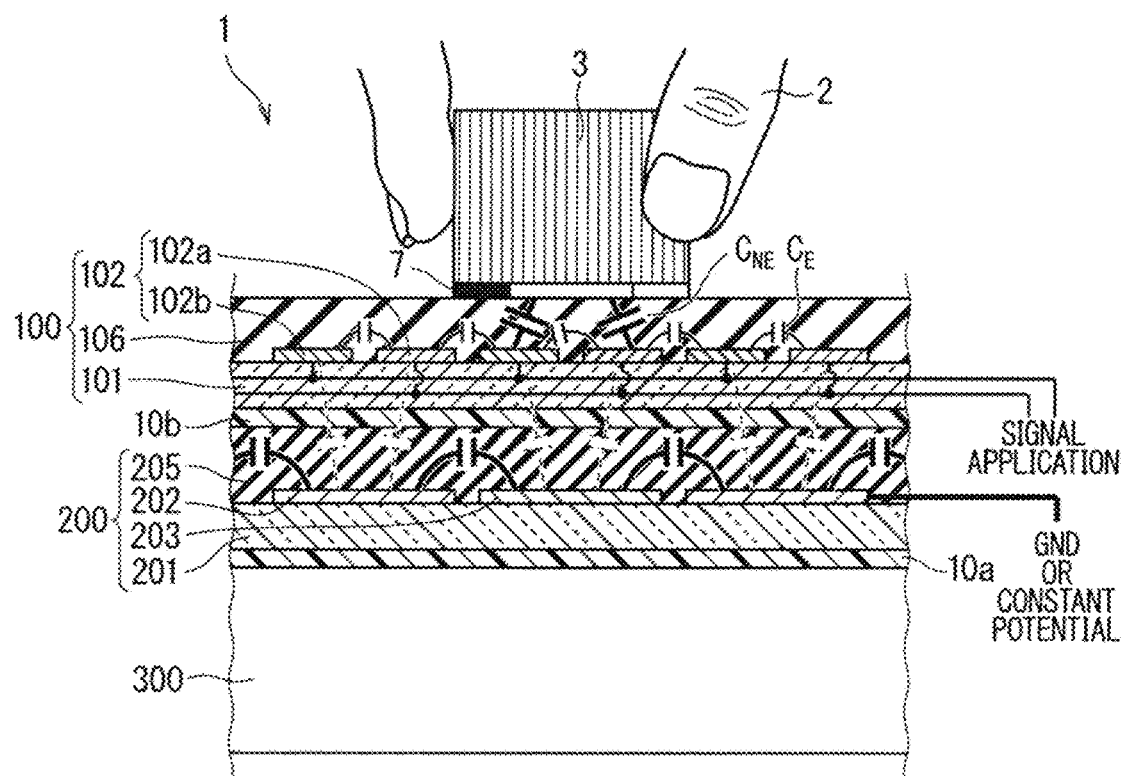
FIG. 34 is a schematic diagram for explaining electrostatic capacitance formed in the tactile presentation touch panel in FIG. 1 when the tactile presentation touch panel generates a tactile sense.

FIG. 34 is a schematic diagram illustrating formation of electrostatic capacitance in the tactile presentation touch display 1 in the tactile presentation signal application period P5 (see FIG. 32). In the tactile presentation signal application period P5, potential of the excitation electrode 202 and the detection electrode 203 of the touch panel 200 may be in a floating state. In this manner, it is possible to suppress the influence of the capacitance formation by the excitation electrode 202 and the detection electrode 203 on the electrostatic capacitance $C_{NE}$. Alternatively, the potential of the excitation electrode 202 and the detection electrode 203 of the touch panel 200 may be substantially constant potential, and for example, the excitation electrode 202 and the detection electrode 203 may be connected to ground potential with low impedance. In this manner, the excitation electrode 202 and the detection electrode 203 can function as a shield between the tactile electrode 102 and the display panel 300. Therefore, generation of noise in the display panel 300 due to a high voltage signal applied to the tactile electrode 102 is suppressed. Therefore, display defects due to noise can be prevented. Conversely, generation of noise in the tactile electrode 102 due to the display panel 300 is suppressed. When a tactile presentation signal is applied to the tactile electrode 102, the conductive elastic portion 6 forms electrostatic capacitance with the tactile electrode 102, and charges having potential opposite to voltage of the tactile electrode 102 are accumulated on a surface in contact with the dielectric layer 106 of the conductive elastic portion 6, and an electrostatic force is generated between the conductive elastic portion 6 and the dielectric layer 106. As a result, a frictional force between the conductive elastic portion 6 and the dielectric layer 106 changes, and torque of the knob changes when the tactile presentation knob 3 is rotated due to the change in the frictional force, which is felt as an operation feeling when the tactile presentation knob 3 is rotated.

Note that, in a case where a floating state is used, both the excitation electrode 202 and the detection electrode 203 may be in the floating state, or one of them may be in the floating state. Further, in a case where constant potential is used, both the excitation electrode 202 and the detection electrode 203 may be set to the constant potential, or one of them may be set to the constant potential. The configuration may be such that one of the excitation electrode 202 and the detection electrode 203 is set to be in a floating state, and the other is set at the constant potential. When distances between the excitation electrode 202 and the detection electrode 203 and the tactile electrode 102 are different, one of the excitation electrode 202 and the detection electrode 203 that is closer to the tactile electrode 102 may be in the floating state, and the other that is farther may be in the constant potential.

Note that, in the example illustrated in FIG. 28, the touch coordinate data is sent from the touch detection circuit 210 to the voltage supply circuit 110. However, as a variation, information on a charge detection result may be sent from the charge detection circuit 212 to the voltage supply circuit 110. In this case, the tactile presentation control circuit 114 performs determination of the presence or absence of touch and calculation of touch coordinates by using the information on a charge detection result.

In a case where the position where the tactile presentation knob 3 is placed on the tactile presentation panel 100 is changed during operation or for each operation, the bottom surface portion 15 may have a surface adhered and fixed onto the tactile presentation panel 100. Further, in a case where the position where the tactile presentation knob 3 is placed on the tactile presentation panel 100 is not changed during operation or for each operation (in a case where the position of the tactile presentation knob 3 is fixed and used), the bottom surface portion 15 may be bonded and fixed onto the tactile presentation panel 100 by an adhesive portion 17.

<Suppression of Charge Accumulation in Conductive Elastic Portion>

Figure 35:
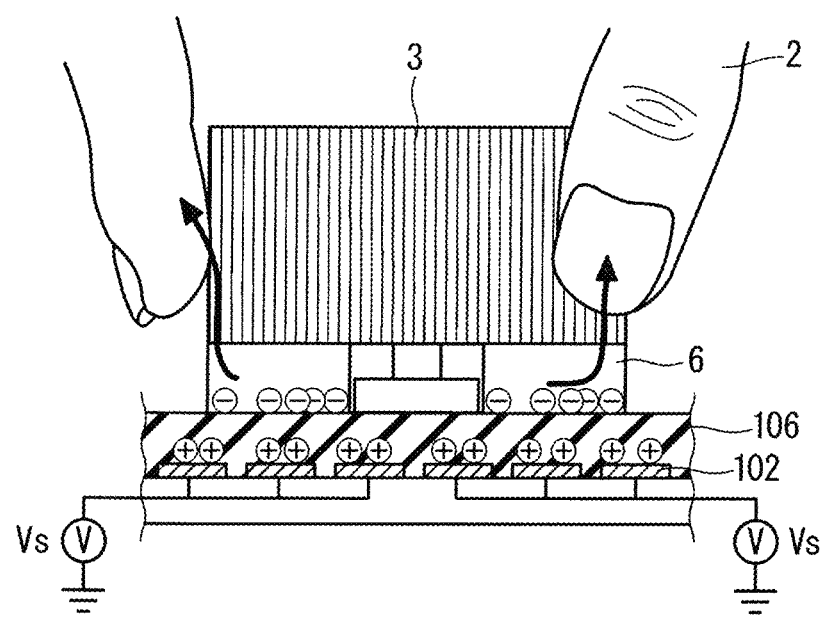
FIG. 35 is an image diagram schematically illustrating movement of charges accumulated in the conductive elastic portion when the tactile presentation knob is connected to the ground via the indicator at the time of voltage signal application according to the first embodiment.

FIG. 35 is an image diagram schematically illustrating movement of charges accumulated in the conductive elastic portion 6 when the charges are grounded via the indicator 2 at the time of voltage signal application. The conductive elastic portion 6, which is formed by mixing conductive carbon black or metal particles with insulating resin, has relatively high resistance and easily accumulates electric charges. When charges are accumulated in the conductive elastic portion 6, an electrostatic force between the conductive elastic portion 6 and the tactile electrode 102 does not change due to a voltage signal, and the tactile strength decreases. When the conductive elastic portion 6 and a surface of the rotation portion 4 are electrically connected to each other, the indicator 2 is connected to the ground via the indicator 2 when the indicator 2 comes into contact with the rotation portion 4. In this manner, electric charges accumulated in the conductive elastic portion 6 are released, and accumulation of electric charges can be suppressed.

In a case where resistance of the conductive elastic portion 6 is high, charges hardly move in the conductive elastic portion 6, and charges cannot be sufficiently released only by releasing the charges via the indicator 2 as described above. In that case, the tactile electrode 102 is driven so that at least one of the conductive elastic portions 6 divided into two or more when a voltage signal is applied forms electrostatic capacitance with the tactile electrode 102, and at least one is connected via the dielectric layer 106 to the tactile electrode 102 connected to a charge discharge portion 115 (see FIG. 36 to be described later) which is connected to the ground. In this manner, charges accumulated in the conductive elastic portion 6 are directly released to the tactile electrode 102 via the dielectric layer 106, so that accumulation of charges is prevented. The tactile electrode 102 connected to the charge discharge portion 115 does not need to be fixed, and application of a voltage signal and connection to the charge discharge portion 115 may be switched and driven in the same tactile electrode 102, or the tactile electrode 102 to which a voltage signal is applied and the tactile electrode 102 connected to the charge discharge portion 115 may be alternately arranged. However, no electrostatic force is generated in the tactile electrode 102 connected to the charge discharge portion 115. Therefore, in order to prevent a decrease in a tactile sense, the number of the tactile electrodes 102 to which a voltage signal is applied is made larger than the number of the tactile electrodes 102 connected to the charge discharge portion 115, or time for connecting to the charge discharge portion 115 is made shorter than time for applying a voltage signal. In this manner, an effective area of the conductive elastic portion 6 that generates an electrostatic force with the tactile electrode 102 is preferably made larger than an effective area of the conductive elastic portion 6 that forms capacitance with the charge discharge portion 115.

Figure 36:
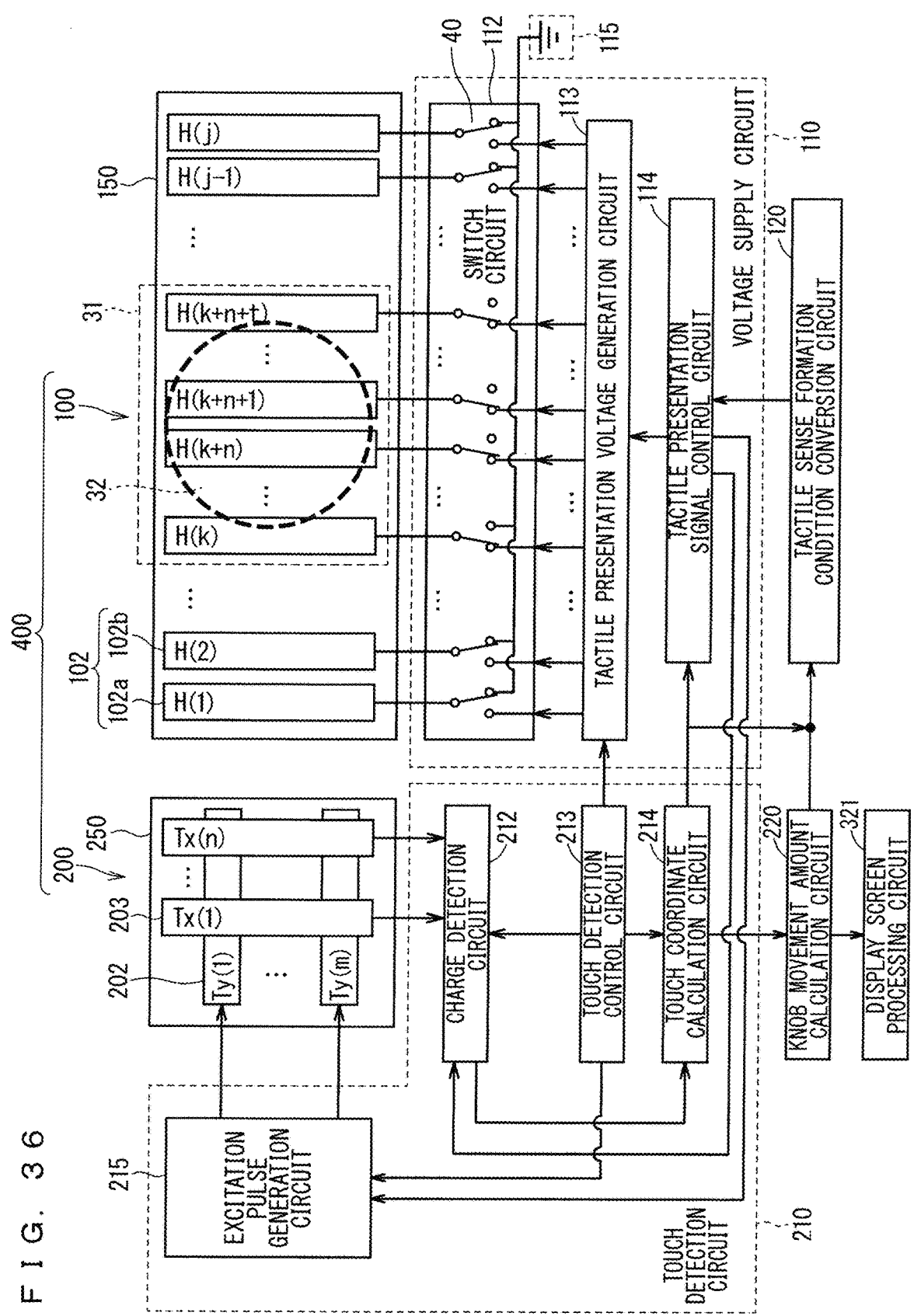
FIG. 36 is a block diagram schematically illustrating a configuration of the tactile presentation touch panel when a part of tactile electrodes with which the tactile presentation knob is in contact via a dielectric layer is connected to the ground at the time of voltage signal application according to the first embodiment.

FIG. 36 is a block diagram illustrating a configuration in a case where the tactile electrode 102 is driven such that at least one of the conductive elastic portions 6 divided into two or more forms electrostatic capacitance with the tactile electrode 102, and at least one is connected to the tactile electrode 102 connected to the ground via the dielectric layer 106. In the determination period P4 (see FIG. 32), the tactile presentation control circuit 114 determines the position where the tactile presentation knob 3 is placed from the touch coordinate data, determines an area where a tactile sense is presented, divides the area into two or more areas, and determines an area where a tactile presentation signal is input and an area connected to GND.

The tactile presentation control circuit 114 selects a tactile presentation signal waveform corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in the tactile presentation signal application period P5 (see FIG. 32), the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region connected to GND is connected to GND. The switch 40, which is connected to the tactile electrode 102 in a region where no tactile presentation signal is input, is connected to GND, or the tactile electrode 102 is kept floating without the switch 40 is switched on. In this manner, a signal is applied to the tactile electrode 102, and a tactile sense is presented. In the example of FIG. 24, an AC signal having an H level (high level) and an L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Note that, in the first embodiment, a GND terminal is used as the charge discharge portion 115. However, other configurations may be used as long as electric charges accumulated in the conductive elastic portion 6 can be discharged. For example, positive voltage or negative voltage for efficiently discharging charges may be applied instead of a GND terminal according to the conduction degree of electric charges accumulated in the conductive elastic portion 6.

In the present disclosure, in the tactile presentation signal application period P5, a waveform of a voltage signal, time and a cycle at and during which the voltage signal is applied are changed to stop rotation operation of the tactile presentation knob 3 for an optional period. In this manner, an operable region that have not been able to be presented by the conventional tactile presentation knob, and a neutral position serving as an operation reference are presented. A specific example of these will be described later.

<Difference Between Electrode Structure of Tactile Presentation Screen and Electrode Structure of Touch Screen>

As a preferable condition of the tactile electrode 102, firstly, a configuration in which the indicator 2 can be in contact with the tactile electrode 102 without a member other than the dielectric layer 106 interposed between them is desired. Therefore, the tactile electrode 102 covered with the dielectric layer 106 is preferably arranged on an outermost surface of the tactile presentation touch panel 400.

Secondly, the shorter a distance between the indicator 2 and the tactile electrode 102, the larger a tactile sense can be generated. From this viewpoint, the thickness of the dielectric layer 106 is preferably small, and the dielectric constant of the dielectric layer 106 is preferably large.

Thirdly, it is desirable that the tactile electrodes 102 densely exist in order to make the electrostatic capacitance $C_{NE}$ (see FIG. 34) large at the time of generation of a tactile sense, while it is preferable that capacitance $C_E$ between the tactile electrodes 102, that is, inter-electrode capacitance be small at the time of detection of a touch position (see FIG. 32) so that the formation of the capacitance $C_{ND}$ is not hindered.

In a case where the tactile presentation touch panel 400 is larger in size than the tactile presentation knob 3, and an area where the tactile presentation knob 3 is not placed is used as a touch panel that does not present a tactile sense, when the indicator 2 is not in contact with the tactile presentation knob 3, an operation timing (see FIG. 30) of when the indicator 2 is not in contact with the tactile presentation knob 3 is repeated for an entire surface of the tactile presentation touch panel 400. When touch is detected in an area used as a touch panel that does not perform tactile presentation, a touch position is calculated and output. When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 32) only in an area where the tactile presentation knob 3 is placed.

In a case where an area where the tactile presentation knob 3 is not placed is used as a touch panel that presents a tactile sense, when the indicator 2 is not in contact with the tactile presentation knob 3, an operation timing (see FIG. 30) of when the indicator 2 is not in contact with the tactile presentation knob 3 is repeated for an entire surface of the tactile presentation touch panel 400. When touch detection is performed on an area used as a touch panel that performs tactile presentation, operation is performed at an operation timing of when the indicator 2 is in contact with the tactile presentation knob 3 as described above (see FIG. 32). When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 32) only in an area where the tactile presentation knob 3 is placed.

As a preferable condition of the excitation electrode 202 and the detection electrode 203, firstly, in order to ensure sensitivity and linearity of touch position detection, a matrix structure by which a touch position can be identified accurately is required. Secondly, since the indicator 2 and the detection electrode 203 detect the touch position by the electrostatic capacitance $C_{ND}$ formed through the tactile presentation screen 150, it is necessary to provide a predetermined distance (several hundred μm or more and several mm or less) between the excitation electrode 202 and the detection electrode 203 so that an electric field spreads in the lateral direction.

As described above, there is a difference between a preferable condition of the tactile electrode 102 and a preferable condition of the excitation electrode 202 and the detection electrode 203. In order to optimize both conditions, it is not desirable to apply similar structures to them.

<Details of Lead-Out Wiring Layer>

The lead-out wiring layers 105 (FIG. 15) of the tactile presentation screen 150 specifically include lead-out wiring layers Ld(1) to Ld(j) and lead-out wiring layers Lu(1) to Lu(j). Assuming that an integer of any of numbers 1 to j is k, each of the lead-out wiring layers Ld(k) and Lu(k) is connected to the k-th tactile electrode 102. Each of the lead-out wiring layers Ld(k) and Lu(k) is connected to a first end and a second end in an extending direction of one of the tactile electrode 102.

Wiring resistance of each of the tactile electrodes 102 provided on the tactile presentation screen 150 is desirably high resistance from the viewpoint of not hindering touch detection by the touch screen 250, and is desirably, for example, $10^4 \Omega$ or more. In a case where wiring resistance is high as described above, propagation delay of a voltage signal in a wiring layer is likely to occur. As described above, the lead-out wiring layer 105 is connected to each of the first end and the second end of the tactile electrode 102, so that propagation delay can be suppressed.

The lead-out wiring layers Ld(1) to Ld(j) are arranged outside the tactile presentable area, and extend to corresponding electrodes in order from one closer to the center of an array of the tactile presentation panel terminal portions 107 so that a substantially shortest distance from the tactile presentation panel terminal portions 107 can be obtained. The tactile presentation panel terminal portion 107 is arranged in the vicinity of the center of a long side of the transparent insulating substrate 101 along the long side. The lead-out wiring layers Ld(1) to Ld(j) are arranged as densely as possible while securing mutual insulation. The lead-out wiring layers Lu(1) to Lu(j) are similarly arranged outside a region occupied by the lead-out wiring layers Ld(1) to Ld(j). With such arrangement, it is possible to suppress an area of a portion outside the tactile presentable area of the transparent insulating substrate 101.

The lead-out wiring layers 105, specifically, the lead-out wiring layers Ld(1) to Ld(j) and the lead-out wiring layers Lu(1) to Lu(j) are preferably composed of either a metal single-layer film or a laminated film of a metal single-layer and a non-metal single-layer. In a case where the laminated film has a lower layer and an upper layer covering the lower layer, the upper layer may have a function as a protective layer of the lower layer. For example, the upper layer as a protective layer may protect the lower layer from an etchant in an etching process used to manufacture the tactile presentation screen 150. Alternatively, the upper layer may function as a cap layer that prevents corrosion of the lower layer during manufacture or use of the tactile presentation screen 150. When a material of the lower layer is a material having more excellent adhesion to the transparent insulating substrate 101 than a material of the upper layer, the occurrence of peeling of the lead-out wiring layer 105 can be suppressed.

<Limitation of Operation Region of Tactile Presentation Knob>

Figure 37:
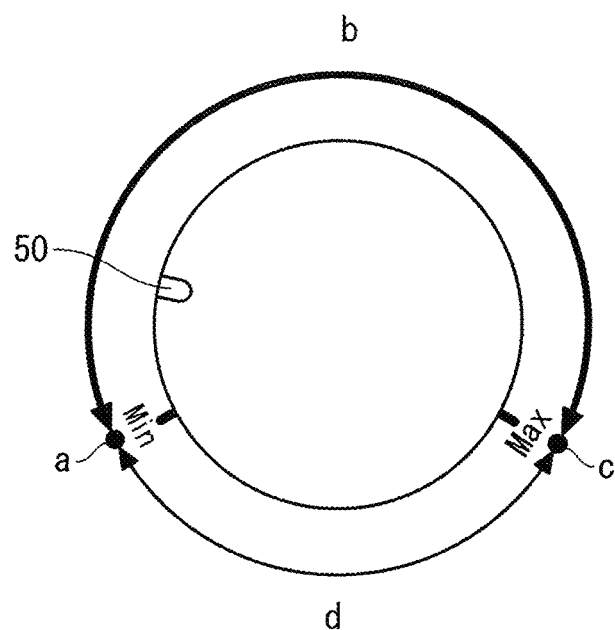
FIG. 37 is a diagram for explaining an operation region of the tactile presentation knob according to the first embodiment.

FIG. 37 is a view illustrating an example in which an upper limit and a lower limit are set in an operation region of the tactile presentation knob 3. The user can rotate the tactile presentation knob 3. As illustrated in FIG. 37, an operation region b indicates a region where rotation operation of the tactile presentation knob 3 is possible. An operation lower limit position a (end portion operation region) indicates a lower limit position of the operation region b. An operation upper limit position c (end portion operation region) indicates an upper limit position of the operation region b. A non-operation region d indicates a region where rotation operation of the tactile presentation knob 3 is not possible. An indication position 50 indicates an indication position of the tactile presentation knob 3.

Figure 38:
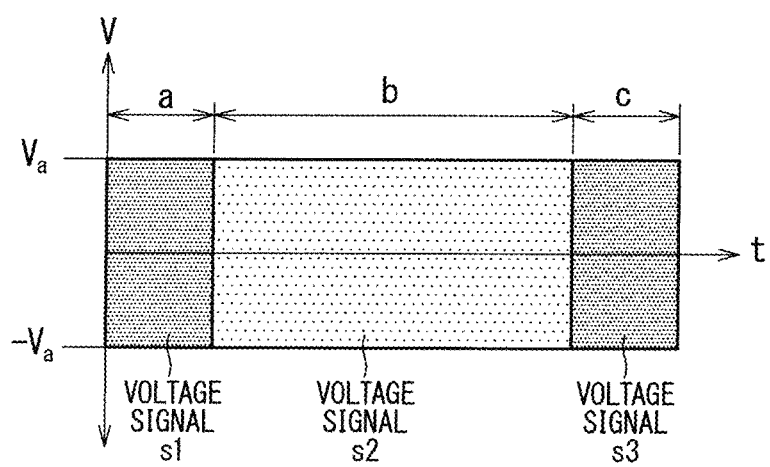
FIG. 38 is a diagram illustrating an example of a waveform configuration of a voltage signal applied to each operation region when the tactile presentation knob according to the first embodiment is operated.

FIG. 38 is a diagram illustrating an example of a configuration of a waveform of a voltage signal applied when the indication position 50 of the tactile presentation knob 3 is present at each of the operation lower limit position a, the operation region b, and the operation upper limit position c. Specifically, while the indication position 50 is at the operation lower limit position a, a voltage signal s1 is applied. Then, while the indication position 50 rotates from the operation lower limit position a toward the operation upper limit position c in the operation region b, a voltage signal s2 is applied. After that, while the indication position 50 is at the operation upper limit position c, a voltage signal s3 is applied.

Figure 39:
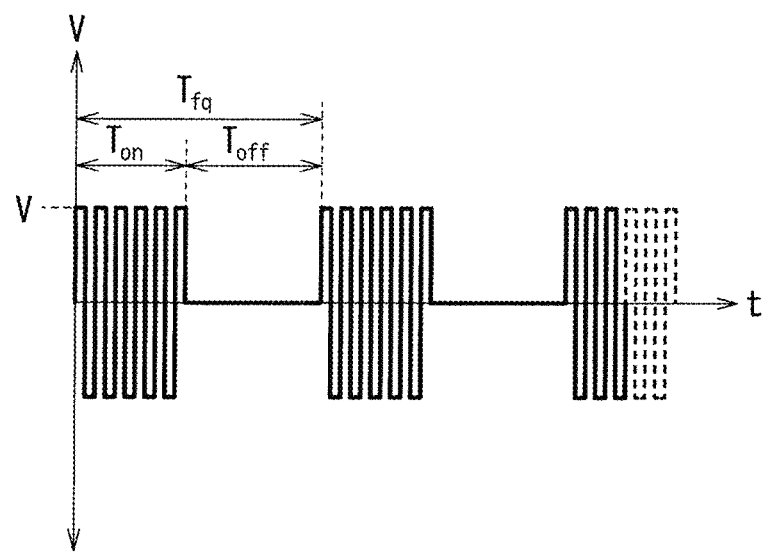
FIG. 39 is a diagram illustrating an example of a waveform of a voltage signal applied to each operation region according to the first embodiment.

FIG. 39 is a diagram illustrating an example of a configuration of a waveform of a voltage signal applied when the indication position 50 of the tactile presentation knob 3 is present at each of the operation lower limit position a, the operation region b, and the operation upper limit position c. Specifically, while the indication position 50 is at the operation lower limit position a, a voltage signal s1 is applied. Then, while the indication position 50 rotates from the operation lower limit position a toward the operation upper limit position c in the operation region b, a voltage signal s2 is applied. After that, while the indication position 50 is at the operation upper limit position c, a voltage signal s3 is applied.

As described above, by applying a voltage signal for presenting a preset tactile sense to the indication position 50 of the tactile presentation knob 3 detected by the touch panel 200, a frictional force between the tactile presentation knob 3 and the tactile presentation panel 100 is changed to present a tactile sense to the tactile presentation knob 3. The voltage signal s1 and the voltage signal s3 differ from the voltage signal s2 in magnitude of a frictional force generated between the tactile presentation knob 3 and the tactile presentation panel 100, and in a cycle and time in which the frictional force is generated. Therefore, the indicator 2 perceives that a state in which the voltage signal s1 and the voltage signal s3 are applied and a state in which the voltage signal s2 is applied are different states based on a tactile sense presented according to a change in the frictional force. Note that the voltage signal s1, the voltage signal s2, and the voltage signal s3 may be voltage signals having different amplitudes. Further, the voltage signal s1 and the voltage signal s3 may be voltage signals having the same waveform.

The voltage signal s1 and the voltage signal s3 are voltage signals that cause an adsorption phenomenon due to a strong frictional force between the tactile presentation knob 3 and the tactile presentation panel 100. The voltage signal s2 is a frictional force weaker than the voltage signal s1 and the voltage signal s3, and presents a tactile sense such as an operational feeling that the tactile presentation knob 3 smoothly slides, a vibration feeling climbing over fine unevenness, a climbing feeling of climbing over a rounded projection, and a separation feeling of climbing over a high projection.

While the indication position 50 of the tactile presentation knob 3 is present at the operation lower limit position a, the voltage signal s1 is continuously applied, and movement of the tactile presentation knob 3 is stopped so that the indication position 50 of the tactile presentation knob 3 does not enter the non-operation region d beyond the position of the operation lower limit position a. While the indication position 50 of the tactile presentation knob 3 moves toward the operation upper limit position c in the operation region b, the voltage signal s2 is applied. While the indication position 50 of the tactile presentation knob 3 is present at the operation upper limit position c, the voltage signal s3 is continuously applied, and movement of the tactile presentation knob 3 is stopped so that the indication position 50 of the tactile presentation knob 3 does not enter the non-operation region d beyond the position of the operation upper limit position c. While the indication position 50 of the tactile presentation knob 3 moves toward the operation lower limit position a in the operation region b, the voltage signal s2 is applied.

Specifically, as illustrated in FIG. 39, a cycle ($T_{fq}$) of a voltage signal may be changed in accordance with a cycle of a frictional force desired to be presented to the tactile presentation knob 3. In time ($T_{on}$) in which the voltage signal is applied, a frictional force based on a waveform of the voltage signal is generated between the tactile presentation knob 3 and the tactile presentation panel 100, and in time ($T_{off}$) in which the voltage signal is not applied, no frictional force is generated. As described above, when a period in which a frictional force is generated and a period in which a frictional force is not generated are periodically repeated, the rotation of the tactile presentation knob 3 repeats catching and sliding due to a frictional force, and the indicator 2 in contact with the tactile presentation knob 3 perceives a tactile sense generated by operation of the tactile presentation knob 3. When it is desired to present a low convex feeling, the time ($T_{on}$) in which a voltage signal is applied is made preferably shorter than the time ($T_{off}$) in which no voltage signal is applied. Further, when it is desired to present a high convex feeling with a high convex portion, the time ($T_{on}$) in which a voltage signal is applied is made preferably longer than the time ($T_{off}$) in which no voltage signal is applied.

Note that a waveform of a voltage signal to be applied may be a pulse wave, a sine wave, a rectangular wave, or the like, and may be only a positive voltage, only a negative voltage, or positive and negative voltages. In the case of a pulse wave and a rectangular wave, for example, in a case where the waveform of FIG. 39 is applied to a tactile electrode 102a, an opposite-phase voltage signal only needs to be applied to an adjacent tactile electrode 102b. Further, in the case of a sine wave, different frequencies only need to be applied to the tactile electrode 102a and the tactile electrode 102b so that a beat waveform generated from two types of voltage signals becomes the waveform of FIG. 39. If the waveform of the voltage signal is, for example, a sine wave having an amplitude of positive and negative voltages around 0 V or a waveform obtained by combining positive and negative voltages such as a pulse wave, there is an effect of preventing electric charges from accumulating in the dielectric layer 106 and the conductive elastic portion 6 and weakening a tactile sense presented to the tactile presentation knob 3, and there is an effect of stabilizing tactile presentation. An amplitude of the voltage signal may be changed according to the strength of a tactile sense to be presented, and a waveform having a steep rise of the waveform may be used when a sharp unevenness feeling is desired to be exhibited, and a waveform having a gentle rise of the waveform may be used when a rounded unevenness feeling is desired to be exhibited.

By controlling a voltage signal as described above, rotation operation of the tactile presentation knob 3 can be performed within a range from the operation lower limit position a to the operation upper limit position c via the operation region b.

Hereinafter, a specific example of the configuration of a waveform of a voltage signal illustrated in FIG. 38 will be described.

First Specific Example

Figure 40:
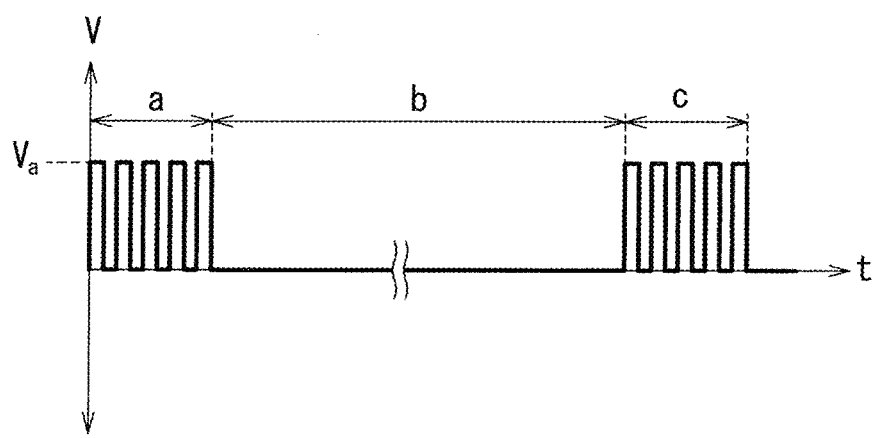
FIG. 40 is a diagram illustrating an example of a waveform of a voltage signal applied to each operation region according to the first embodiment.
Figure 41:
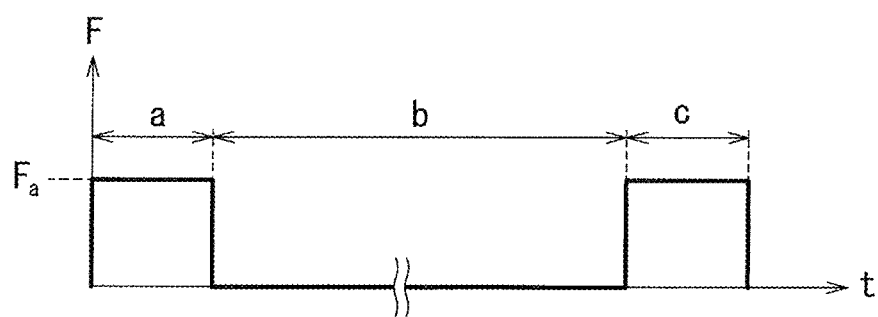
FIG. 41 is a diagram illustrating an example of a frictional force generated when a waveform of the voltage signal of FIG. 40 is applied to each operation region.

FIG. 40 illustrates a waveform of a voltage signal V applied when the indication position 50 of the tactile presentation knob 3 is present at each of the operation lower limit position a, the operation region b, and the operation upper limit position c. FIG. 41 illustrates a frictional force F generated between the tactile presentation knob 3 and the tactile presentation panel 100 when the voltage signal illustrated in FIG. 40 is applied. The same applies to FIGS. 42 to 45 described below.

As illustrated in FIG. 40, when the tactile presentation knob 3 is present at the operation lower limit position a or the operation upper limit position c, a voltage signal of a pulse wave of the voltage $V_a$ is applied as the voltage signal s1 or the voltage signal s3. At this time, a frictional force $F_a$ is generated between the tactile presentation knob 3 and the tactile presentation panel 100. Further, when the tactile presentation knob 3 is present in the operation region b, the voltage signal s2 is not applied. In this manner, the operation range of the tactile presentation knob 3 can be presented. In the operation region b, the voltage signal s2 is not applied. Therefore, in the operation region b, there is no tactile presentation such as a catching feeling, a climbing feeling of a projection, and a vibration feeling, and a small resistance feeling of only a dynamic frictional force caused by a material between the conductive elastic portion 6 of the tactile presentation knob 3 and the dielectric layer 106 of the tactile presentation panel 100 is obtained, and the tactile presentation knob 3 smoothly rotates. Further, time for applying the voltage signal to each of the operation lower limit position a, the operation region b, and the operation upper limit position c varies depending on a rotational speed of the tactile presentation knob 3 and time during which the indication position 50 of the tactile presentation knob 3 is present at the operation lower limit position a or the operation upper limit position c.

Second Specific Example

Figure 42:
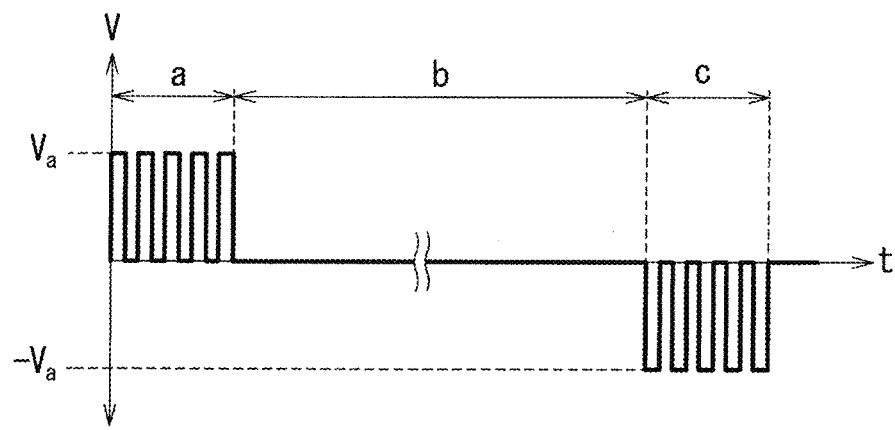
FIG. 42 is a diagram illustrating an example of a waveform of a voltage signal applied to each operation region according to the first embodiment.
Figure 43:
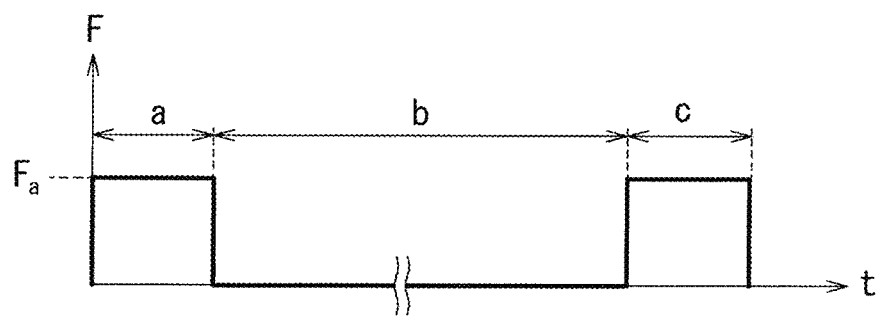
FIG. 43 is a diagram illustrating an example of a frictional force generated when a waveform of the voltage signal of FIG. 42 is applied to each operation region.

As illustrated in FIGS. 42 and 43, a positive voltage signal is applied when the indication position 50 of the tactile presentation knob 3 is present in the operation lower limit region a, and a negative voltage is applied when the indication position 50 is present in the operation upper limit region c, so that an effect of suppressing accumulation of charges in the dielectric layer 106 and the conductive elastic portion 6 described above can be obtained. Note that the positive and negative of a voltage signal may be reversed between the operation lower limit position a and the operation upper limit position c.

Third Specific Example

Figure 44:
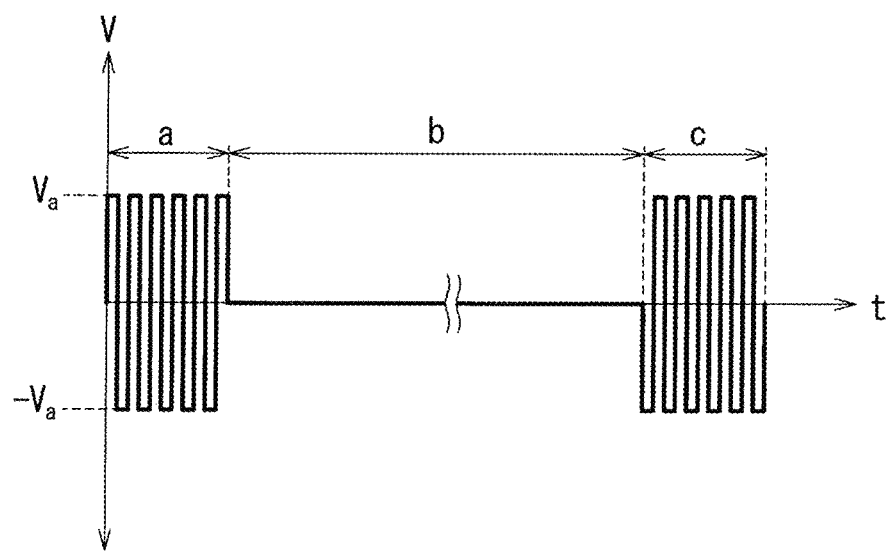
FIG. 44 is a diagram illustrating an example of a waveform of a voltage signal applied to each operation region according to the first embodiment.
Figure 45:
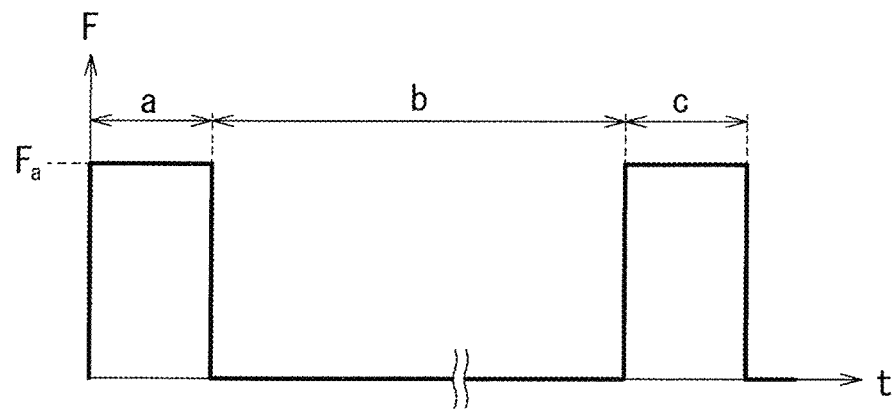
FIG. 45 is a diagram illustrating an example of a frictional force generated when a waveform of the voltage signal of FIG. 44 is applied to each operation region.

As illustrated in FIGS. 44 and 45 pulse waves that have positive and negative amplitudes may be used as the voltage signal s1 and the voltage signal s3. In this case, as compared with the cases of FIGS. 42 and 43 in a cycle of a pulse wave at the operation lower limit position a and the operation upper limit position c, charges are less likely to be accumulated in the dielectric layer 106 and the conductive elastic portion 6, and stable tactile presentation is possible, and it is possible to generate a frictional force about twice as large as that in a case where the voltage signal waveform illustrated in FIG. 42 is applied.

Note that, in the first embodiment, the case where a pulse wave is used as a voltage signal is described as an example. However, the waveform of a voltage signal is not limited to this, and a sine wave or a rectangular wave may be used. For the waveforms, voltages, and frequencies of voltage signals used for the voltage signal s1 and the voltage signal s3, a condition by which a sufficient frictional force that prevents the tactile presentation knob 3 from rotating is selected based on a constituent material of the tactile presentation knob 3 and the tactile presentation panel 100, capacity design of each element, and RC circuit design. Depending on a design condition, the center of a waveform of a voltage signal does not need to be 0 V, and an optimum value for design may be set.

<Effect>

According to the first embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and a human machine interface (HMI) layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

Second Embodiment

<Presentation of Operation Weight Feeling>

In a second embodiment, when the indication position 50 of the tactile presentation knob 3 is present in the operation region b, a tactile sense by which a weight can be felt at the time of operation is presented as compared with the case of the first embodiment. The other configurations are the same as those of the first embodiment, and thus detailed description of the configurations is omitted here.

Hereinafter, a specific example of a configuration of a waveform of a voltage signal will be described. Note that the operation range of the tactile presentation knob 3 and the configuration of a waveform of a voltage signal are similar to those in FIGS. 37 and 38.

First Specific Example

Figure 46:
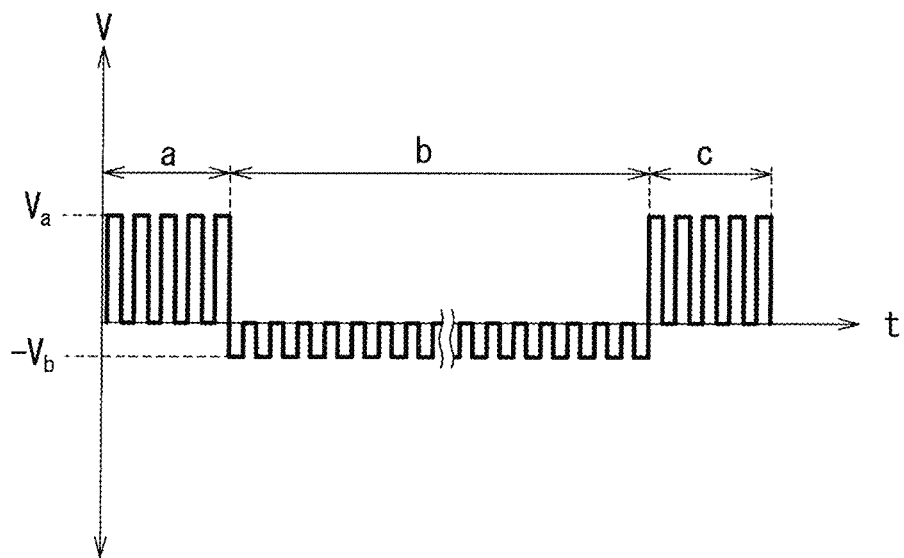
FIG. 46 is a diagram illustrating an example of a waveform of a voltage signal applied to each operation region according to a second embodiment.
Figure 47:
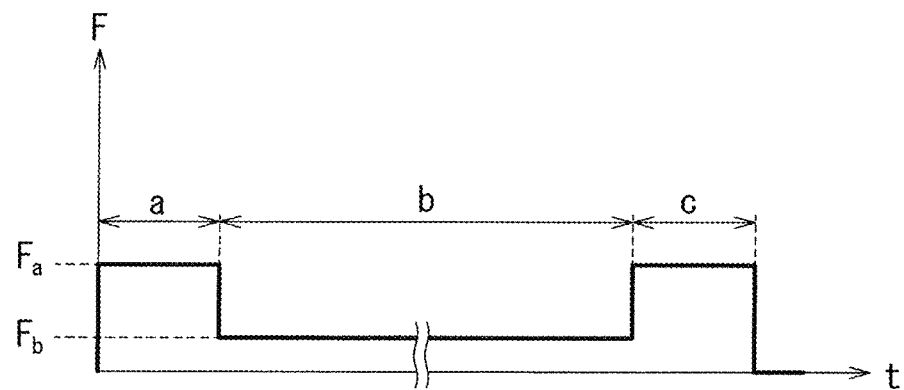
FIG. 47 is a diagram illustrating an example of a frictional force generated when a waveform of the voltage signal of FIG. 46 is applied to each operation region.

FIG. 46 illustrates a waveform of the voltage signal V applied when the indication position 50 of the tactile presentation knob 3 is present at each of the operation lower limit position a, the operation region b, and the operation upper limit position c. FIG. 47 illustrates the frictional force F generated between the tactile presentation knob 3 and the tactile presentation panel 100 when the voltage signal illustrated in FIG. 46 is applied. The same applies to FIGS. 48 to 53 described below.

As illustrated in FIGS. 46 and 47 when the tactile presentation knob 3 is present at the operation lower limit position a or the operation upper limit position c, the positive voltage signal $V_a$ is applied. When the tactile presentation knob 3 is present in the operation region b, a negative voltage signal $-V_b$ is applied. In this case, in the operation region b, not a strong frictional force such as that at the operation lower limit position a and the operation upper limit position c but a frictional force that requires a small force when the tactile presentation knob 3 is rotated is generated, and it is possible to present a heavier operational feeling than that in the first embodiment when the tactile presentation knob 3 is operated.

Second Specific Example

Figure 48:
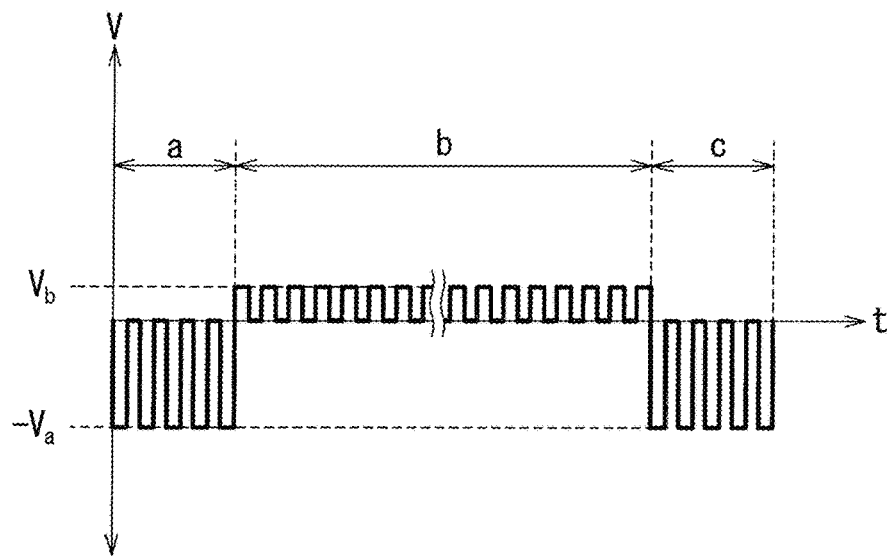
FIG. 48 is a diagram illustrating an example of a waveform of a voltage signal applied to each operation region according to the second embodiment.
Figure 49:
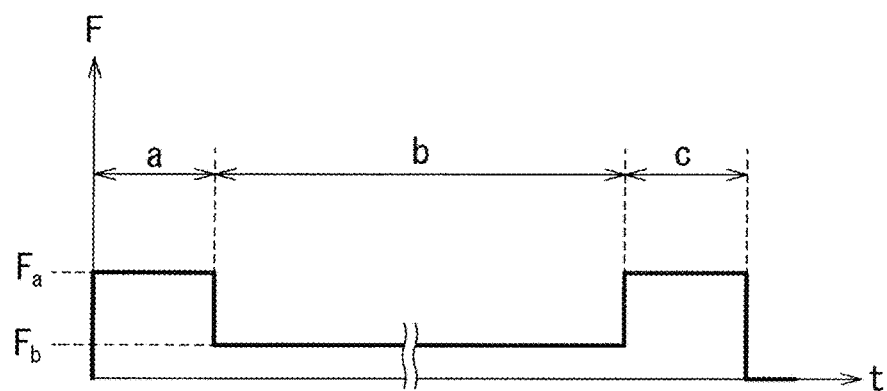
FIG. 49 is a diagram illustrating an example of a frictional force generated when a waveform of the voltage signal of FIG. 48 is applied to each operation region.
Figure 50:
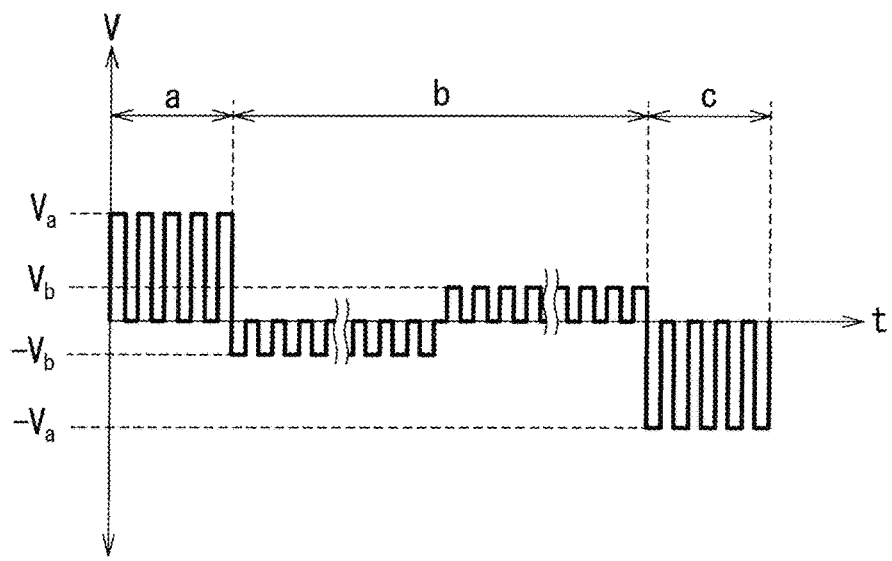
FIG. 50 is a diagram illustrating an example of a waveform of a voltage signal applied to each operation region according to the second embodiment.
Figure 51:
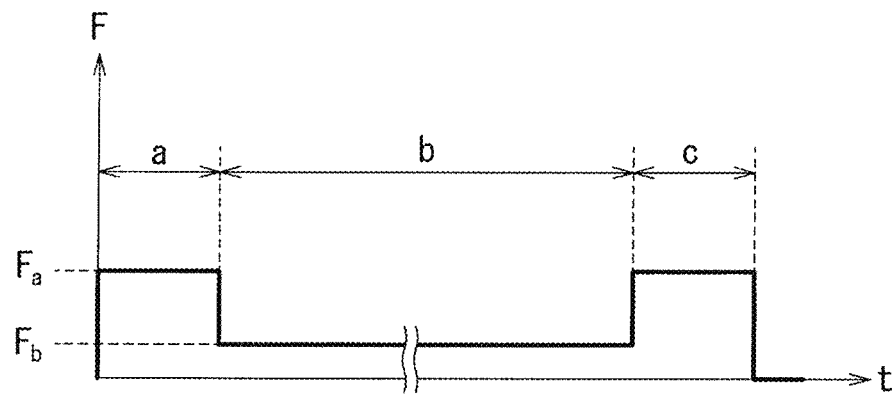
FIG. 51 is a diagram illustrating an example of a frictional force generated when a waveform of the voltage signal of FIG. 50 is applied to each operation region.

As illustrated in FIGS. 48 and 49, a voltage signal may be opposite in positive and negative to that in FIG. 46. Further, as illustrated in FIGS. 50 and 51, the voltage signal s2 may be switched between positive and negative in the operation region b.

In a case where the voltage signals at the operation lower limit position a and the operation upper limit position c are on the same positive and negative sides as the operation region b, a voltage difference between the voltage signal s1 and the voltage signal s2 and between the voltage signal s2 and the voltage signal s3 decreases, and a holding force of the tactile presentation knob 3 decreases. In contrast, in a case where voltage signals at the operation lower limit position a and the operation upper limit position c are opposite in positive and negative from the operation region b, a voltage difference between the voltage signal s1 and the voltage signal s2 and between the voltage signal s2 and the voltage signal s3 increases, so that it is possible to present a strong holding force against operation of the tactile presentation knob 3 at the operation lower limit position a and the operation upper limit position c.

Third Specific Example

Figure 52:
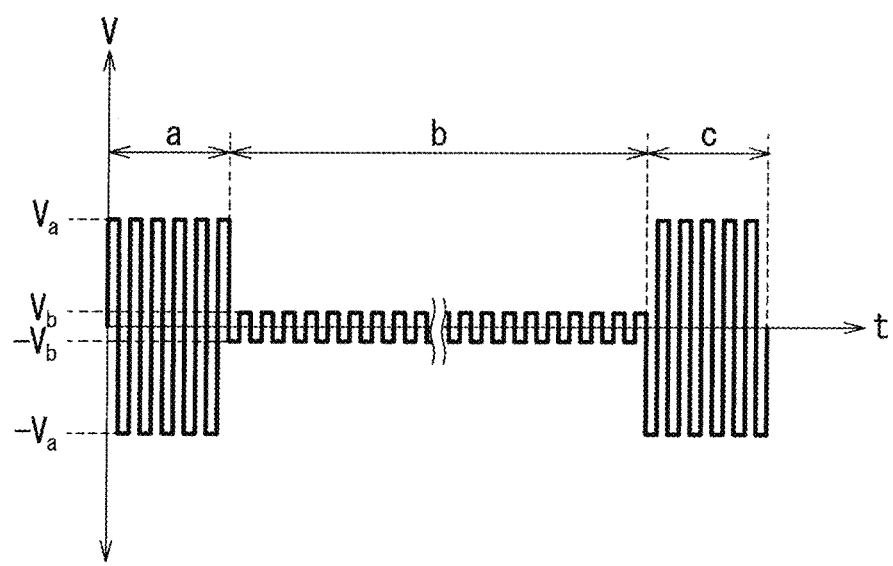
FIG. 52 is a diagram illustrating an example of a waveform of a voltage signal applied to each operation region according to the second embodiment.
Figure 53:
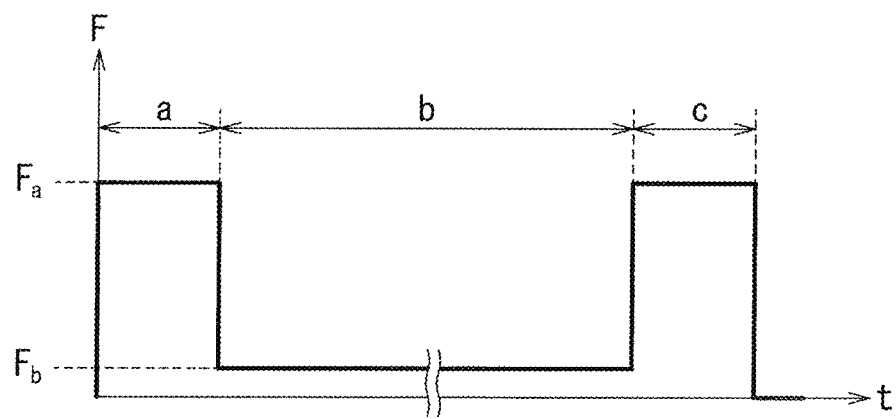
FIG. 53 is a diagram illustrating an example of a frictional force generated when a waveform of the voltage signal of FIG. 52 is applied to each operation region.

As an effective method of suppressing accumulation of charges in the dielectric layer 106 and the conductive elastic portion 6, as illustrated in FIGS. 52 and 53, a waveform that has positive and negative amplitudes around 0 V may be used as a voltage signal. In this case, it is possible to generate a frictional force that is about 2 times that in a case where the voltage signal waveform illustrated in FIGS. 46 and 48 is applied, and it is also possible to reduce voltage of a voltage signal.

Note that, in the second embodiment, the case where a pulse wave is used as a voltage signal is described as an example. However, the waveform of a voltage signal is not limited to this, and a sine wave or a rectangular wave may be used.

<Effect>

According to the second embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In the operable region, a weak frictional force is generated to give a weight feeling to operation, and it is possible to prevent erroneous operation due to a hand shake accompanying a shake of the body of the user during driving of a vehicle. That is, it is possible to obtain an effect of enabling accurate operation even in an environment where vibration may occur. Further, since operation has a weight feeling, an effect of giving a luxurious feeling to an operation device can be obtained.

Third Embodiment

<Presentation of Mechanical Vibration Feeling>

The present third embodiment presents a tactile sense indicating a mechanical vibration feeling of climbing over a projection, such as when a mechanical dial knob is operated while the indication position 50 of the tactile presentation knob 3 is moving in the operation region b. The other configurations are the same as those of the first embodiment, and thus detailed description of the configurations is omitted here.

Hereinafter, a specific example of a configuration of a waveform of a voltage signal will be described. Note that the operation range of the tactile presentation knob 3 and the configuration of a waveform of a voltage signal are similar to those in FIGS. 37 and 38.

First Specific Example

Figure 54:
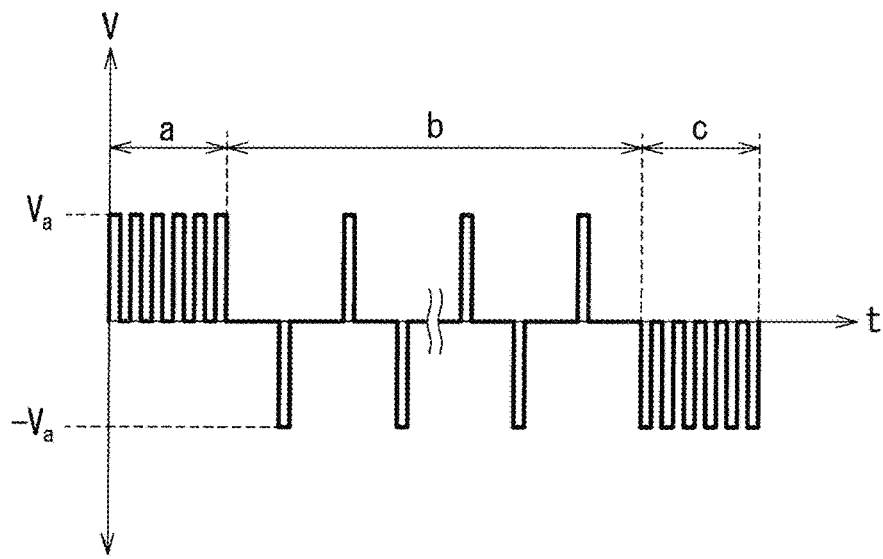
FIG. 54 is a diagram illustrating an example of a waveform of a voltage signal applied to each operation region according to a third embodiment.
Figure 55:
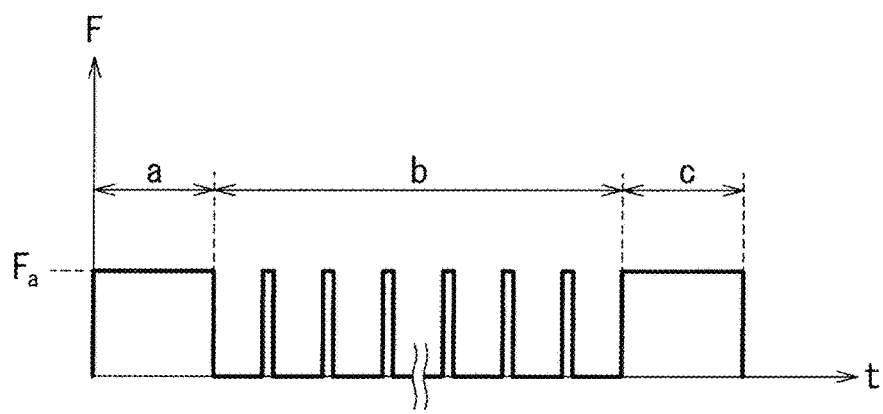
FIG. 55 is a diagram illustrating an example of a frictional force generated when a waveform of the voltage signal of FIG. 54 is applied to each operation region.

FIG. 55 FIG. 54 illustrates an example in which the positive voltage signal $V_a$ or a negative voltage signal $-V_a$ is applied to the operation lower limit position a and the operation upper limit position c, and the positive and negative voltage signals $V_a$ and $-V_a$ are alternately applied to the operation region b at an optional cycle. FIG. 55 illustrates the frictional force F generated between the tactile presentation knob 3 and the tactile presentation panel 100 when the voltage signal illustrated in FIG. 54 is applied. The same applies to FIGS. 56 to 63 described below.

As illustrated in FIGS. 54 and 55 when the tactile presentation knob 3 is present at the operation lower limit position a or the operation upper limit position c, a strong attraction force is generated, operation of the tactile presentation knob 3 is stopped by attraction, and operation in the direction of the non-operation region d cannot be performed. In the operation region b, a period in which a frictional force is generated and a period in which no frictional force is generated are alternately generated, and rotation operation of the tactile presentation knob 3 alternately repeats catching and sliding. In this manner, the tactile presentation knob 3 presents a tactile sense indicating a fine vibration feeling to the indicator 2.

In FIGS. 54 and 55, voltage signals of the same voltage are applied at both the operation lower limit position a and the operation upper limit position c and also the operation region b. However, the higher the voltage signal applied to the operation region b, the stronger the tactile strength becomes, and a tactile feeling of climbing over a higher projection is presented.

Second Specific Example

Figure 56:
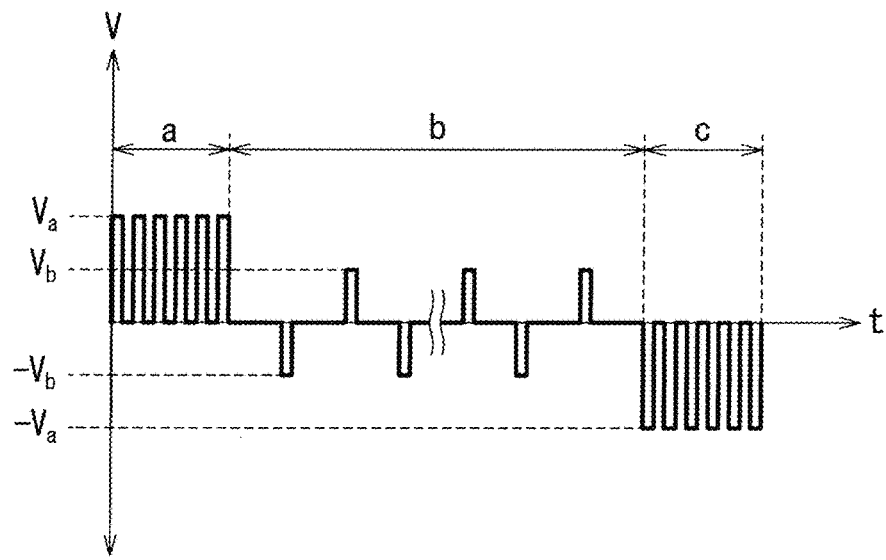
FIG. 56 is a diagram illustrating an example of a waveform of a voltage signal applied to each operation region according to the third embodiment.
Figure 57:
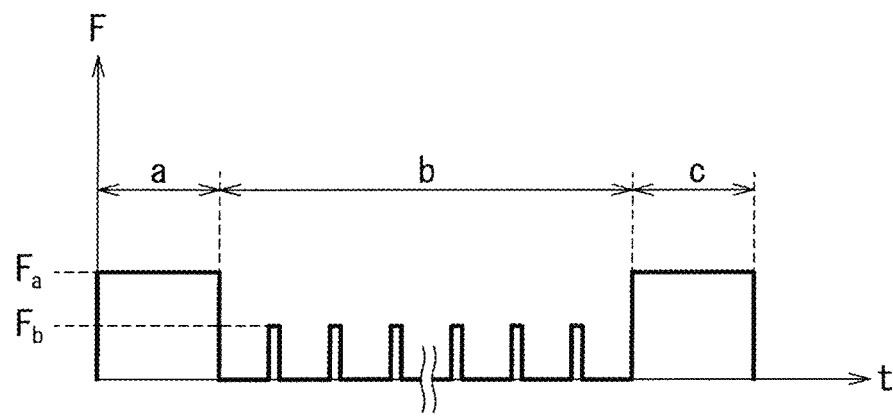
FIG. 57 is a diagram illustrating an example of a frictional force generated when a waveform of the voltage signal of FIG. 56 is applied to each operation region.

As a cycle of a voltage signal applied to the operation region b is larger, a tactile sense of finer vibration can be presented. In a case where a vibration feeling is presented with a lighter operation feeling, as illustrated in FIGS. 56 and 57 an amplitude of a voltage signal applied to the operation region b only needs to be set to be smaller than an amplitude of a voltage signal applied to the operation lower limit position a or the operation upper limit position c.

Third Specific Example

Figure 58:
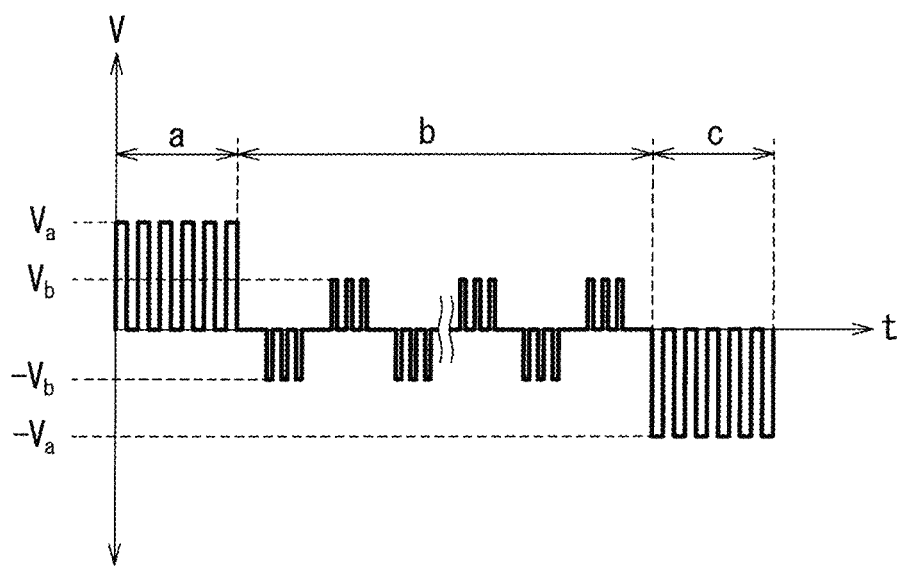
FIG. 58 is a diagram illustrating an example of a waveform of a voltage signal applied to each operation region according to the third embodiment.
Figure 59:
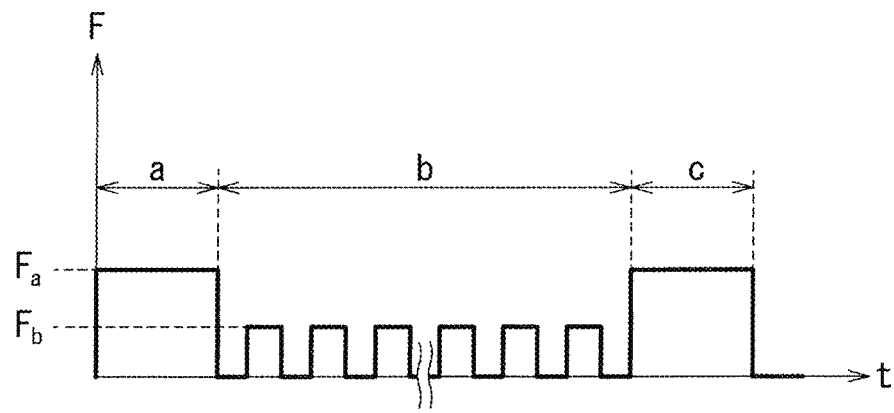
FIG. 59 is a diagram illustrating an example of a frictional force generated when a waveform of the voltage signal of FIG. 58 is applied to each operation region.

As illustrated in FIGS. 58 and 59, when a period during which a voltage signal is applied within one cycle of the operation region b is lengthened, a tactile sense to be presented becomes stronger as also described in FIG. 39 of the first embodiment. In this case, the user perceives that the width of a projecting shape is large.

Fourth Specific Example

Figure 60:
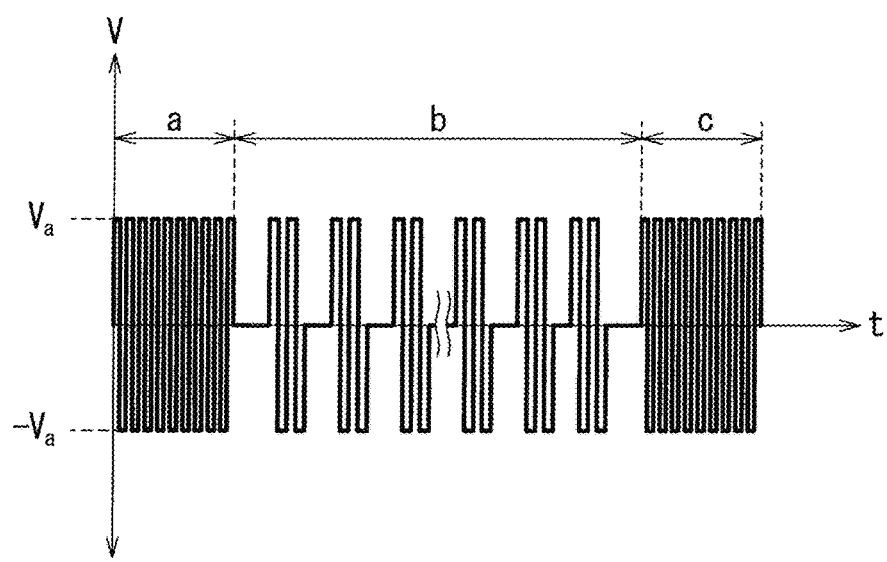
FIG. 60 is a diagram illustrating an example of a waveform of a voltage signal applied to each operation region according to the third embodiment.
Figure 61:
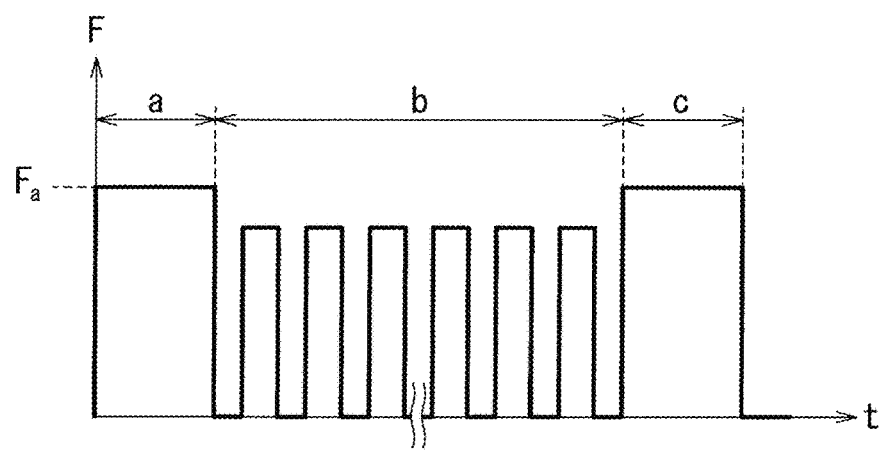
FIG. 61 is a diagram illustrating an example of a frictional force generated when a waveform of the voltage signal of FIG. 60 is applied to each operation region.
Figure 62:
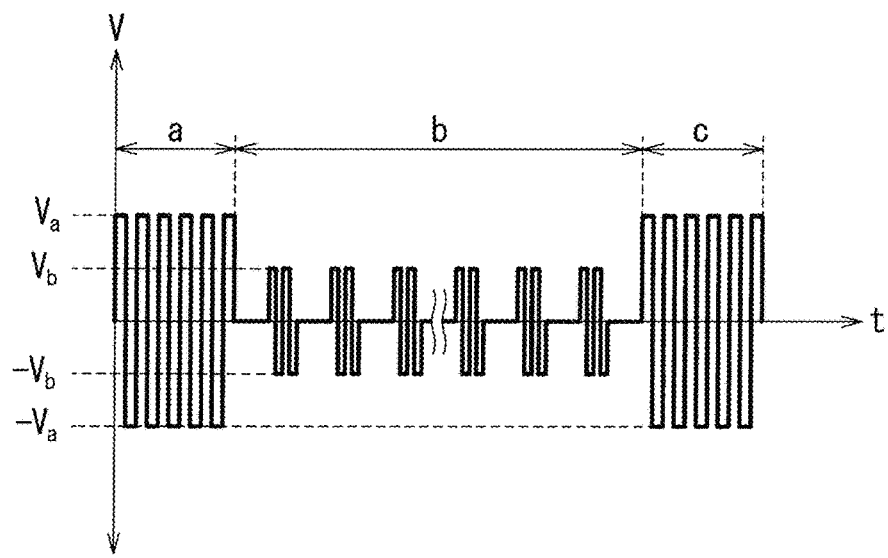
FIG. 62 is a diagram illustrating an example of a waveform of a voltage signal applied to each operation region according to the third embodiment.
Figure 63:
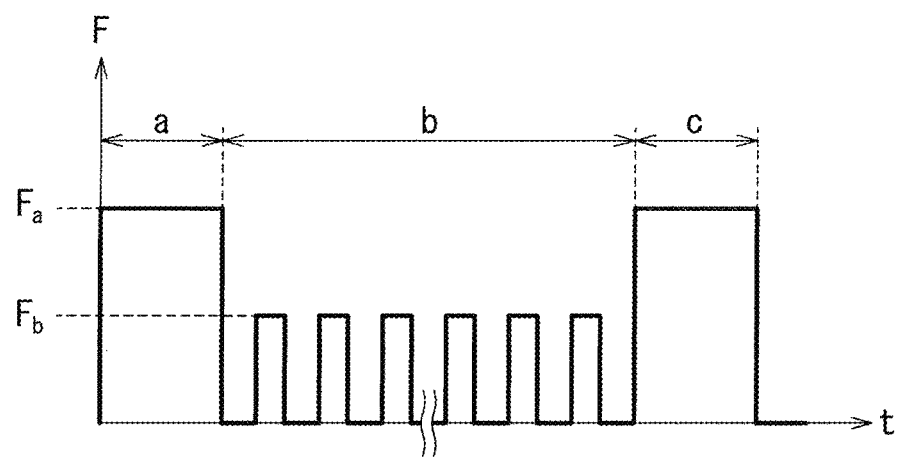
FIG. 63 is a diagram illustrating an example of a frictional force generated when a waveform of the voltage signal of FIG. 62 is applied to each operation region.

As illustrated in FIGS. 60 to 63 voltage signals having different waveforms may be applied to both the operation lower limit position a and the operation upper limit position c and also the operation region b. In general, it is said that a human can perceive vibration of several tens to several hundreds of Hz, and a tactile sense to be perceived differs depending on a frequency. Therefore, a frequency of a voltage signal applied to the operation region b may be a frequency most suitable for a tactile sense to be presented within the above frequency range. In the case of a pulse wave and a rectangular wave, for example, in a case where the waveform of FIG. 60 is applied to the tactile electrode 102a, an opposite-phase voltage signal only needs to be applied to an adjacent one of the tactile electrode 102b. Further, in the case of a sine wave, different frequencies only need to be applied to the tactile electrode 102a and the tactile electrode 102b so that a beat waveform generated from two types of voltage signals becomes the waveform of FIG. 60.

<Effect>

According to the third embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In an operable region, depending on the presence or absence of generation of a frictional force, catching and a slipping phenomenon are generated on operation of the tactile presentation knob 3, and a vibration feeling is given to the user as if the tactile presentation knob 3 generates mechanical vibration. In this manner, the user can perceive operation of tactile presentation knob 3 by a tactile sense without relying on a visual sense.

Fourth Embodiment

<Presentation of Neutral Position>

Figure 64:
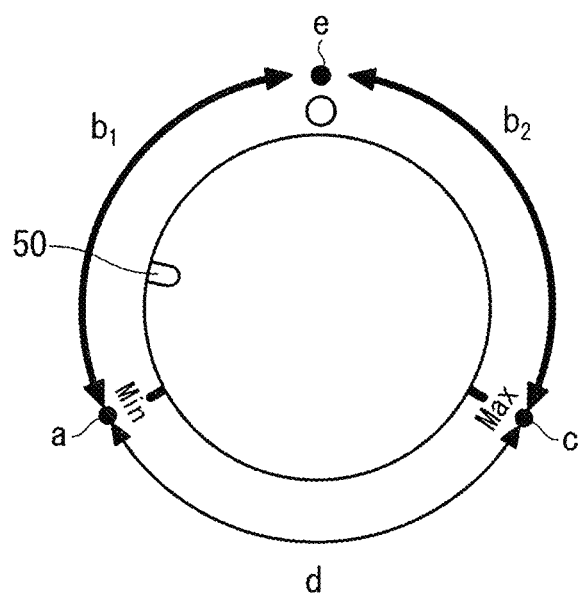
FIG. 64 is a diagram for explaining an operation region of the tactile presentation knob according to a fourth embodiment.

As illustrated in FIG. 64, in a present fourth embodiment, a neutral position e (neutral position region) is set at the center of an operation region. An operation region $b_1$ and an operation region $b_2$ indicate regions where rotation operation of the tactile presentation knob 3 is possible. The other configurations are the same as those of the first embodiment, and thus detailed description of the configurations is omitted here.

The neutral position e has a meaning of a reference point of the operation region, and is a reference position at which the user perceives an operation amount of operation.

Figure 65:
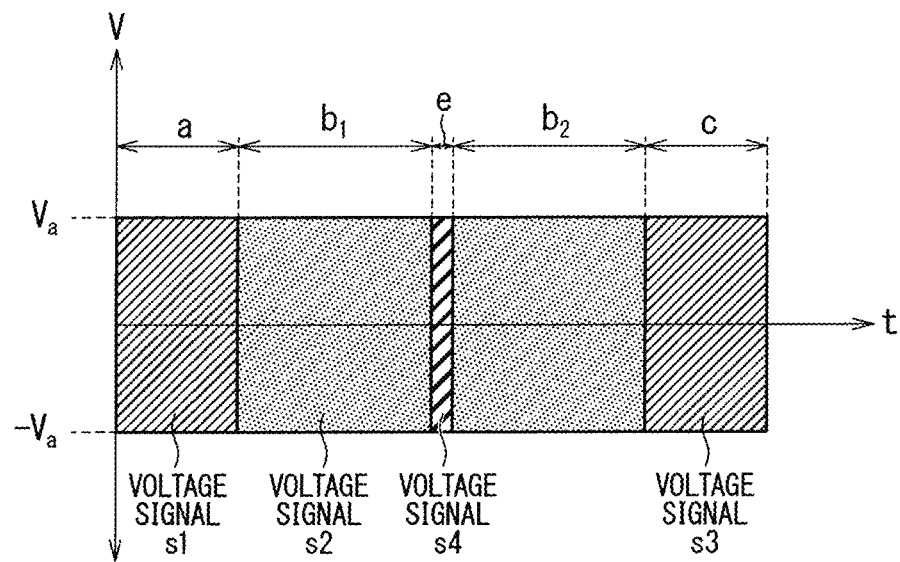
FIG. 65 is a diagram illustrating an example of a waveform configuration of a voltage signal applied to each operation region when the tactile presentation knob according to the fourth embodiment is operated.

FIG. 65 is a diagram illustrating an example of a configuration of a waveform of a voltage signal applied when the indication position 50 of the tactile presentation knob 3 is present at each of the operation lower limit position a, the operation region $b_1$, the neutral position e, the operation region $b_2$, and the operation upper limit position c. Specifically, while the indication position 50 is at the operation lower limit position a, a voltage signal s1 is applied. Then, the voltage signal s2 is applied while the indication position 50 rotates from the operation lower limit position a toward the neutral position e in the operation region and a voltage signal s4 is applied while the indication position 50 is at the neutral position e. After the above, the voltage signal s2 is applied while the indication position 50 rotates from the neutral position e toward the operation upper limit position c in the operation region $b_2$, and the voltage signal s3 is applied while the indication position 50 is at the operation upper limit position c.

Hereinafter, a specific example of the configuration of a waveform of a voltage signal illustrated in FIG. 65 will be described.

First Specific Example

Figure 66:
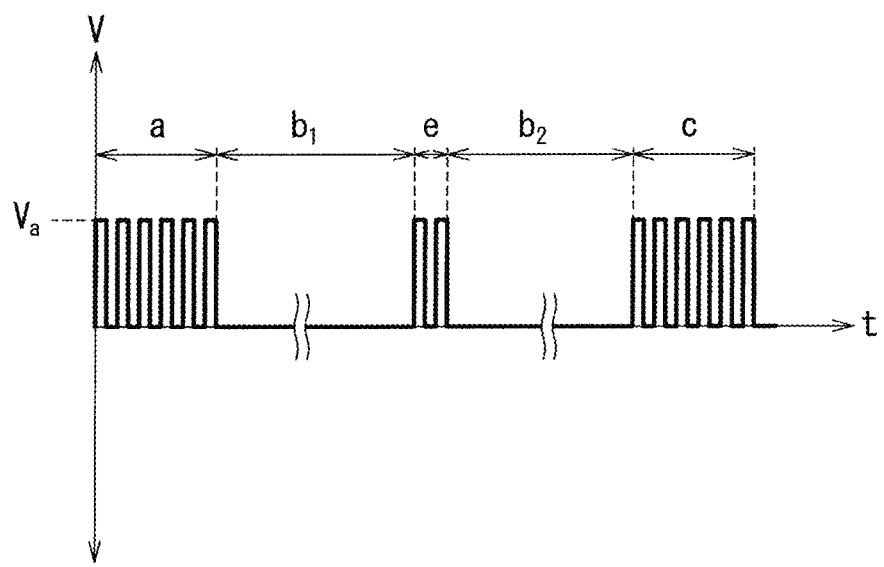
FIG. 66 is a diagram illustrating an example of a waveform of a voltage signal applied to each operation region according to the fourth embodiment.
Figure 67:
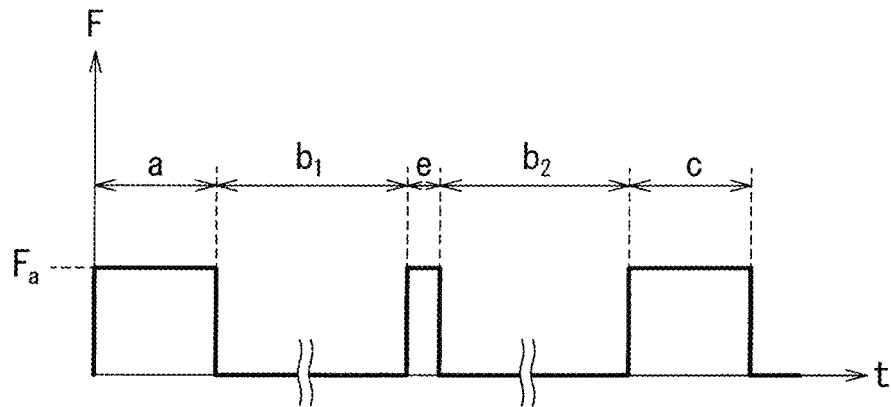
FIG. 67 is a diagram illustrating an example of a frictional force generated when a waveform of the voltage signal of FIG. 66 is applied to each operation region.

FIG. 66 illustrates a waveform of the voltage signal V applied when the indication position 50 of the tactile presentation knob 3 is present at each of the operation lower limit position a, the operation region $b_1$, the neutral position e, the operation region $b_2$, and the operation upper limit position c. FIG. 67 illustrates the frictional force F generated between the tactile presentation knob 3 and the tactile presentation panel 100 when the voltage signal illustrated in FIG. 66 is applied. The same applies to FIGS. 68 to 85 described below.

As illustrated in FIGS. 66 and 67 when the tactile presentation knob 3 is present at the operation lower limit position a or the operation upper limit position c, the positive voltage signal $V_a$ is applied. When the tactile presentation knob 3 is present in the operation regions $b_1$ and $b_2$, no voltage signal is applied. When the tactile presentation knob 3 is present at the neutral position e, the positive voltage signal $V_a$ is applied. In the cases of FIGS. 66 and 67, in the operation regions $b_1$ and $b_2$, only a dynamic frictional force caused by a material and a surface shape of the dielectric layer 106 and the conductive elastic portion 6 acts on the tactile presentation knob 3, so that the user can smoothly operate the tactile presentation knob 3 with a light operation feeling. Further, since the voltage signal is applied when the tactile presentation knob 3 passes through the neutral position e, the user perceives a strong climbing feeling as if the tactile presentation knob 3 climbs over a projection that is narrow and high.

Second Specific Example

Figure 68:
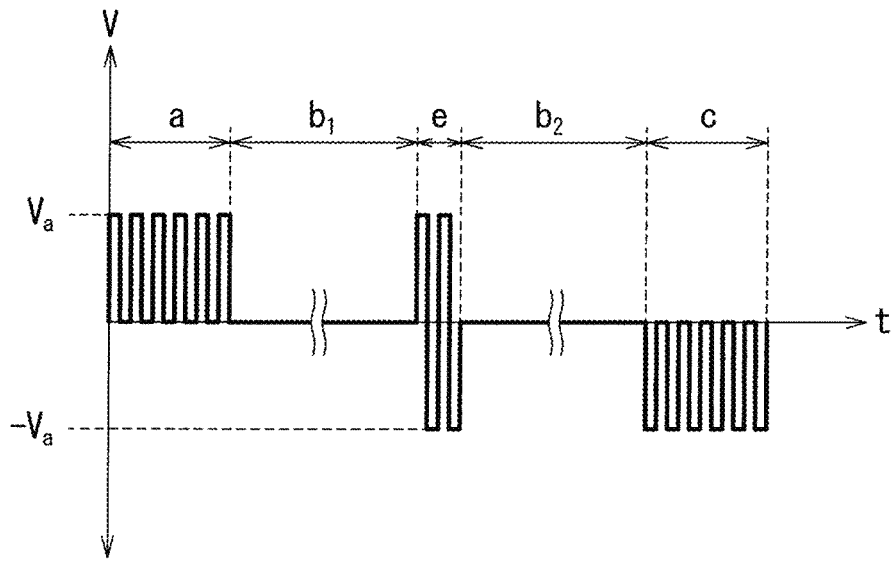
FIG. 68 is a diagram illustrating an example of a waveform of a voltage signal applied to each operation region according to the fourth embodiment.
Figure 69:
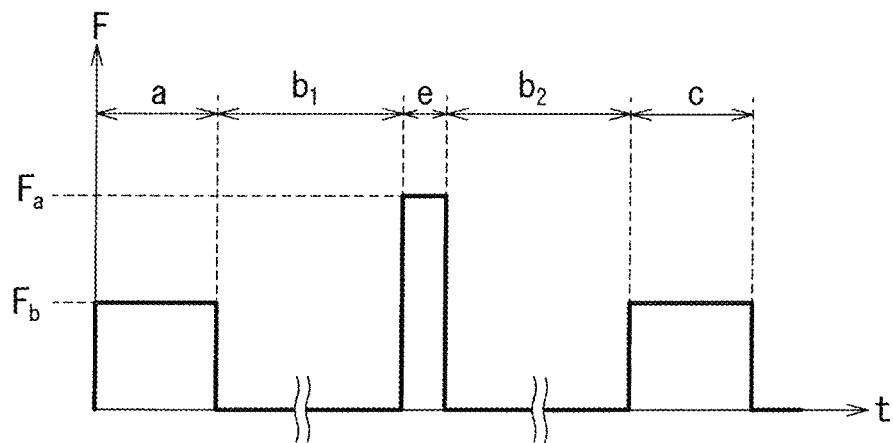
FIG. 69 is a diagram illustrating an example of a frictional force generated when a waveform of the voltage signal of FIG. 68 is applied to each operation region.

As illustrated in FIGS. 68 and 69, when a signal having an amplitude of the positive voltage signal $V_a$ and the negative voltage signal $-V_a$ is input, a period during which the voltage signal is applied becomes longer in a period of the neutral position e than in the case of FIGS. 66 and 67. Therefore, it is possible to present a stronger tactile sense to the user, and it is possible to present a feeling of climbing over a higher projection.

Third Specific Example

Figure 70:
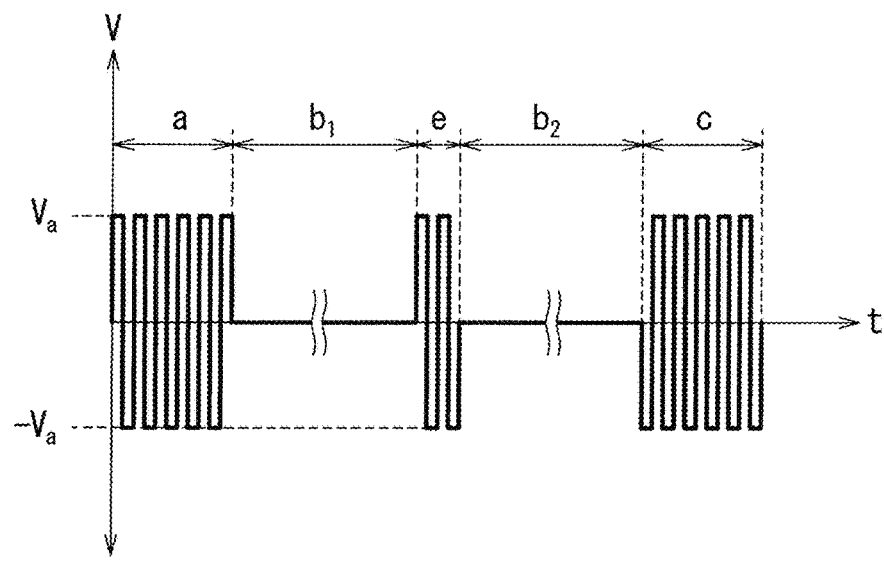
FIG. 70 is a diagram illustrating an example of a waveform of a voltage signal applied to each operation region according to the fourth embodiment.
Figure 71:
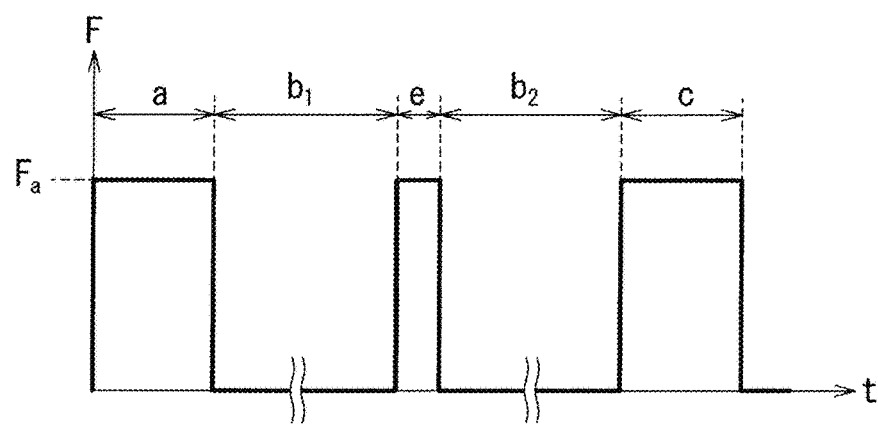
FIG. 71 is a diagram illustrating an example of a frictional force generated when a waveform of the voltage signal of FIG. 70 is applied to each operation region.

FIGS. 70 and 71 illustrate an example of a case where waveforms of the voltage signals applied at the operation lower limit position a and the operation upper limit position c are waveforms having an amplitude of the positive voltage $V_a$ and the negative voltage $-V_a$. In this case, the voltage signal of $V_a$ or $-V_a$ is always applied as compared with the voltage signal having a waveform with an amplitude from zero to $V_a$ as illustrated in FIGS. 66 to 69, and a stronger attraction force acts.

Fourth Specific Example

Figure 72:
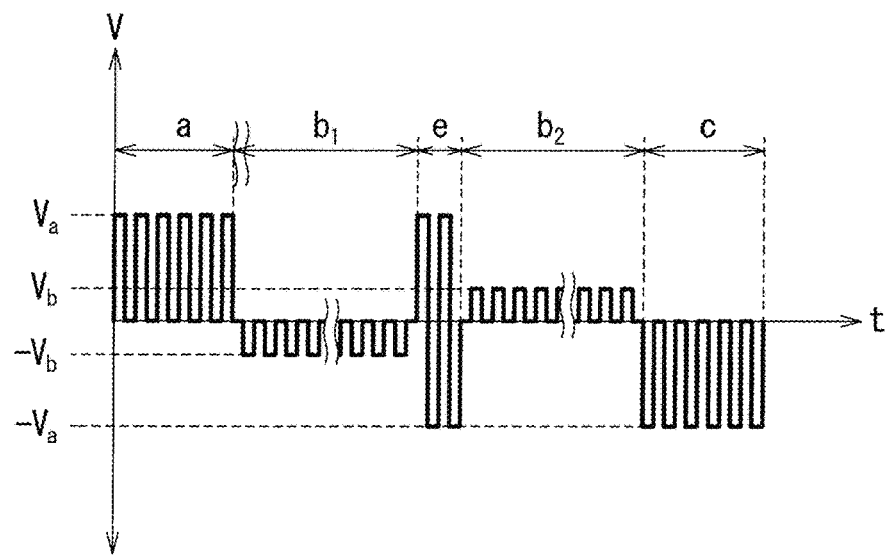
FIG. 72 is a diagram illustrating an example of a waveform of a voltage signal applied to each operation region according to the fourth embodiment.
Figure 73:
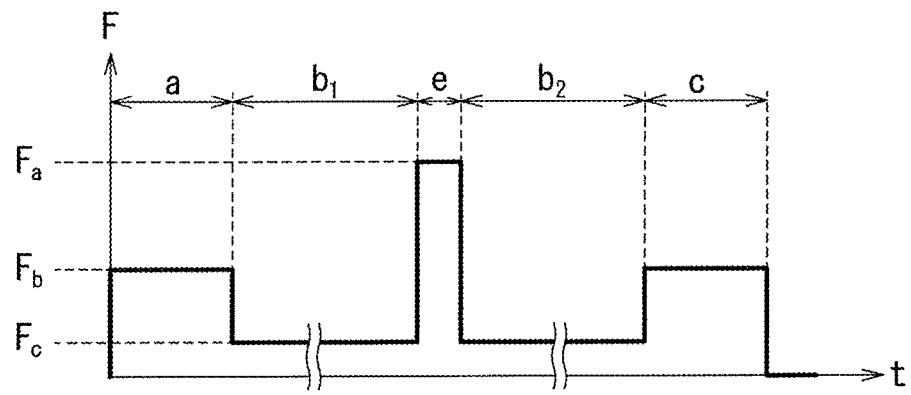
FIG. 73 is a diagram illustrating an example of a frictional force generated when a waveform of the voltage signal of FIG. 72 is applied to each operation region.

As illustrated in FIGS. 72 and 73, by applying the voltage signals of voltages $V_b$ and $-V_b$ when the indication position 50 is present in the operation regions $b_1$ and $b_2$, it is possible to present a tactile sense having a heavier operation feeling in the operation region (having a weaker frictional force between the dielectric layer 106 and the conductive elastic portion 6) than in the case of FIGS. 66 to 69. Since a weak frictional force is generated when the indication position 50 is present in the operation regions b1 and $b_2$, a tactile sense at the neutral position e may be made clearer than a tactile sense at the operation regions b1 and $b_2$ by increasing a voltage signal applied when the indication position 50 is present in the neutral position e or widening the neutral position e.

Fifth Specific Example

Figure 74:
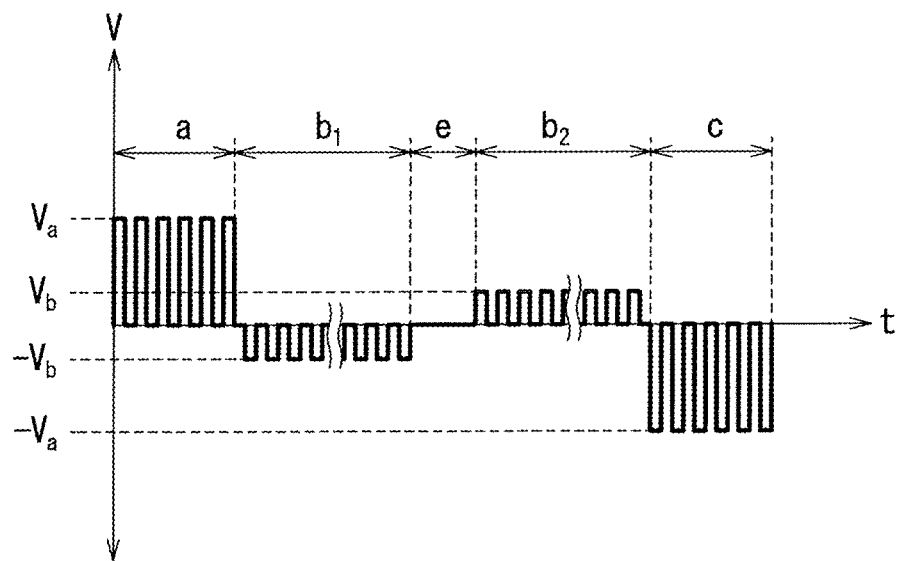
FIG. 74 is a diagram illustrating an example of a waveform of a voltage signal applied to each operation region according to the fourth embodiment.
Figure 75:
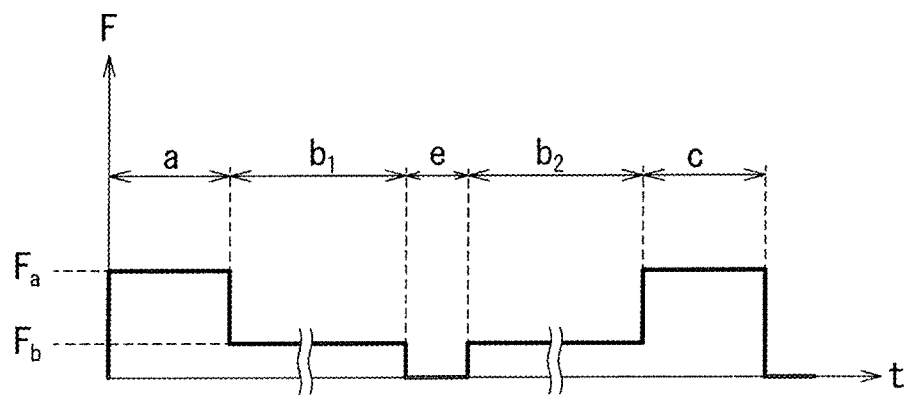
FIG. 75 is a diagram illustrating an example of a frictional force generated when a waveform of the voltage signal of FIG. 74 is applied to each operation region.

FIGS. 74 and 75 illustrate an example of a waveform of a voltage signal in a case where the neutral position e is presented with a slippage sense. In this case, when the indication position 50 of the tactile presentation knob 3 is present at the neutral position e, no voltage signal is applied, and a frictional force between the dielectric layer 106 and the conductive elastic portion 6 is only a dynamic frictional force caused by a material and a surface shape. Therefore, since the tactile presentation knob 3 smoothly rotates when the position from the operation region b1 to the neutral position e, and there is a frictional force when the position moves from the neutral position e to the operation region $b_2$, it is possible to present the user with a tactile sense as if the tactile presentation knob 3 is attracted to the neutral position e.

Sixth Specific Example

Figure 76:
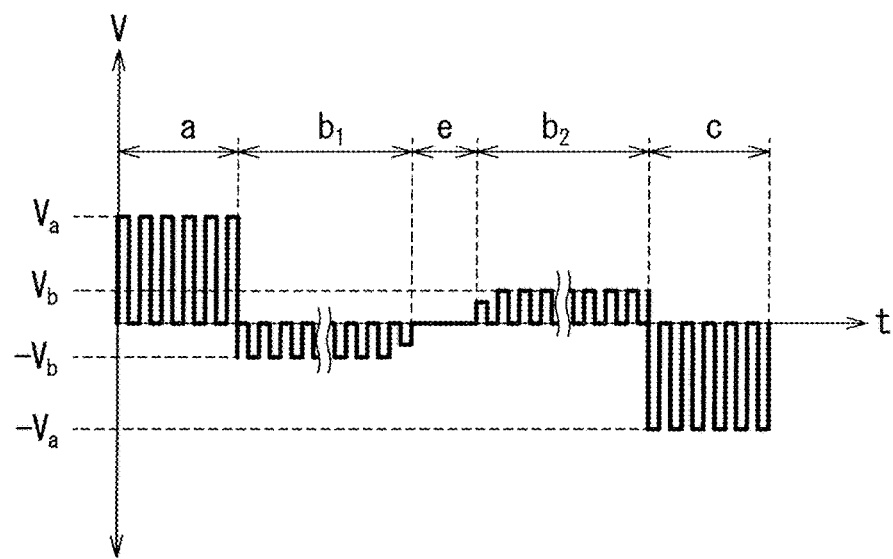
FIG. 76 is a diagram illustrating an example of a waveform of a voltage signal applied to each operation region according to the fourth embodiment.
Figure 77:
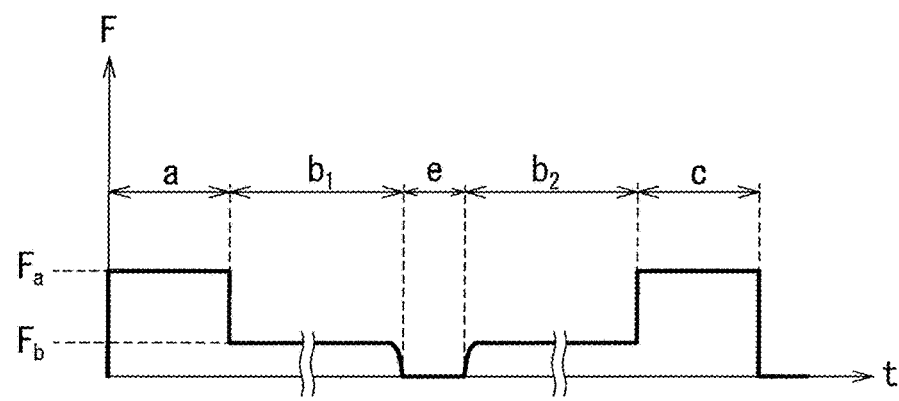
FIG. 77 is a diagram illustrating an example of a frictional force generated when a waveform of the voltage signal of FIG. 76 is applied to each operation region.

As illustrated in FIGS. 76 and H by gently changing a voltage signal near a boundary between the operation regions b1 and $b_2$ and the neutral position e, a tactile sense of the tactile presentation knob 3 that is more smoothly attracted to the neutral position e can be presented to the user.

Seventh Specific Example

Figure 78:
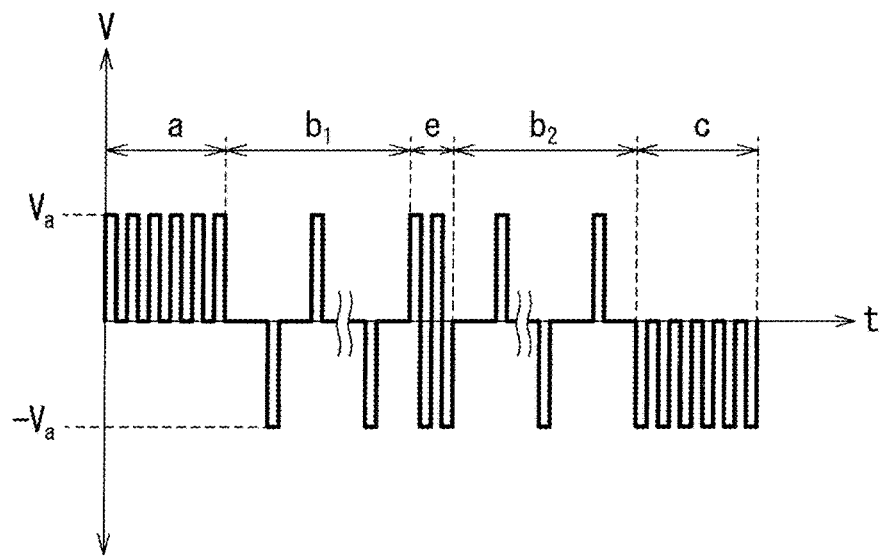
FIG. 78 is a diagram illustrating an example of a waveform of a voltage signal applied to each operation region according to the fourth embodiment.
Figure 79:
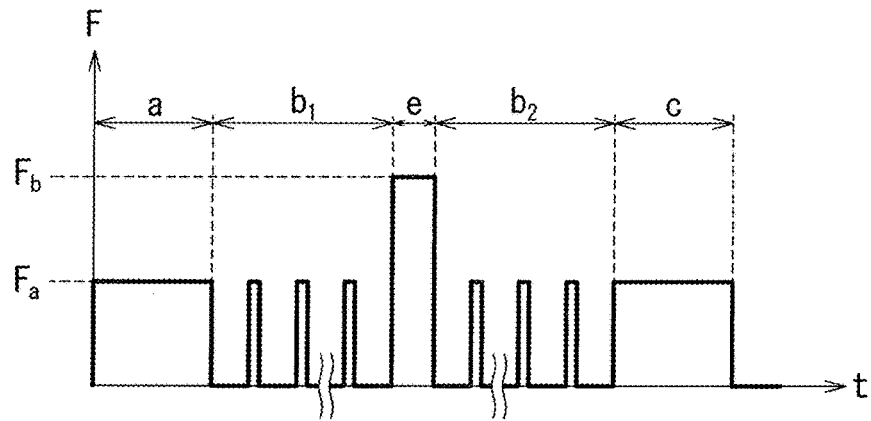
FIG. 79 is a diagram illustrating an example of a frictional force generated when a waveform of the voltage signal of FIG. 78 is applied to each operation region.

FIGS. 78 and 79 illustrate an example of a waveform of a voltage signal that presents the neutral position e with a tactile sense and presents a tactile sense indicating a mechanical vibration feeling as described in the third embodiment when the indication position 50 is present in the operation regions $b_1$ and $b_2$.

When the indication position 50 is present in the operation regions $b_1$ and $b_2$, the voltage signal $V_a$ or $-V_a$ is applied at an optional cycle. In contrast, when the indication position 50 is present in the neutral position e, the amplitudes of the voltage signals $V_a$ and $-V_a$ are applied, so that it is possible to present a tactile sense as if crossing a separation that is different from a mechanical vibration feeling.

Eighth Specific Example

Figure 80:
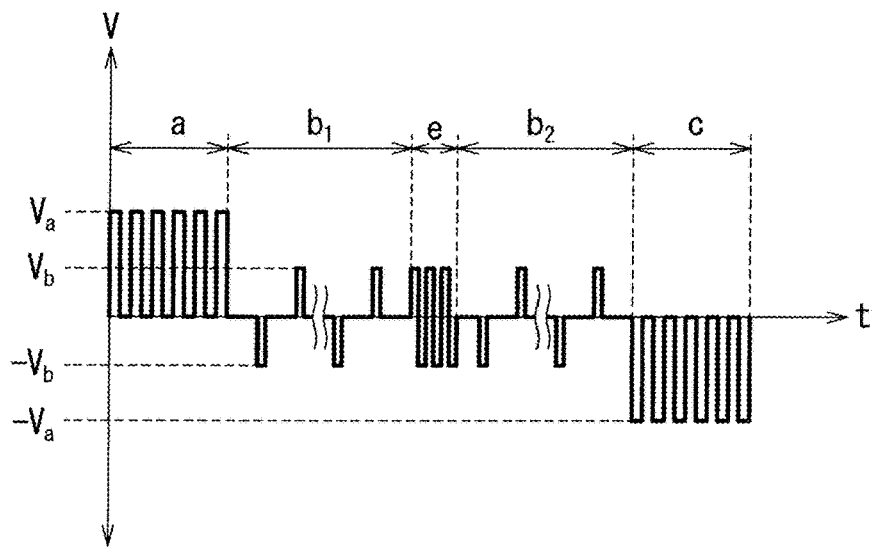
FIG. 80 is a diagram illustrating an example of a waveform of a voltage signal applied to each operation region according to the fourth embodiment.
Figure 81:
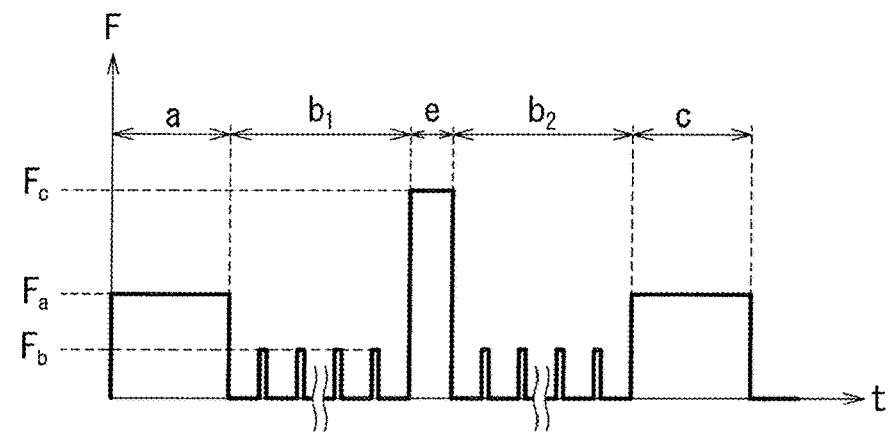
FIG. 81 is a diagram illustrating an example of a frictional force generated when a waveform of the voltage signal of FIG. 80 is applied to each operation region.

As illustrated in FIGS. 80 and 81, by making voltage signals applied to the operation regions $b_1$ and $b_2$ and the neutral position e lower than voltage signals applied to the operation lower limit position a and the operation upper limit position c, it is possible to more clearly present an attraction force at the operation lower limit position a and the operation upper limit position c. In a case where it is desired to pay more attention to perception of the operation range for the user, this combination of waveforms is effective.

Ninth Specific Example

Figure 82:
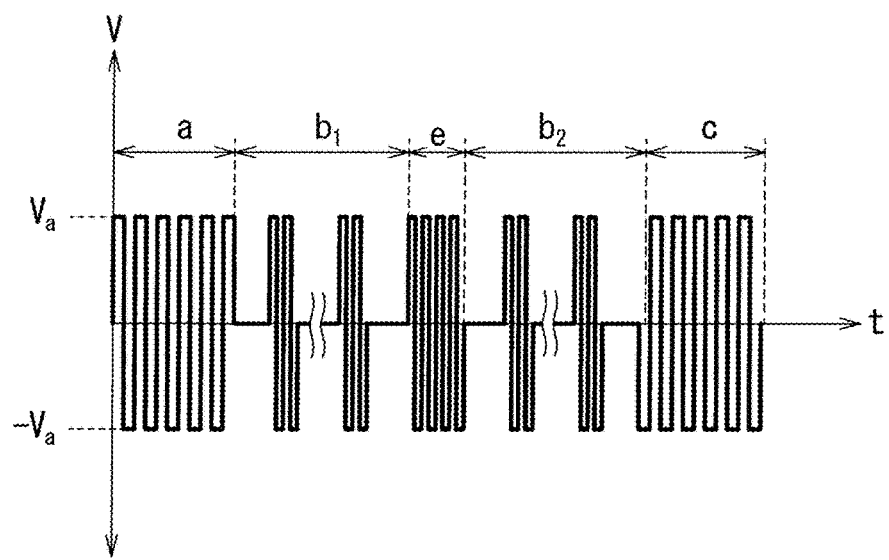
FIG. 82 is a diagram illustrating an example of a waveform of a voltage signal applied to each operation region according to the fourth embodiment.
Figure 83:
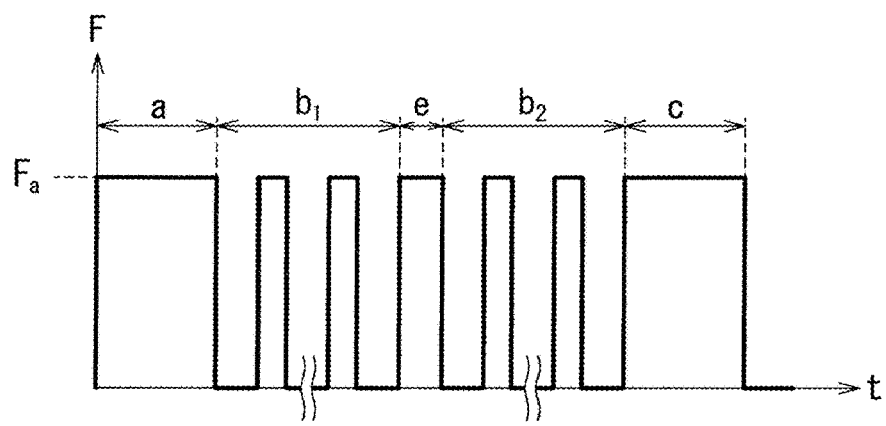
FIG. 83 is a diagram illustrating an example of a frictional force generated when a waveform of the voltage signal of FIG. 82 is applied to each operation region.

FIGS. 82 and 83 illustrate an example of waveforms of voltage signals in a case where the waveforms are the same at all of the operation lower limit position a, the operation regions $b_1$ and $b_2$, the operation upper limit position c, and the neutral position e. When the indication position 50 is present at the operation lower limit position a, the operation upper limit position c, or the neutral position e, a voltage signal having an amplitude $\pm V_a$ is continuously applied, and application time of the voltage signal is made shorter at the neutral position e than at the operation lower limit position a and the operation upper limit position c.

When the indication position 50 is present in the operation regions $b_1$ and $b_2$, voltage signals having the same amplitude $\pm V_a$ are periodically applied. In this manner, even with the same signal waveform, it is possible to present three types of tactile senses such as stopping of operation by an attraction force at the operation lower limit position a and the operation upper limit position c, a climbing feeling over a projection shape with a height at the neutral position e, and a tactile sense of a mechanical vibration feeling at the time of operation.

In the case of using a waveform of a voltage signal that has positive and negative amplitudes, since time during which the voltage signal is applied is longer than that in the case of only the positive or negative voltage and the tactile strength is also strong, and the waveform is preferably used in a case where the strength is required for a presented tactile sense, such as operation in an environment where vibration may occur or operation through a glove.

Tenth Specific Example

Figure 84:
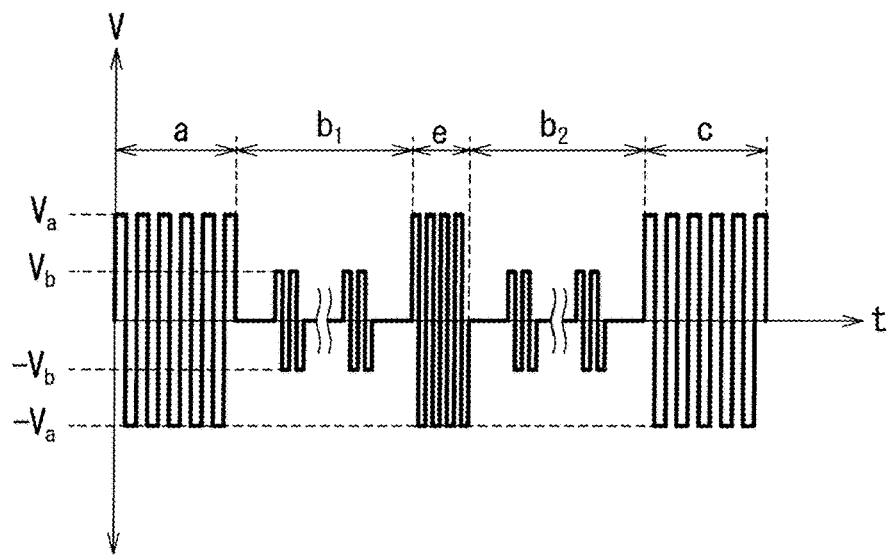
FIG. 84 is a diagram illustrating an example of a waveform of a voltage signal applied to each operation region according to the fourth embodiment.
Figure 85:
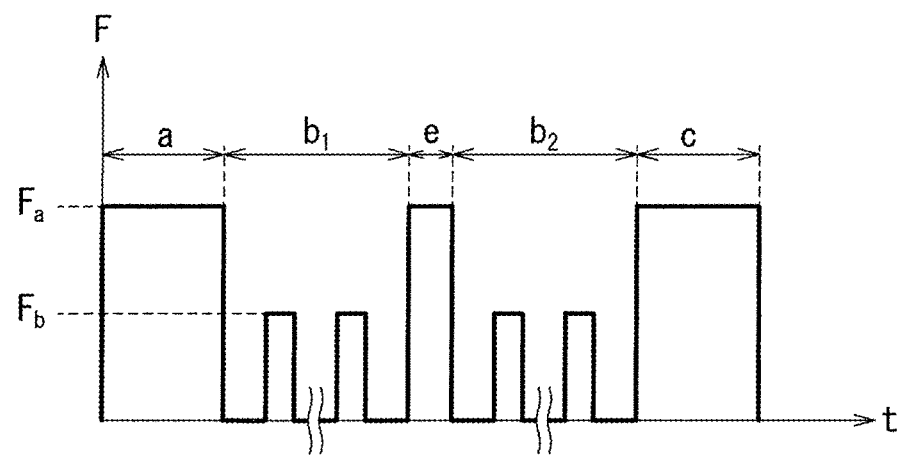
FIG. 85 is a diagram illustrating an example of a frictional force generated when a waveform of the voltage signal of FIG. 84 is applied to each operation region.

As illustrated in FIGS. 84 and 85, by setting the voltage signals of the operation regions $b_1$ and $b_2$ to be lower than a voltage signal of the other regions, a frictional force at the time of operation of the operation regions $b_1$ and $b_2$ is reduced, so that an operational feeling is reduced. Further, the shape of a projection perceived by a vibration feeling is lower in height and more rounded than in the case of FIGS. 72 and 73. As described above, by adjusting time for applying voltage signals with the same waveform and a cycle between time for applying a voltage signal and time for not applying a voltage signal, it is possible to freely create a tactile sense.

<Effect>

According to the fourth embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In an operable region, depending on the presence or absence of generation of a frictional force, catching and a slipping phenomenon are generated on operation of the tactile presentation knob 3, and a vibration feeling is given to the user as if the tactile presentation knob 3 generates mechanical vibration. In this manner, the user can perceive operation of tactile presentation knob 3 by a tactile sense without relying on a visual sense.

By presenting a strong tactile sense different from that in the operation region at the position serving as a reference of operation, the user can perceive the reference position of the operation and an operation amount by a tactile sense without depending on vision.

Fifth Embodiment

<Presentation of Scale>

Figure 86:
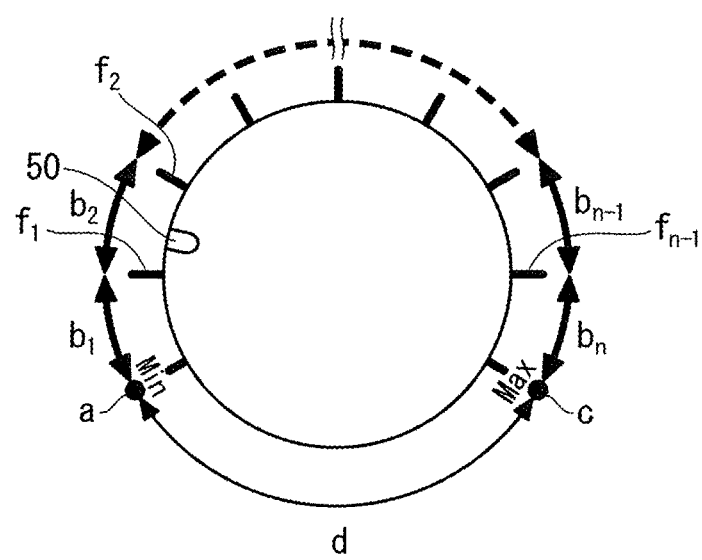
FIG. 86 is a diagram for explaining an operation region of the tactile presentation knob according to a fifth embodiment.

As illustrated in FIG. 86, in a fifth embodiment, a scale is set in an operation region. The operation regions $b_1$ to $b_n$ indicate regions where rotation operation of the tactile presentation knob 3 is possible. Between the operation regions $b_1$ to $b_n$, there are scale regions $f_1$ to $f_{n-1}$ indicating separations of the operation regions $b_1$ to $b_n$. The scale regions $f_1$ to $f_{n-1}$ are set to indicate an operation amount to the user. The other configurations are the same as those of the first embodiment, and thus detailed description of the configurations is omitted here.

Figure 87:
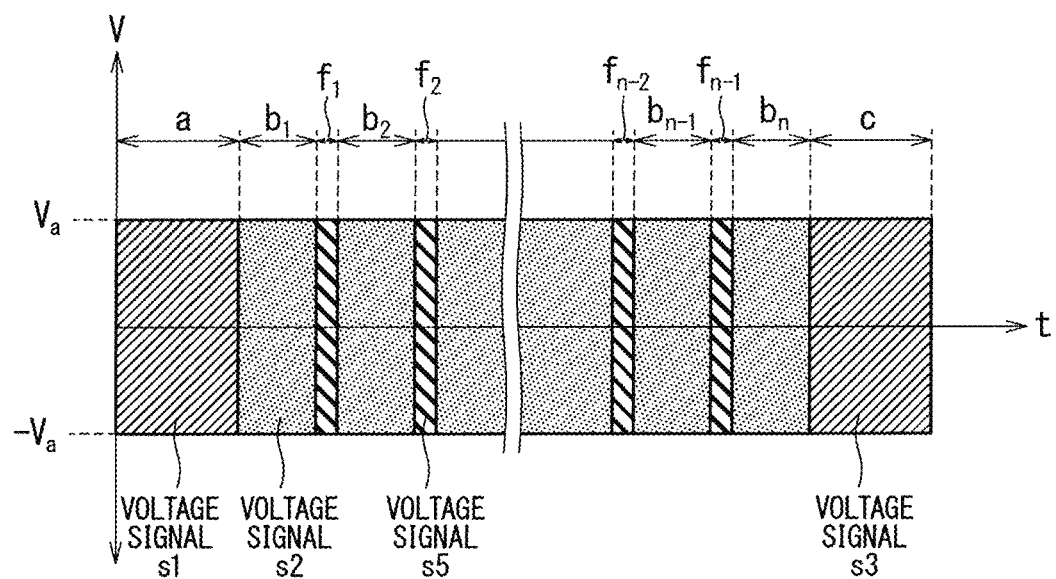
FIG. 87 is a diagram illustrating an example of a waveform configuration of a voltage signal applied to each operation region when the tactile presentation knob according to the fifth embodiment is operated.

FIG. 87 is a diagram illustrating an example of a configuration of a waveform of a voltage signal applied when the indication position 50 of the tactile presentation knob 3 is present at each of the operation lower limit position a, the operation regions $b_1$ to $b_n$, the operation region $b_2$, the scale regions $f_1$ to $f_{n-1}$, and the operation upper limit position c. Specifically, the voltage signal s1 is applied while the indication position 50 is present in the operation lower limit position a, and the voltage signal s2 is applied while the indication position 50 is present in the operation regions $b_1$ to $b_n$. Then, a voltage signal s5 is applied while the indication position 50 is present in the scale regions $f_1$ to 1'11_1. After that, while the indication position 50 is at the operation upper limit position c, a voltage signal s3 is applied.

Hereinafter, a specific example of the configuration of a waveform of a voltage signal illustrated in FIG. 87 will be described.

First Specific Example

Figure 88:
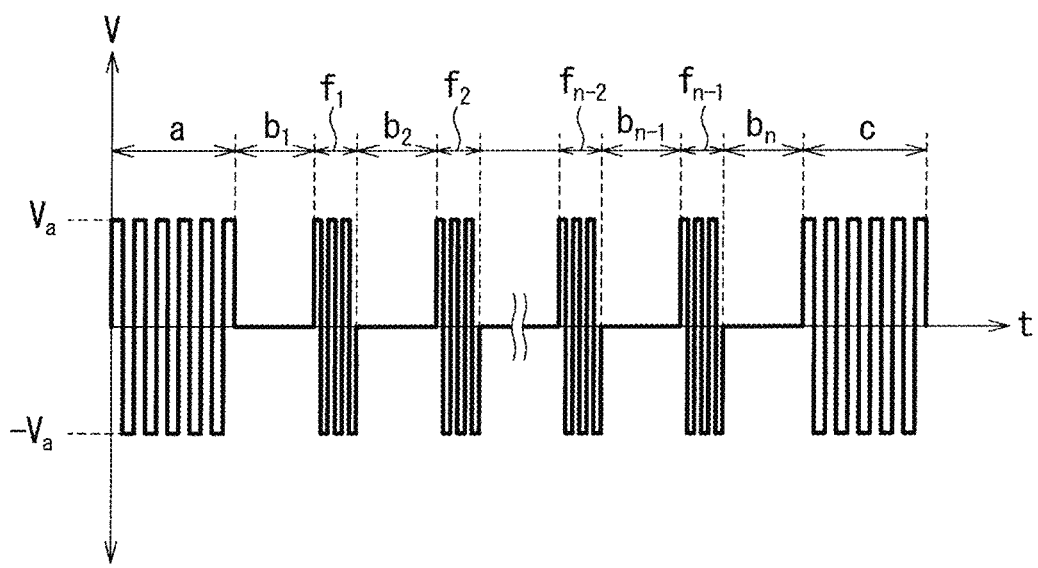
FIG. 88 is a diagram illustrating an example of a waveform of a voltage signal applied to each operation region according to the fifth embodiment.
Figure 89:
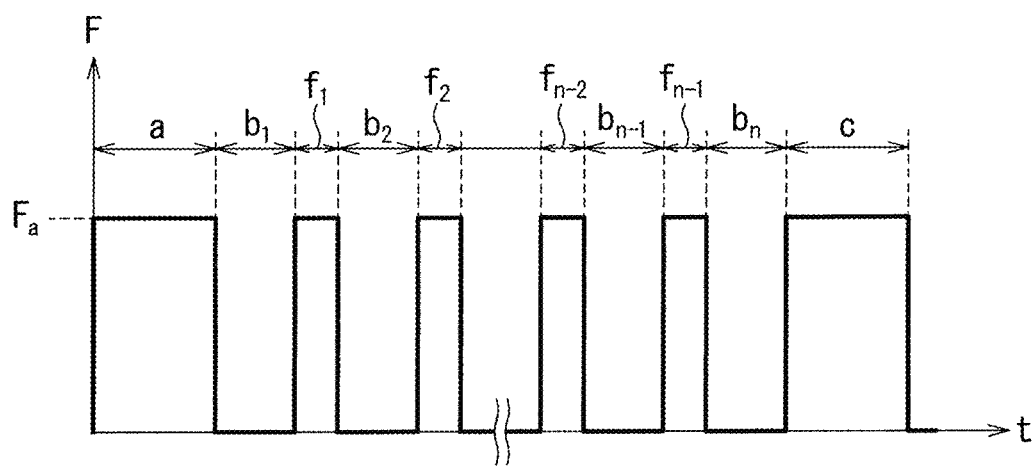
FIG. 89 is a diagram illustrating an example of a frictional force generated when a waveform of the voltage signal of FIG. 88 is applied to each operation region.

FIG. 88 illustrates a waveform of the voltage signal V applied when the indication position 50 of the tactile presentation knob 3 is present at each of the operation lower limit position a, the operation regions $b_1$ to $b_n$, the operation region $b_2$, the scale regions $f_1$ to $f_{n-1}$, and the operation upper limit position c. FIG. 89 illustrates the frictional force F generated between the tactile presentation knob 3 and the tactile presentation panel 100 when the voltage signal illustrated in FIG. 88 is applied. The same applies to FIGS. 90 to 95 described below.

As illustrated in FIGS. 88 and 89 when the indication position 50 is present at the operation lower limit position a or the operation upper limit position c, a voltage signal having the amplitude $\pm V_a$ is applied. When the indication position 50 is present in the operation regions $b_1$ to $b_n$, no voltage signal is applied. When the indication position 50 is present in the scale regions $f_1$ to $f_{n-1}$, a voltage signal having the amplitude $\pm V_a$ is applied. In the cases of FIGS. 88 and 89 in the operation regions $b_1$ and $b_n$, only a dynamic frictional force caused by a material and a surface shape of the dielectric layer 106 and the conductive elastic portion 6 acts on the tactile presentation knob 3, so that the user can smoothly perform operation with a light operation feeling. Further, a voltage signal is applied when the indication position 50 passes through the scale regions $f_1$ to $f_{n-1}$, and the user can perceive a strong climbing feeling of climbing over a high projection that is narrow.

Second Specific Example

Figure 90:
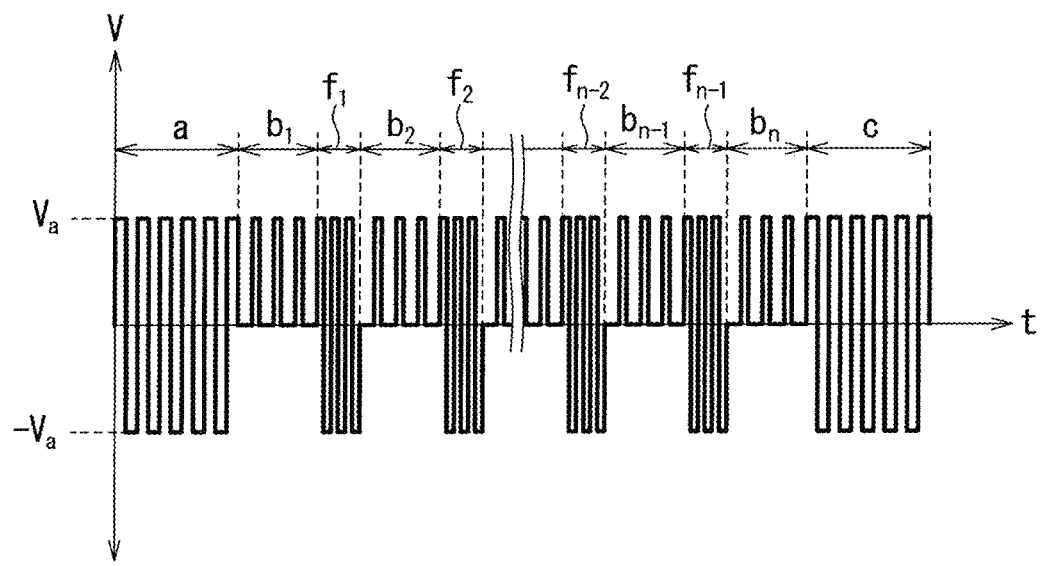
FIG. 90 is a diagram illustrating an example of a waveform of a voltage signal applied to each operation region according to the fifth embodiment.
Figure 91:
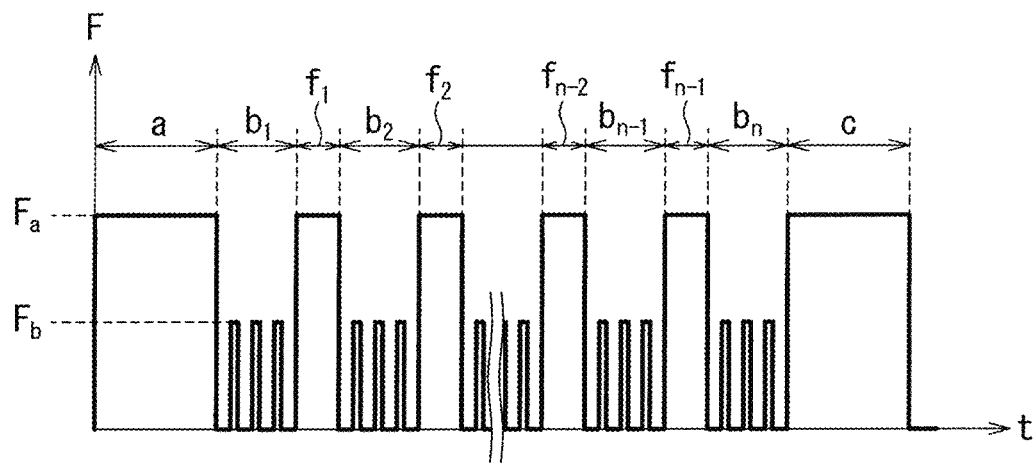
FIG. 91 is a diagram illustrating an example of a frictional force generated when a waveform of the voltage signal of FIG. 90 is applied to each operation region.

FIGS. 90 and 91 illustrate an example of a waveform of a voltage signal in a case where the scale regions $f_1$ to $f_{n-1}$ are presented by a tactile sense, and a tactile sense indicating a mechanical vibration feeling as described in the third embodiment is presented when the indication position 50 is present in the operation regions $b_1$ to $b_n$.

When the indication position 50 is present at the operation lower limit position a or the operation upper limit position c, a voltage signal having the amplitude $\pm V_a$ is applied. When the indication position 50 is present in the operation regions $b_1$ to $b_n$, the positive voltage signal $V_a$ is applied at an optional cycle. When the indication position 50 is present in the scale regions $f_1$ to $f_{n-1}$, a voltage signal having the amplitude $\pm V_a$ is applied. Time during which a voltage signal is periodically applied is longer in the scale regions $f_1$ to $f_{n-1}$ than in the operation regions $b_1$ to $b_n$, and a stronger frictional force is generated in the scale regions $f_1$ to $f_{n-1}$ than in the operation regions $b_1$ to $b_n$. Therefore, when the indication position 50 passes through the scale regions $f_1$ to $f_{n-1}$, the user perceives a strong climbing feeling of climbing over a high projection that is narrow.

Third Specific Example

Figure 92:
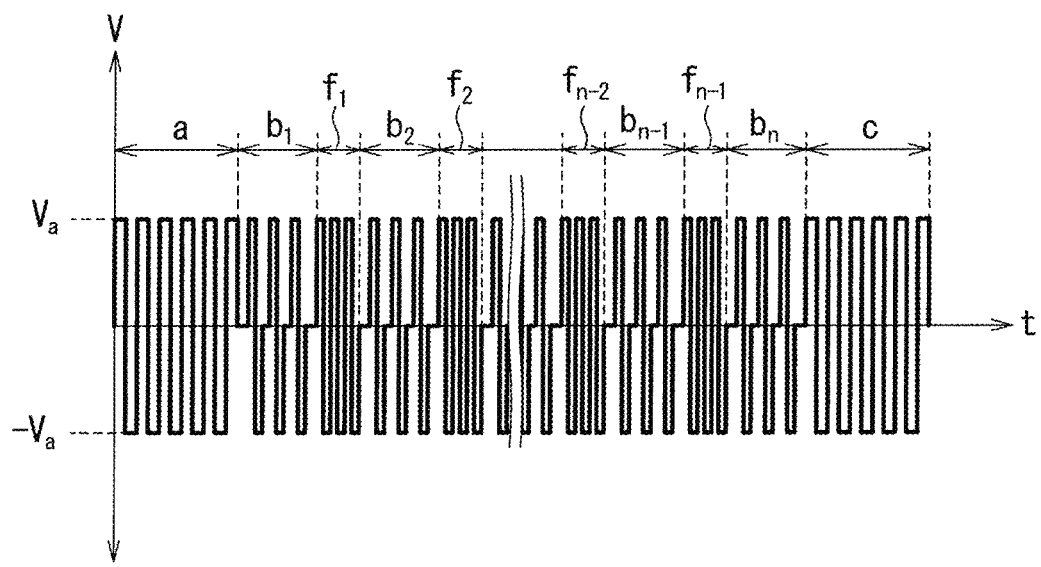
FIG. 92 is a diagram illustrating an example of a waveform of a voltage signal applied to each operation region according to the fifth embodiment.
Figure 93:
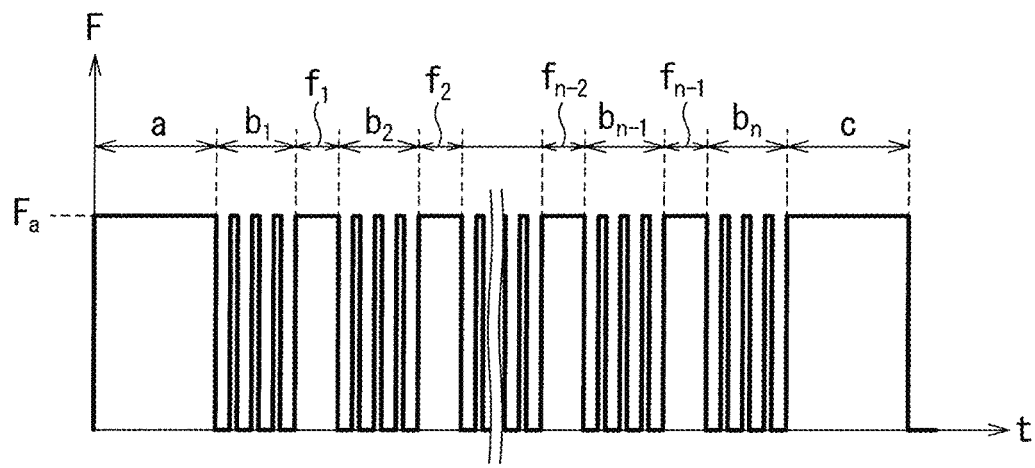
FIG. 93 is a diagram illustrating an example of a frictional force generated when a waveform of the voltage signal of FIG. 92 is applied to each operation region.

FIGS. 92 and 93 illustrate an example of a waveform of a voltage signal in a case where the waveforms are the same at all of the operation lower limit position a, the operation regions $b_1$ to $b_n$, the scale regions $f_1$ to $f_{n-1}$, and the operation upper limit position c. When the indication position 50 is present at the operation lower limit position a, the operation upper limit position c, or the scale regions $f_1$ to $f_{n-1}$, a voltage signal having the amplitude $\pm V_a$ is continuously applied, and application time of the voltage signal is made shorter in the scale regions $f_1$ to $f_{n-1}$ than at the operation lower limit position a and the operation upper limit position c.

When the indication position 50 is present in the operation regions $b_1$ to $b_n$, voltage signals having the same amplitude $\pm V_a$ are periodically applied. In this manner, even with the same signal waveform, it is possible to present three types of tactile senses such as stopping of operation by an attraction force at the operation lower limit position a and the operation upper limit position c, a climbing feeling over a projection shape with a height in the scale regions $f_1$ to $f_{n-1}$, and a tactile sense of a mechanical vibration feeling at the time of operation. Such a waveform of the voltage signal is preferably used in a case where the strength of a presented tactile sense is required, such as operation under an environment where vibration may occur and operation through a glove.

Fourth Specific Example

Figure 94:
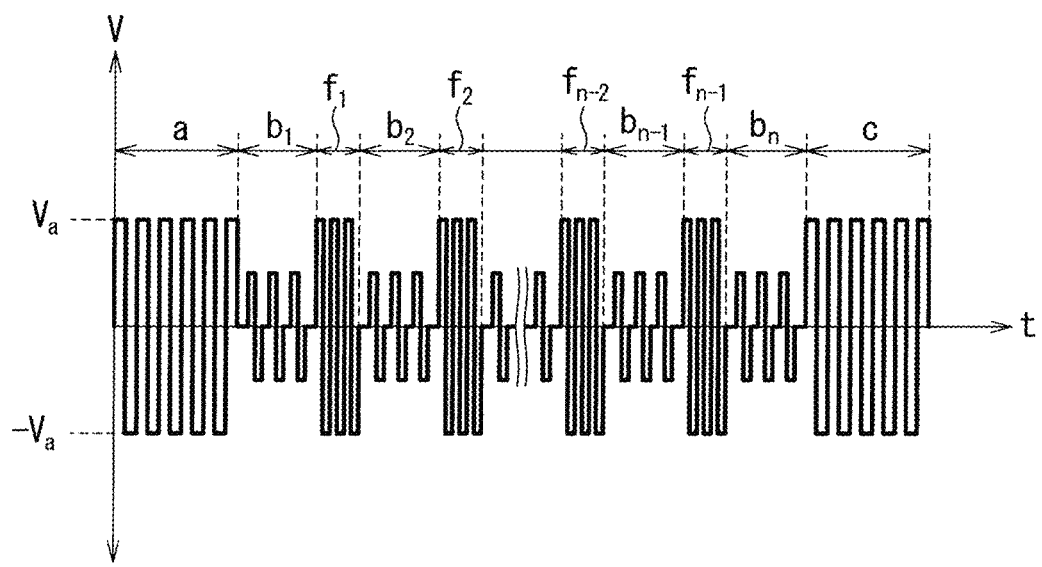
FIG. 94 is a diagram illustrating an example of a waveform of a voltage signal applied to each operation region according to the fifth embodiment.
Figure 95:
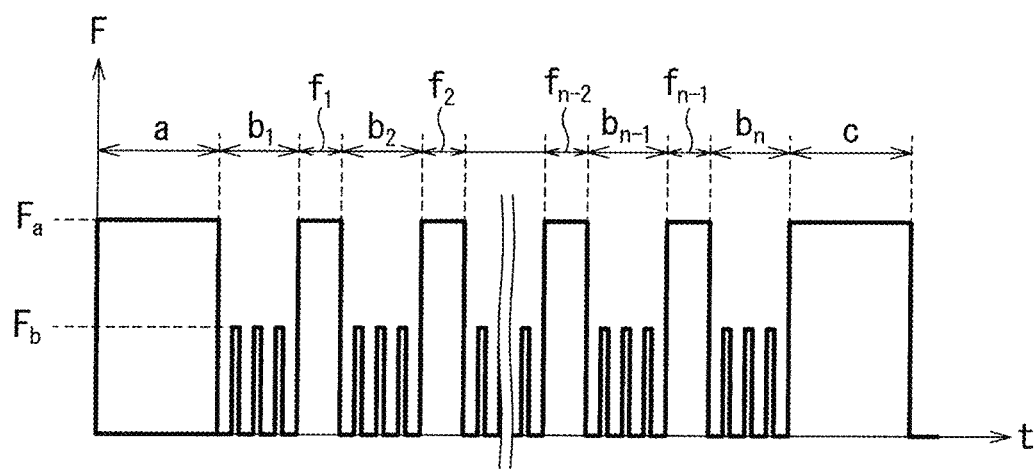
FIG. 95 is a diagram illustrating an example of a frictional force generated when a waveform of the voltage signal of FIG. 94 is applied to each operation region.

As illustrated in FIGS. 94 and 95, by setting the voltage signals of the operation regions $b_1$ to $b_n$ to be lower than a voltage signal of the other regions, a frictional force at the time of operation of the operation regions $b_1$ to $b_n$ is reduced, so that an operational feeling is reduced. Further, the shape of a projection perceived by a vibration feeling is lower in height and more rounded than in the case of FIGS. 92 and 93. As described above, by adjusting time for applying voltage signals with the same waveform and a cycle between time for applying a voltage signal and time for not applying a voltage signal, it is possible to freely create a tactile sense.

<Effect>

According to the fifth embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In an operable region, depending on the presence or absence of generation of a frictional force, catching and a slipping phenomenon are generated on operation of the tactile presentation knob 3, and a vibration feeling is given to the user as if the tactile presentation knob 3 generates mechanical vibration. In this manner, the user can perceive operation of tactile presentation knob 3 by a tactile sense without relying on a visual sense.

A climbing feeling over a scale serving as a guide of an operation amount set at equal intervals in an operation region is presented with a strong tactile sense different from the operation region. In this manner, the user can perceive a detailed operation amount by a tactile sense without relying on vision.

Sixth Embodiment

<Presentation of Neutral Position and Scale>

Figure 96:
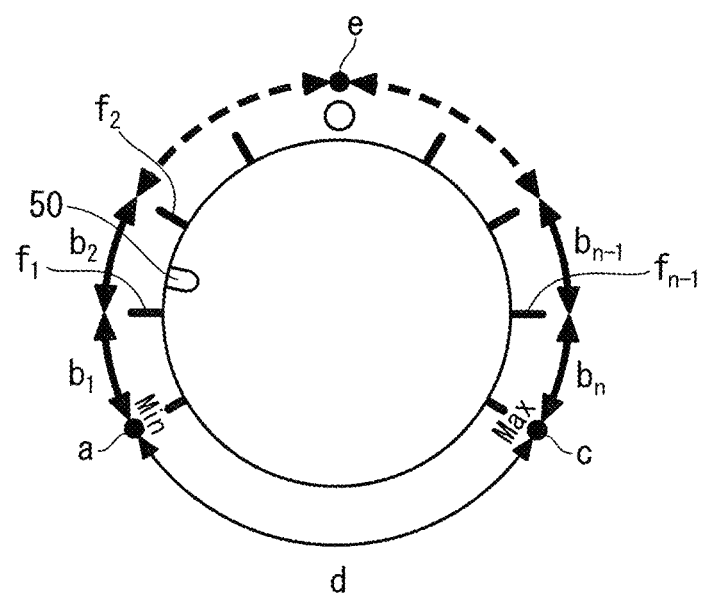
FIG. 96 is a diagram for explaining an operation region of the tactile presentation knob according to a sixth embodiment.

As illustrated in FIG. 96, in the present sixth embodiment, the first to fifth embodiments are combined. The other configurations are the same as those of the first embodiment, and thus detailed description of the configurations is omitted here.

Figure 97:
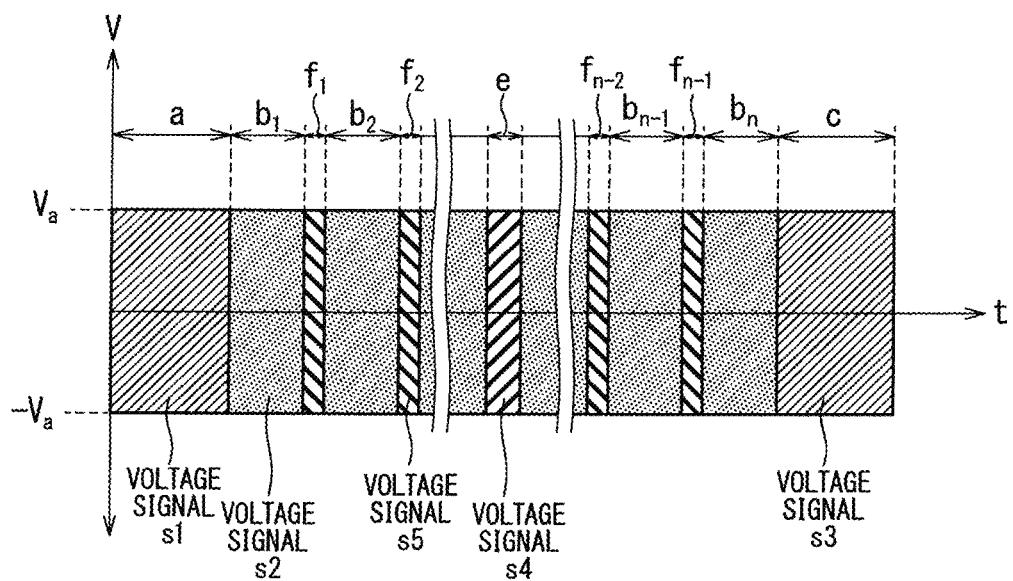
FIG. 97 is a diagram illustrating an example of a waveform configuration of a voltage signal applied to each operation region when the tactile presentation knob according to the sixth embodiment is operated.

FIG. 97 is a diagram illustrating an example of a configuration of a waveform of a voltage signal applied when the indication position 50 of the tactile presentation knob 3 is present at each of the operation lower limit position a, the operation regions $b_1$ to $b_n$, the scale regions $f_1$ to $f_{n-1}$, the neutral position e, and the operation upper limit position c. Specifically, while the indication position 50 is at the operation lower limit position a, a voltage signal s1 is applied. Then, the voltage signal s2 is applied while the indication position 50 is present in the operation regions $b_1$ to $b_n$, and the voltage signal s5 is applied while the indication position 50 is present in the scale regions $f_1$ to $f_{n-1}$. While the indication position 50 is at the neutral position e, the voltage signal s4 is applied. After that, while the indication position 50 is at the operation upper limit position c, a voltage signal s3 is applied.

Hereinafter, a specific example of the configuration of a waveform of a voltage signal illustrated in FIG. 97 will be described.

First Specific Example

Figure 98:
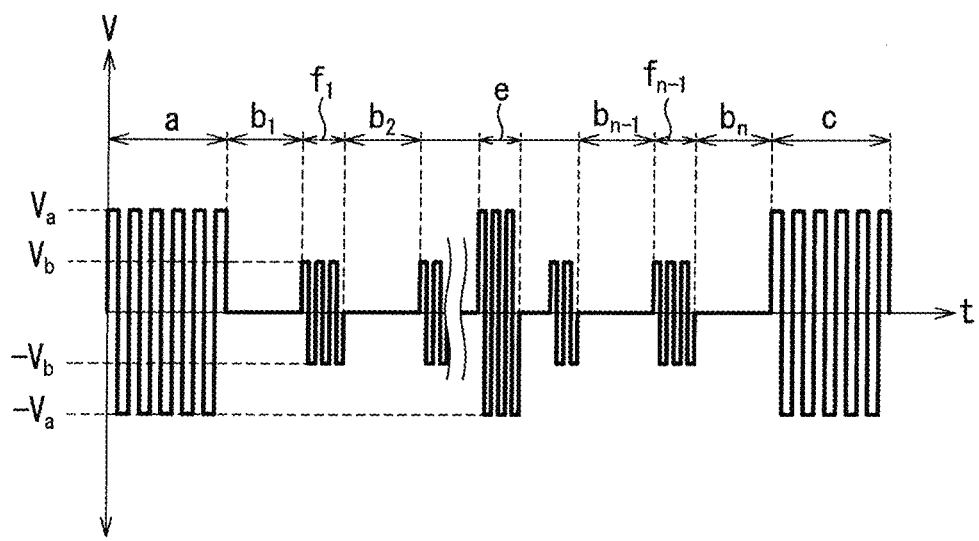
FIG. 98 is a diagram illustrating an example of a waveform of a voltage signal applied to each operation region according to the sixth embodiment.
Figure 99:
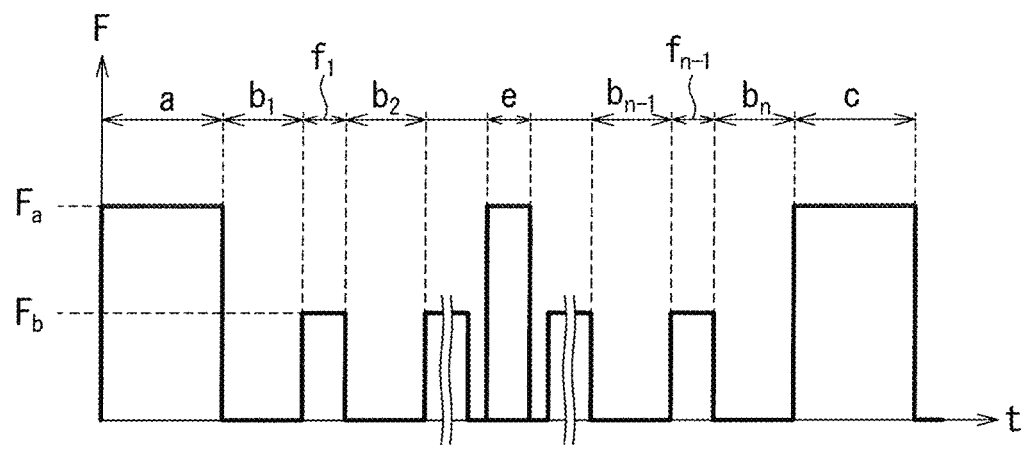
FIG. 99 is a diagram illustrating an example of a frictional force generated when a waveform of the voltage signal of FIG. 98 is applied to each operation region.

FIG. 98 illustrates a waveform of the voltage signal V applied when the indication position 50 of the tactile presentation knob 3 is present at each of the operation lower limit position a, the operation regions $b_1$ to $b_n$, the scale regions $f_1$ to $f_{n-1}$, the neutral position e, and the operation upper limit position c. FIG. 99 illustrates the frictional force F generated between the tactile presentation knob 3 and the tactile presentation panel 100 when the voltage signal illustrated in FIG. 98 is applied. The same applies to FIGS. 100 to 103 described below.

As illustrated in FIGS. 98 and 99 when the indication position 50 is present at the operation lower limit position a or the operation upper limit position c, a voltage signal having the amplitude $\pm V_a$ is applied. When the indication position 50 is present in the operation regions $b_1$ to $b_n$, no voltage signal is applied. When the indication position 50 is present in the scale regions $f_1$ to $f_{n-1}$, a voltage signal having an amplitude $\pm V_b$ is applied for short time. When the indication position 50 is present at the neutral position e, a voltage signal having the amplitude $\pm V_a$ larger than that of the scale regions $f_1$ to $f_{n-1}$ is applied. In the cases of FIGS. 98 and 99, in the operation regions $b_1$ to $b_n$, only a dynamic frictional force caused by a material and a surface shape of the dielectric layer 106 and the conductive elastic portion 6 acts on the tactile presentation knob 3, so that the user can smoothly perform operation with a light operation feeling. Further, since a climbing feeling over a higher projection shape is presented when the indication position 50 passes through the neutral position e than when the indication position 50 passes through the scale regions $f_1$ to $f_{n-1}$, the user can identify and perceive the scale regions $f_1$ to $f_{n-1}$ and the neutral position e.

Second Specific Example

Figure 100:
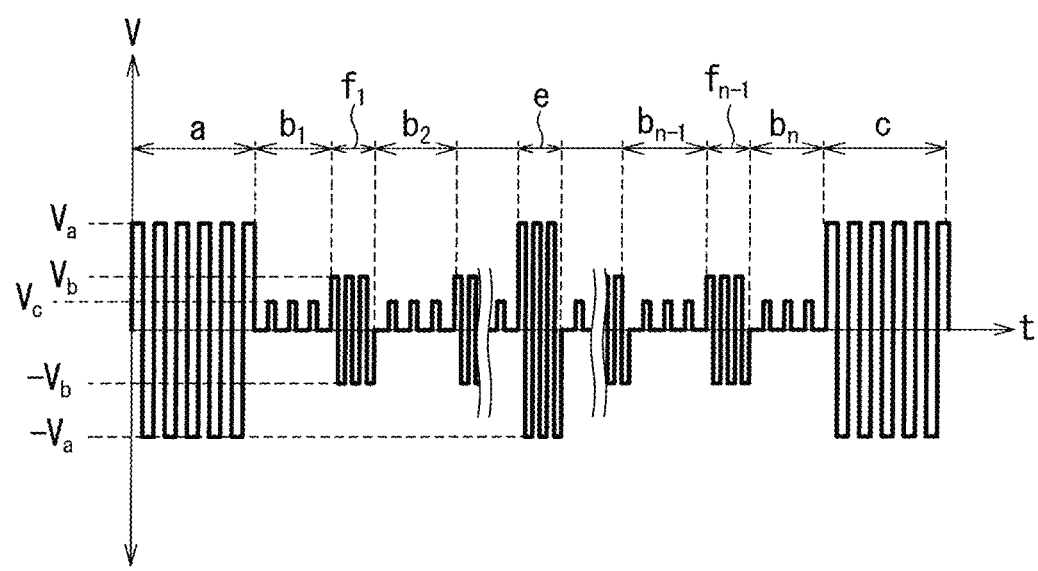
FIG. 100 is a diagram illustrating an example of a waveform of a voltage signal applied to each operation region according to the sixth embodiment.
Figure 101:
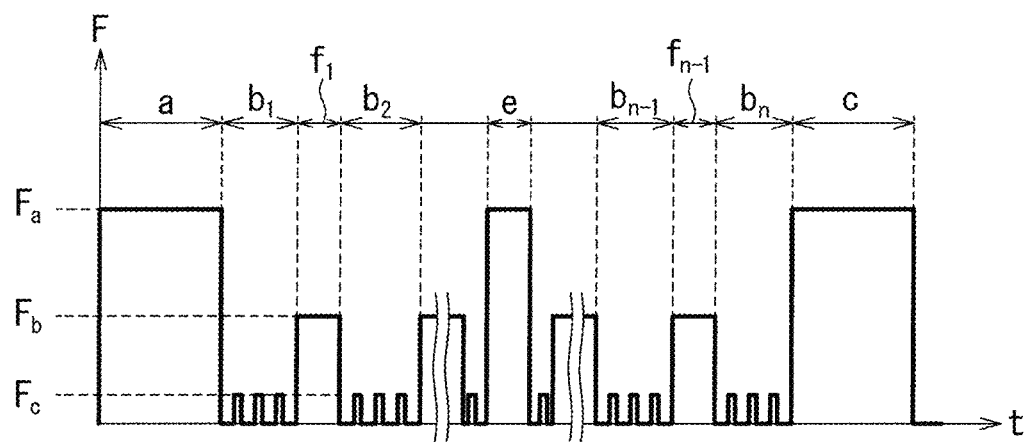
FIG. 101 is a diagram illustrating an example of a frictional force generated when a waveform of the voltage signal of FIG. 100 is applied to each operation region.

FIGS. 100 and 101 illustrate an example of a waveform of a voltage signal in a case where a tactile sense indicating a finer mechanical vibration feeling is presented to the operation regions $b_1$ to $b_n$ than that in FIGS. 98 and 99.

When the indication position 50 is present in the operation regions $b_1$ to $b_n$, a positive voltage signal $V_e$ having a lower voltage signal and a shorter application time than those in the scale regions $f_1$ to $f_{n-1}$ and the neutral position e is applied. In this manner, a mechanical vibration feeling is presented during operation between scales, and a frictional force in the operation regions $b_1$ to $b_n$ is increased to suppress malfunction due to hand shake.

Third Specific Example

Figure 102:
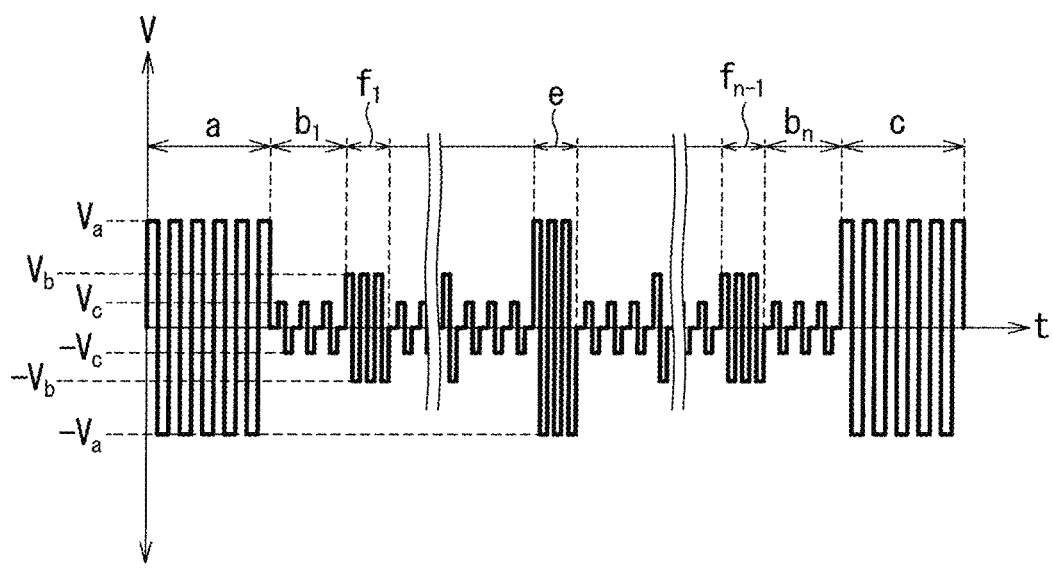
FIG. 102 is a diagram illustrating an example of a waveform of a voltage signal applied to each operation region according to the sixth embodiment.
Figure 103:
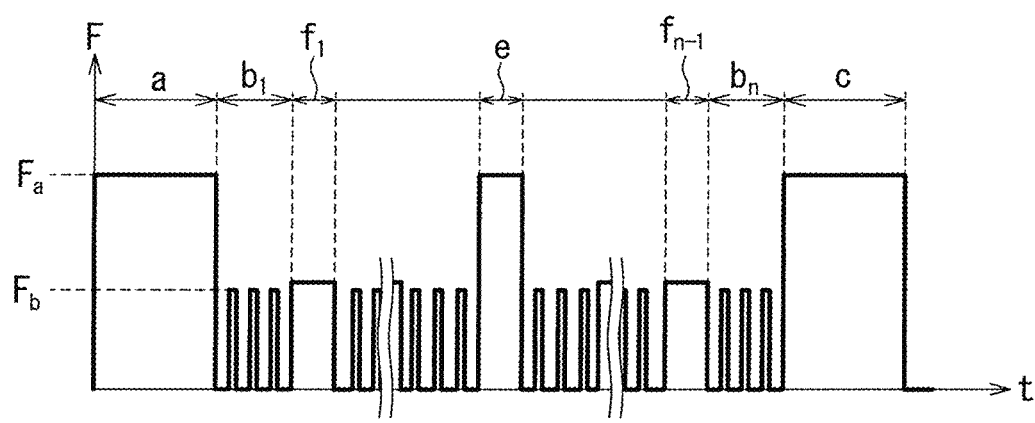
FIG. 103 is a diagram illustrating an example of a frictional force generated when a waveform of the voltage signal of FIG. 102 is applied to each operation region.

FIGS. 102 and 103 illustrate an example of a waveform of a voltage signal in a case where the waveforms are the same at all of the operation lower limit position a, the operation regions $b_1$ to $b_n$, the scale regions $f_1$ to $f_{n-1}$, the neutral position e, and the operation upper limit position c.

When the indication position 50 is present at the operation lower limit position a, the operation upper limit position c, or the scale regions $f_1$ to $f_{n-1}$, a voltage signal having the amplitude $\pm V_a$ is continuously applied, and application time of the voltage signal is made shorter in the scale regions $f_1$ to $f_{n-1}$ than at the operation lower limit position a and the operation upper limit position c.

When the indication position 50 is present in the operation regions $b_1$ to $b_n$, voltage signals having the same amplitude $\pm V_a$ are periodically applied. In this manner, even with the same signal waveform, it is possible to present three types of tactile senses such as stopping of operation by an attraction force at the operation lower limit position a and the operation upper limit position c, a climbing feeling over a projection shape with a height in the scale regions $f_1$ to $f_{n-1}$, and a tactile sense of a mechanical vibration feeling at the time of operation. By setting amplitudes of voltage signals in the regions to satisfy the operation regions $b_1$ to $b_n$ < the scale regions $f_1$ to $f_{n-1}$ < the operation lower limit position a and the operation upper limit position c, there is a difference in shapes and strength perceived as tactile senses, and it is possible to easily cause the user to perceive a modulated tactile sense.

<Effect>

According to the sixth embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In an operable region, depending on the presence or absence of generation of a frictional force, catching and a slipping phenomenon are generated on operation of the tactile presentation knob 3, and a vibration feeling is given to the user as if the tactile presentation knob 3 generates mechanical vibration. In this manner, the user can perceive operation of tactile presentation knob 3 by a tactile sense without relying on a visual sense.

A climbing feeling over a scale serving as a guide of an operation amount set at equal intervals in an operation region is presented with a strong tactile sense different from the operation region. In this manner, the user can perceive a detailed operation amount by a tactile sense without relying on vision.

Seventh Embodiment

<Tactile Sense Becomes Stronger According to Operation Amount from Lower Limit to Upper Limit Within Operation Range>

In a seventh embodiment, a tactile sense gradually becomes stronger as the tactile presentation knob 3 is moved from the operation lower limit position a toward the operation upper limit position c. The other configurations are the same as those of the fourth embodiment, and thus detailed description of the configurations is omitted here.

Figure 104:
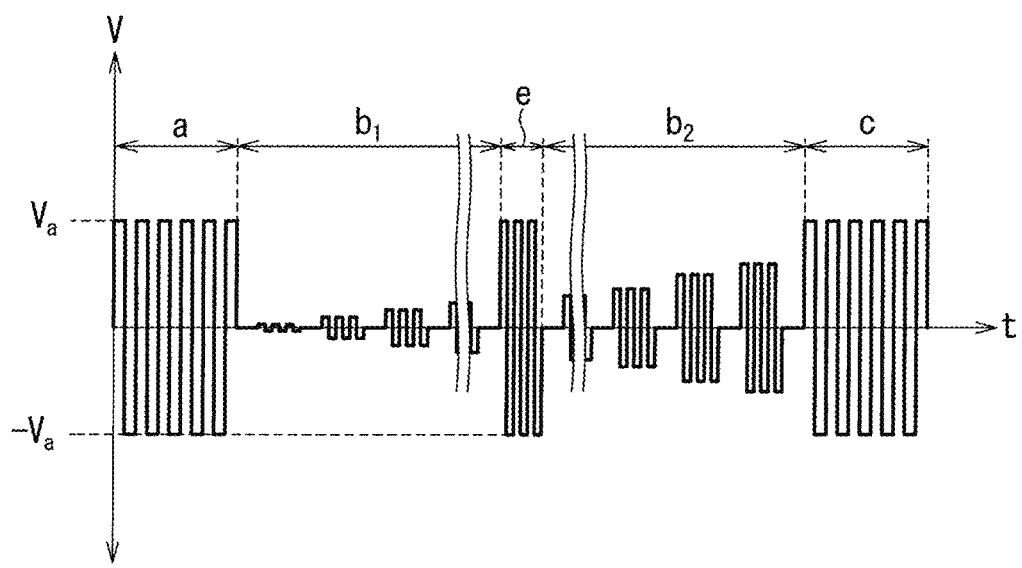
FIG. 104 is a diagram illustrating an example of a waveform of a voltage signal applied to each operation region according to a seventh embodiment.

FIG. 104 illustrates a waveform of the voltage signal V applied when the indication position 50 of the tactile presentation knob 3 is present at each of the operation lower limit position a, the operation regions $b_1$ and $b_2$, the neutral position e, and the operation upper limit position c. FIG. 105 illustrates the frictional force F generated between the tactile presentation knob 3 and the tactile presentation panel 100 when the voltage signal illustrated in FIG. 104 is applied.

As illustrated in FIGS. 104 and 105 when the indication position 50 is present in the operation regions $b_1$ and $b_2$, an amplitude of a voltage signal gradually becomes larger from the operation lower limit position a toward the operation upper limit position c. When a difference in frictional force is small, the user cannot perceive a difference in a tactile sense. Therefore, it is desirable that the frictional force at the neutral position e be 30% or more larger than that in the operation regions $b_1$ and $b_2$.

Note that although the case where there is the neutral position e is described above, the neutral position e does not need to be provided as illustrated in FIG. 37.

<Effect>

According to the seventh embodiment, when the user performs operation by using the tactile presentation knob 3 on the tactile presentation touch panel 400, a tactile sense according to an operation feeling and an operation amount of the tactile presentation knob 3 is presented to the user, and an operation feeling of the dial knob that allows intuitive operation based on a tactile sense by the user is possible and is user-friendly is obtained. Therefore, improvement in operation accuracy based on a tactile sense and reliability of operation can be obtained.

Since the position of the tactile presentation knob 3 on a touch panel and a tactile sense at the time of operation can be optionally set, by using one of the tactile presentation knob 3 for a plurality of operation purposes, the number of operation switches can be reduced, and an HMI layout in consideration of operation convenience and usage of the user is possible.

Further, when one of the tactile presentation knob 3 is used for a plurality of operation purposes, an effect of preventing erroneous operation can be obtained by utilizing a tactile sense at the time of operation for identification of operation content.

When the tactile presentation knob 3 is present at the operation lower limit position a and the operation upper limit position c, rotation of the tactile presentation knob 3 is stopped so that rotation operation cannot be performed in the non-operation region d. By presenting an operation range to the user in this manner, the user can perceive the operation range and an operation amount without relying on vision.

In an operable region, depending on the presence or absence of generation of a frictional force, catching and a slipping phenomenon are generated on operation of the tactile presentation knob 3, and a vibration feeling is given to the user as if the tactile presentation knob 3 generates mechanical vibration. In this manner, the user can perceive operation of tactile presentation knob 3 by a tactile sense without relying on a visual sense.

A climbing feeling over a scale serving as a guide of an operation amount set at equal intervals in an operation region is presented with a strong tactile sense different from the operation region. In this manner, the user can perceive a detailed operation amount by a tactile sense without relying on vision.

It is possible to allow the user to intuitively grasp the indication position 50 of the tactile presentation knob 3 within an operation range by presenting a tactile sense having a strong climbing feeling at a position serving as a reference of the operation range.

Eighth Embodiment

<Invalidation of Operation Outside Operation Range and Presentation of Tactile Sense>

In the first to seventh embodiments, the case where a voltage signal is continuously applied to continuously stop operation of the tactile presentation knob 3 while an operating direction of the tactile presentation knob 3 is from the operation lower limit position a toward the non-operation region d or from the operation upper limit position c toward the non-operation region d. In this case, it is conceivable that the user does not immediately notice that an upper limit (or lower limit) of an operation range of the tactile presentation knob 3 is reached, and does not change the operation direction of the tactile presentation knob 3 to the opposite direction.

In an eighth embodiment, in a case where the operation direction is not changed to the opposite direction for a certain period of time or more after the indication position 50 of the tactile presentation knob 3 reaches the operation upper limit position c or the operation lower limit position a, application of a voltage signal is stopped and generation of an attraction force (strong frictional force) is stopped at once. At this time, the application of the voltage signal is stopped and receiving of operation is also stopped at the same time, so that the tactile presentation knob 3 does not malfunction. In this manner, the user is surprised at abrupt rotation of the tactile presentation knob 3 unintentionally, and can be caused to strongly notice that the indication position 50 of the tactile presentation knob 3 reaches the upper limit or the lower limit. Note that the configuration of the present eighth embodiment is the same as the configuration of any of the first to seventh embodiments, and thus is omitted from description here.

<Effect>

According to the eighth embodiment, by presenting stopping of operation by an attraction force (strong frictional force) and then rapidly releasing operation from the attracted state, it is possible to make the user strongly perceive that operation is not received.

Ninth Embodiment

<Invalidation of Operation Outside Operation Range and Presentation of Tactile Sense>

Figure 106:
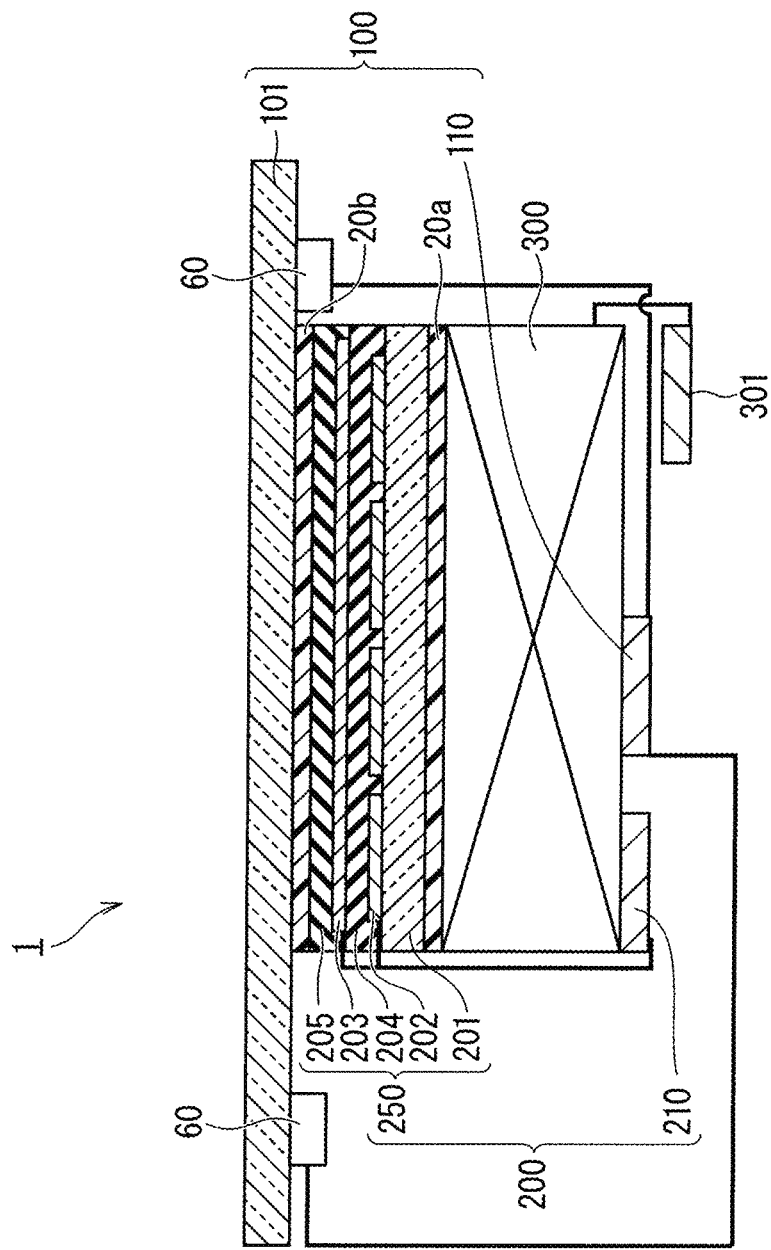
FIG. 106 is a cross-sectional view schematically illustrating an example of a configuration of the tactile presentation touch display according to a ninth embodiment.

FIG. 106 is a cross-sectional view illustrating an example of a configuration of the tactile presentation touch display 1. As illustrated in FIG. 106, in a ninth embodiment, an ultrasonic wave element 60 (vibration element) is installed on an outer peripheral portion of a surface opposite to a surface in contact with the tactile presentation knob 3 of the transparent insulating substrate 101. The other configurations are substantially the same as those of the first embodiment, and thus the description of the configurations is omitted here.

A frictional force between the tactile presentation knob 3 and the transparent insulating substrate 101 may be controlled by an ultrasonic wave. In this case, a wavelength range of the ultrasonic wave is lower than a high frequency range in which a high-pressure air layer is generated between the tactile presentation knob 3 and the transparent insulating substrate 101 and no frictional force is generated.

The ultrasonic wave elements 60 are desirably installed at symmetrical positions in an outer peripheral portion of the transparent insulating substrate 101. By controlling a vibration timing of the ultrasonic wave element 60, a position where vibration of a surface of the transparent insulating substrate 101 resonates can be set at the same position as an indication position 50 of the tactile presentation knob 3. In this case, it is possible to generate vibration having an equivalent amplitude with a smaller voltage than that in a case where the ultrasonic wave elements 60 operate in synchronization, which can contribute to reduction in overall power consumption of the tactile presentation touch display 1.

<Effect>

According to the ninth embodiment, a surface of the transparent insulating substrate 101 is vibrated using the ultrasonic wave element 60 to generate a frictional force between the tactile presentation knob 3 and the transparent insulating substrate 101. Therefore, in a case where the tactile presentation touch display 1 is used outdoors such as on the sea, the tactile presentation knob 3 can be used.

Note that, in the first to ninth embodiments, the case where the tactile presentation knob 3 is used and rotation operation is performed about the rotation shaft of the knob. However, the present invention is not limited to this. For example, each of the first to ninth embodiments can also be applied to a case where the tactile presentation knob 3 is slid like a slide switch. Specifically, by using the tactile presentation knob 3 like a stylus pen, not only vertical, horizontal, and oblique linear slide, but also circular slide that draws a circle, zigzag slide, and the like can be performed.

Note that, in the present disclosure, preferred embodiments can be freely combined with each other, and each preferred embodiment can be appropriately modified or omitted.

Although the present disclosure has been described in detail, the above explanation is exemplary in all the aspects, and the present disclosure is not limited to the explanation. It is understood that countless variations that are not exemplified are conceivable without departing from the scope of the present disclosure.

EXPLANATION OF REFERENCE SIGNS

1: tactile presentation touch display
3: tactile presentation knob
4: rotation portion
5: fixing portion
6: conductive elastic portion
6a: outer diameter
7: position detection unit
8: gap
9: fixing hole
10: rotation portion side surface
11: indication position line
12: rotation portion upper surface
13: fixing table
14: shaft portion
15: bottom surface portion
16: boundary portion conductive portion
17: adhesive portion
20a, 20b: adhesive
40: switch
100: tactile presentation panel
101: transparent insulating substrate
102: tactile electrode
102a: first electrode
102b: second electrode
106: dielectric layer
107: tactile presentation panel terminal portion
108: FPC
110: voltage supply circuit
113: tactile presentation voltage generation circuit
113a: first voltage generation circuit
113b: second voltage generation circuit
114: tactile presentation control circuit
115: charge discharge portion
150: tactile presentation screen
200: touch panel
201: substrate
202: excitation electrode
203: detection electrode
204: interlayer insulating film
205: insulating film
206: row direction wiring layer
207: column direction wiring layer
208: touch screen terminal portion
209: shield wiring layer
210: touch detection circuit
212: charge detection circuit
213: touch detection control circuit
214: touch coordinate calculation circuit
215: excitation pulse generation circuit
216: pressure sensitive sensor
300: display panel
400: tactile presentation touch panel

The invention claimed is:

1. A tactile presentation control apparatus that has a tactile presentation knob placed on an operation surface and presents a tactile sense to a user via the tactile presentation knob, the tactile presentation control apparatus comprising:
a tactile control circuit that performs control to present different tactile senses to each of a plurality of distinct operation regions that each correspond to a different range of rotational motion of the tactile presentation knob on the operation surface when the tactile presentation knob is rotationally operated,
wherein when the tactile presentation knob is present in one of the distinct operation regions, the tactile control circuit performs control to present, as the tactile sense, a frictional force generated in the tactile presentation knob within the distinct operation region,
the tactile presentation panel further comprises a tactile electrode including a plurality of first electrodes and a plurality of second electrodes provided on the operation surface,
the tactile presentation knob includes a conductive elastic portion that presents the tactile sense to the user, and
the frictional force is generated in the tactile presentation knob using an electric field formed in a lateral direction between the first electrodes and the second electrodes via the conductive elastic portion.

2. The tactile presentation control apparatus according to claim 1, wherein
a frictional force generated in the tactile presentation knob is a frictional force generated in the tactile presentation knob on the distinct operation region.

3. A tactile presentation panel, comprising:
the tactile presentation control apparatus according to claim 1; and
a contact position detection circuit that detects a contact position between the tactile presentation knob and the operation surface, wherein
when the contact position detected by the contact position detection circuit is present in one of the distinct operation regions, the tactile control circuit performs control to present, as the tactile sense, a frictional force between the tactile presentation knob and the operation surface to within the distinct operation region.

4. The tactile presentation panel according to claim 3, wherein
the tactile presentation knob includes a position detection unit used when the contact position detection unit detects the contact position, and a conductive elastic portion that presents a tactile sense to the user, and
the position detection unit and the conductive elastic portion are in contact with the operation surface.

5. A tactile presentation panel, comprising:
a tactile presentation control apparatus that has a tactile presentation knob placed on an operation surface and presents a tactile sense to a user via the tactile presentation knob, the tactile presentation control apparatus including a tactile control circuit that performs control to present different tactile senses to each of a plurality of distinct operation regions on the operation surface when the tactile presentation knob is rotationally operated,
wherein when the tactile presentation knob is present in one of the distinct operation regions, the tactile control circuit performs control to present, as the tactile sense, a frictional force generated in the tactile presentation knob within the distinct operation region; and
a contact position detection circuit that detects a contact position between the tactile presentation knob and the operation surface, wherein
when the contact position detected by the contact position detection circuit is present in one of the distinct operation regions, the tactile control circuit performs control to present, as the tactile sense, a frictional force between the tactile presentation knob and the operation surface within the distinct operation region,
the tactile presentation panel further comprising:
a tactile electrode including a plurality of first electrodes and a plurality of second electrodes provided on the operation surface of the tactile presentation panel;
a dielectric layer coveting the tactile electrode; and a voltage generation circuit that generates a first voltage signal leaving a first frequency to be applied to at least one of the first electrodes located in at least a partial region on the operation surface, and generates a second voltage signal having a second frequency different from the first frequency to be applied to at least one of the second electrodes located in at least a partial region on the operation surface, wherein a frictional force between the tactile presentation knob and the operation surface is generated based on the first voltage signal and the second voltage signal generated by the voltage generation circuit, the tactile presentation panel further comprises a tactile electrode including a plurality of first electrodes and a plurality of second electrodes provided on the operation surface, the tactile presentation knob includes a conductive elastic portion that presents the tactile sense to the user, and the frictional force is generated in the tactile presentation knob using an electric field formed in a lateral direction between the first electrodes and the second electrodes via the conductive elastic portion.

6. The tactile presentation panel according to claim 5, wherein
a frictional force between the tactile presentation knob and the operation surface changes according to a change in amplitude and cycle of each of the first voltage signal and the second voltage signal generated by the voltage generation circuit.

7. The tactile presentation panel according to claim 3, further comprising:
at least one vibration element that vibrates the operation surface of the tactile presentation panel with an ultrasonic wave,
wherein the tactile control circuit performs control to present the tactile sense by vibration of the vibration element.

8. The tactile presentation panel according to claim 3, wherein
one of the distinct operation regions is an end portion operation region adjacent to a non-operation region where the rotation operation cannot be performed.

9. The tactile presentation panel according to claim 8, wherein
the tactile control circuit performs control to present, as the tactile sense, the frictional force larger than that in the distinct operation region other than the end portion operation region to the end portion operation region.

10. The tactile presentation panel according to claim 3, wherein
one of the distinct operation regions is a neutral position region serving as a reference of the rotation operation.

11. The tactile presentation panel according to claim 10, wherein
the tactile control circuit performs control to present, as the tactile sense, the frictional force larger than that in the distinct operation region other than the neutral position region to the neutral position region.

12. The tactile presentation panel according to claim 10, wherein
the tactile control circuit performs control to present, as the tactile sense, the frictional force larger than that in the neutral position region to within the distinct operation region other than the neutral position region.

13. The tactile presentation panel according to claim 3, wherein the operation surface further includes a scale region indicating a separation between the respective distinct operation regions.

14. The tactile presentation panel according to claim 13, wherein
the tactile control circuit performs control to present, as the tactile sense, the frictional force larger than that in the distinct operation region other than the scale region to the scale region.

15. The tactile presentation panel according to claim 10, wherein
the operation surface further includes a scale region indicating a separation between the respective distinct operation regions, and
the tactile control circuit performs control to present, as the tactile sense, the frictional force larger than that in the scale region to the neutral position region.

16. The tactile presentation panel according to claim 3, wherein
the tactile control circuit performs control to change the tactile sense according to a rotation angle of the tactile presentation knob.

17. A tactile presentation touch panel comprising:
the tactile presentation panel according to claim 3; and
a touch panel arranged on a side opposite to the operation surface of the tactile presentation panel,
wherein the contact position detection circuit is included in the touch panel instead of the tactile presentation panel.

18. The tactile presentation touch panel according to claim 17, wherein
a detection electrode and an excitation electrode of the touch panel are arranged as a pair in a matrix.

19. A tactile presentation touch display comprising:
the tactile presentation touch panel according to claim 17; and
a display panel attached to the tactile presentation touch panel.

20. The tactile presentation control apparatus according to claim 1, wherein
one of the distinct operation regions is an end portion operation region adjacent to a non-operation region where the rotation operation cannot be performed.

21. The tactile presentation control apparatus according to claim 20, wherein
the tactile control circuit performs control to present, as the tactile sense, the frictional force larger than that in the distinct operation region other than the end portion operation region to the end portion operation region.

22. T tactile presentation control apparatus according to claim 1, wherein
one of the distinct operation regions is a neutral position region serving as a reference of the rotation operation.

23. The tactile presentation control apparatus according to claim 22, wherein
the tactile control circuit performs control to present, as the tactile sense, the frictional force larger than that in the distinct operation region other than the neutral position region to the neutral position region.

24. The tactile presentation control apparatus according to claim 22, wherein
the tactile control circuit performs control to present, as the tactile sense, the frictional force larger than that in the neutral position region to within the distinct operation region other than the neutral position region.

25. The tactile presentation control apparatus according to claim 1, wherein the operation surface further includes a scale region indicating a separation between the respective distinct operation regions.

26. The tactile presentation control apparatus according to claim 25, wherein the tactile control circuit performs control to present, as the tactile sense, the frictional force larger than that in the distinct operation region other than the scale region to the scale region.

27. The tactile presentation control apparatus according to claim 22, wherein the operation surface further includes a scale region indicating a separation between the respective distinct operation regions, and the tactile control circuit performs control to present, as the tactile sense, the frictional force larger than that in the scale region to the neutral position region.

28. The tactile presentation control apparatus according to claim 1, wherein the tactile control circuit performs control to change the tactile sense according to a rotation angle of the tactile presentation knob.

29. The tactile presentation control apparatus according to claim 1, wherein the operation surface has an unevenness related to a thickness of electrodes included in the operation surface.

30. The tactile presentation control apparatus according to claim 1, wherein a flatness of a region where the tactile presentation knob is placed on the operation surface is 0.5 mm or less.

* * * * *